US007117453B2

(12) United States Patent
Drucker et al.

(10) Patent No.: US 7,117,453 B2
(45) Date of Patent: Oct. 3, 2006

(54) MEDIA FRAME OBJECT VISUALIZATION SYSTEM

(75) Inventors: Steven M. Drucker, Bellevue, WA (US); Curtis G. Wong, Bellevue, WA (US); Steve Glenner, Bellevue, WA (US); Asta L. Glatzer, Redmond, WA (US); Steven D. DeMar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 10/348,122

(22) Filed: Jan. 21, 2003

(65) Prior Publication Data

US 2004/0143598 A1    Jul. 22, 2004

(51) Int. Cl.
*G06F 3/00* (2006.01)

(52) U.S. Cl. ............................ 715/833; 715/974

(58) Field of Classification Search ............. 715/764, 715/730, 723, 786, 968, 833, 973–974; 709/238
See application file for complete search history.

(56) References Cited

U.S. PATENT DOCUMENTS

| 5,706,097 | A | * | 1/1998 | Schelling et al. ......... 358/296 |
| 5,706,457 | A | * | 1/1998 | Dwyer et al. ............. 715/835 |
| 5,835,094 | A | * | 11/1998 | Ermel et al. ............. 715/848 |
| 6,029,195 | A | * | 2/2000 | Herz ..................... 725/116 |
| 6,097,389 | A | * | 8/2000 | Morris et al. ............ 715/804 |
| 6,246,793 | B1 | | 6/2001 | Rindtorff et al. |
| 6,262,732 | B1 | * | 7/2001 | Coleman et al. .......... 715/835 |
| 6,288,719 | B1 | * | 9/2001 | Squilla et al. ............ 715/805 |
| 6,317,141 | B1 | | 11/2001 | Pavley et al. |
| 6,335,742 | B1 | * | 1/2002 | Takemoto ................ 715/781 |
| 6,545,209 | B1 | | 4/2003 | Flannery et al. |
| 6,546,405 | B1 | | 4/2003 | Gupta et al. |
| 6,564,263 | B1 | | 5/2003 | Bergman et al. |
| 6,567,980 | B1 | * | 5/2003 | Jain et al. ................ 725/61 |
| 6,578,040 | B1 | | 6/2003 | Syeda-Mahmood |
| 6,690,843 | B1 | * | 2/2004 | Squilla et al. ............ 382/306 |
| 6,731,314 | B1 | | 5/2004 | Cheng et al. |
| 6,877,015 | B1 | * | 4/2005 | Kilgore et al. .......... 707/104.1 |
| 6,883,140 | B1 | * | 4/2005 | Acker et al. ............. 715/730 |
| 2002/0033848 | A1 | * | 3/2002 | Sciammarella et al. ..... 345/838 |
| 2002/0054059 | A1 | * | 5/2002 | Schneiderman ........... 345/700 |
| 2002/0143775 | A1 | | 10/2002 | Wilkinson et al. |
| 2003/0076361 | A1 | * | 4/2003 | Hatanaka et al. ......... 345/771 |
| 2003/0081011 | A1 | * | 5/2003 | Sheldon et al. .......... 345/838 |
| 2005/0210414 | A1 | * | 9/2005 | Angiulo et al. .......... 715/838 |

OTHER PUBLICATIONS

Kuchinsky et al. ("FotoFile: A consumer Multimedia Organization and Retrieval System", ACM CHI '99 Pittsburg PA).*

(Continued)

*Primary Examiner*—Sy D. Luu
(74) *Attorney, Agent, or Firm*—Amin & Turocy, LLP

(57) ABSTRACT

The present invention provides a unique system and method for facilitating browsing, sorting, clustering, and filtering any number of media objects grouped together in a quick and easy manner. In particular, the invention involves annotating the media objects, which have been clustered, sorted, and/or filtered en masse rather than individually, with metadata. The media objects may be selected by a user and annotated with a plurality of metadata as desired by a user in order to optimize utilization of the media objects. The media objects may also be combined and/or mixed in any number of ways to create new media objects. Media objects may include an audio component, a visual component, a portion thereof, and/or any combination thereof.

32 Claims, 61 Drawing Sheets

OTHER PUBLICATIONS

Yao et al. ("The Development of A Video Metadata Authoring and Browsing System in XML", Australian Computer Society, Inc., Visualisation 2000, Pan-Sydney Workshop on Visual Information Processing, Dec. 2000).*

Chitra Dorai and Svetha Venkatesh. Bridging the Semantic Gap in Content Management Systems: Computational Media Aesthetics. 2001. 6 pages.

Thomas A. Phelps and Robert Wilensky. The Multivalent Browser: A Platform for New Ideas. Proceedings of the 2001 ACM Symposium on Document engineering, Nov. 2001. pp. 58-67.

Ian H. Witten, Rodger J. McNab. Stefan J. Boddie, and David Bainbridge. Greenstone: A Comprehensive Digital Library Software System. Proceedings of the 5th ACM Conference on Digital Libraries, 1999. 9 pages.

Jeff E. Tandianus. Andrias Chandra, and Jesse S. Jin. Video Cataloguing and Browsing. Pan-Sydney Area Workshop on Visual Information Processing. Conferences in Research and Practice in Information Technology. vol. 11. Sydney, Australia. 2002. 7 pages.

Platt, John C., et al; PhotoTOC: Automatic Clustering for Browsing Personal Photographs; Feb. 2002; 13 pages.

Kuchinsky, Allan, et al.; Fotofile: A Consumer Multimedia Organization and Retrieval System; May 1999; 8 pages.

* cited by examiner

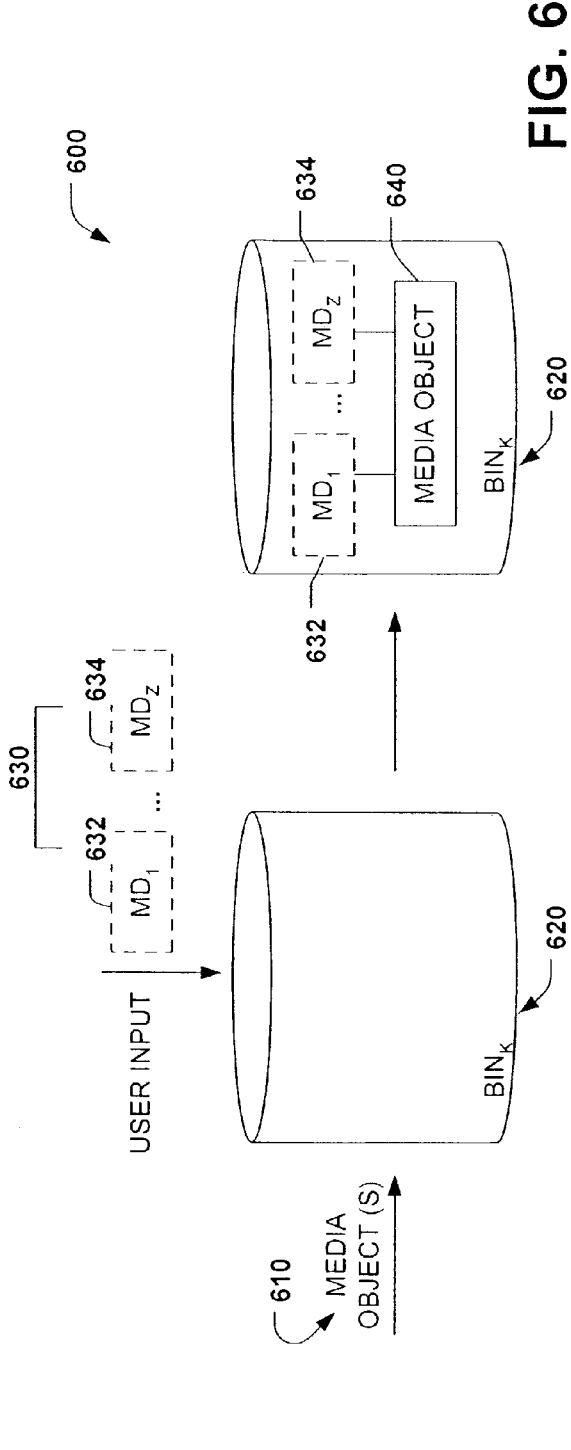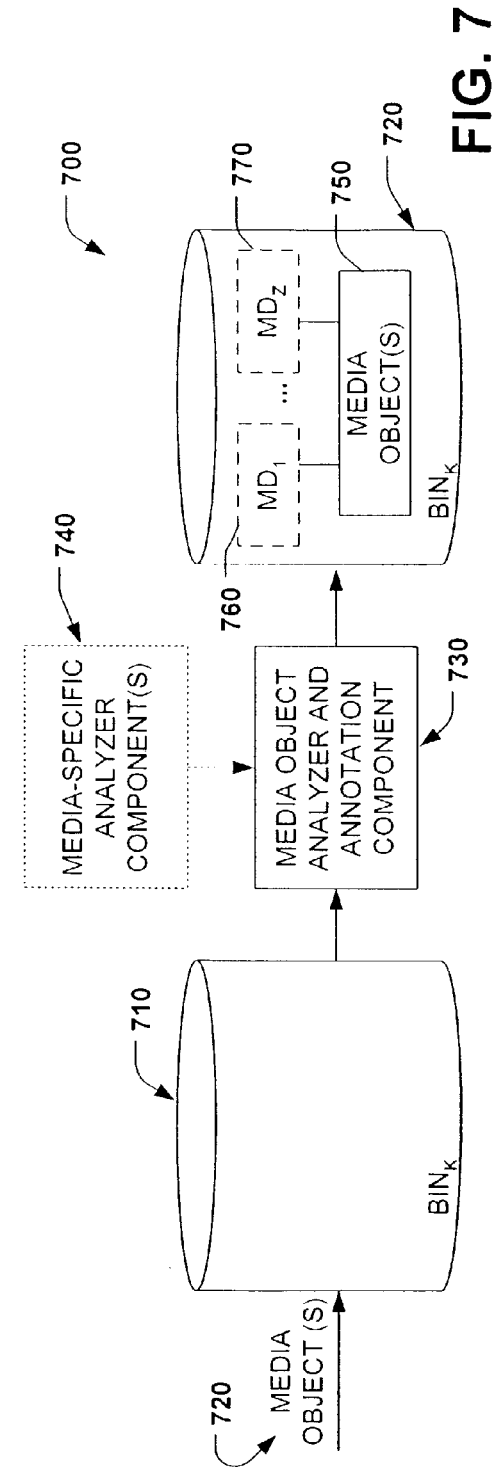

MEDIA FRAME OBJECT VISUALIZATION SYSTEM

TECHNICAL FIELD

The present invention relates generally to browsing of media, and more particularly visual selection and annotation of media objects using intrinsic and extrinsic metadata.

BACKGROUND OF THE INVENTION

As availability of media objects (e.g., movies, music, photographs, e-mail, video or sound cliplets, pictures, and/or messages) has increased, the task of effectively browsing, editing and retrieving media has become difficult and cumbersome. Conventional media systems for browsing, editing, viewing, modifying, sorting, and the like have provided limited ability for a user to access the media in a meaningful manner.

For example, photographs digitally scanned onto a computer processor typically have nonsensical filenames associated therewith, making it difficult to manipulate and organize them. Providing more meaningful information to each file or media object must be done individually and separately which is time-consuming and tedious for regular or frequent use involving editing, sampling, and viewing, for example. Further, conventional media systems are typically rigid and thus limit a user's ability to personalize such systems. Moreover, conventional media systems remain complex and incomprehensible for quick retrieval, use, and viewing of the media objects.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a unique system and method for facilitating browsing, sorting, clustering, and filtering any number of media objects grouped together in a quick and easy manner. In particular, the invention involves annotating the media objects, which have been clustered, sorted, and/or filtered en masse rather than individually, with metadata. Metadata may include intrinsic metadata (e.g., creation date, content type, size, modification date . . .) as well as extrinsic metadata (e.g., human description of the content). Intrinsic metadata can be extracted from and associated with the media object. Extrinsic metadata can be generated based at least in part by user instructions as well as by an analysis of the media objects via pattern recognition, speech recognition, content analysis, face detection and the like. Further, the extrinsic metadata can be propagated in a hierarchal arrangement, thereby facilitating browsing, clustering, and sorting of the media objects.

More specifically, the present invention provides a system and method for rapid metadata annotation by visually selecting and dropping clusters and/or groupings of media objects into bins. A unique user interface in accordance with the subject invention facilitates rapid and convenient grouping of the media objects according to user preferences and provides for subsequent attachment of relevant metadata to the group which creates a compelling and rapid process for managing and using the media objects.

Further, the present invention provides for rapid selection of any number of media objects to permit further annotation of metadata. Thus, a user can easily and quickly cluster and group media objects based on intrinsic metadata in order to rapidly manipulate groups of related media objects. In addition, browsing and viewing controls such as sliders, scroll bars, and filters located at a periphery of the user interface can be used to focus on a working set of media objects which can be readily manipulated as a group as well as individually. When the user has suitably narrowed a working set of media objects, the task of assigning metadata to the group is relatively simplified and fast via the subject invention. Hence, the present invention provides a unique system and method for manipulating any number of media objects which yield results that can be visualized almost, if not immediately by the user.

In addition, the present invention provides for a visualized, annotated database including any number of media objects (e.g., described infra) which can be randomly accessed, combined, modified and/or mixed by the user. Such random accessibility of the media objects facilitates rapid grouping, clustering, and/or sorting of the media objects into user-specified bins for subsequent manipulation, viewing or browsing. For example, media objects may include portions, snippets, cliplets, and the like of a whole song, document, picture, photograph, movie, video, email, etc. With the present invention, such media objects can be annotated with metadata and randomly accessed via browsing and searching the database of media objects in order to create, for example, modified or new media objects. Thus, such aspect of the subject invention provides for a very powerful media editing and/or generation tool wherein, for example, a plurality of bins holding media can be selectively and/or randomly merged (e.g., to merge a bin holding video with a bin holding audio to generate a video annotated with the audio).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 6 is a block diagram of a media annotation system in accordance with another aspect of the present invention.

FIG. 7 is a block diagram of a media annotation system in accordance with an aspect of the present invention.

DETAILED DESCRIPTION OF THE INVENTION

Figure 1:
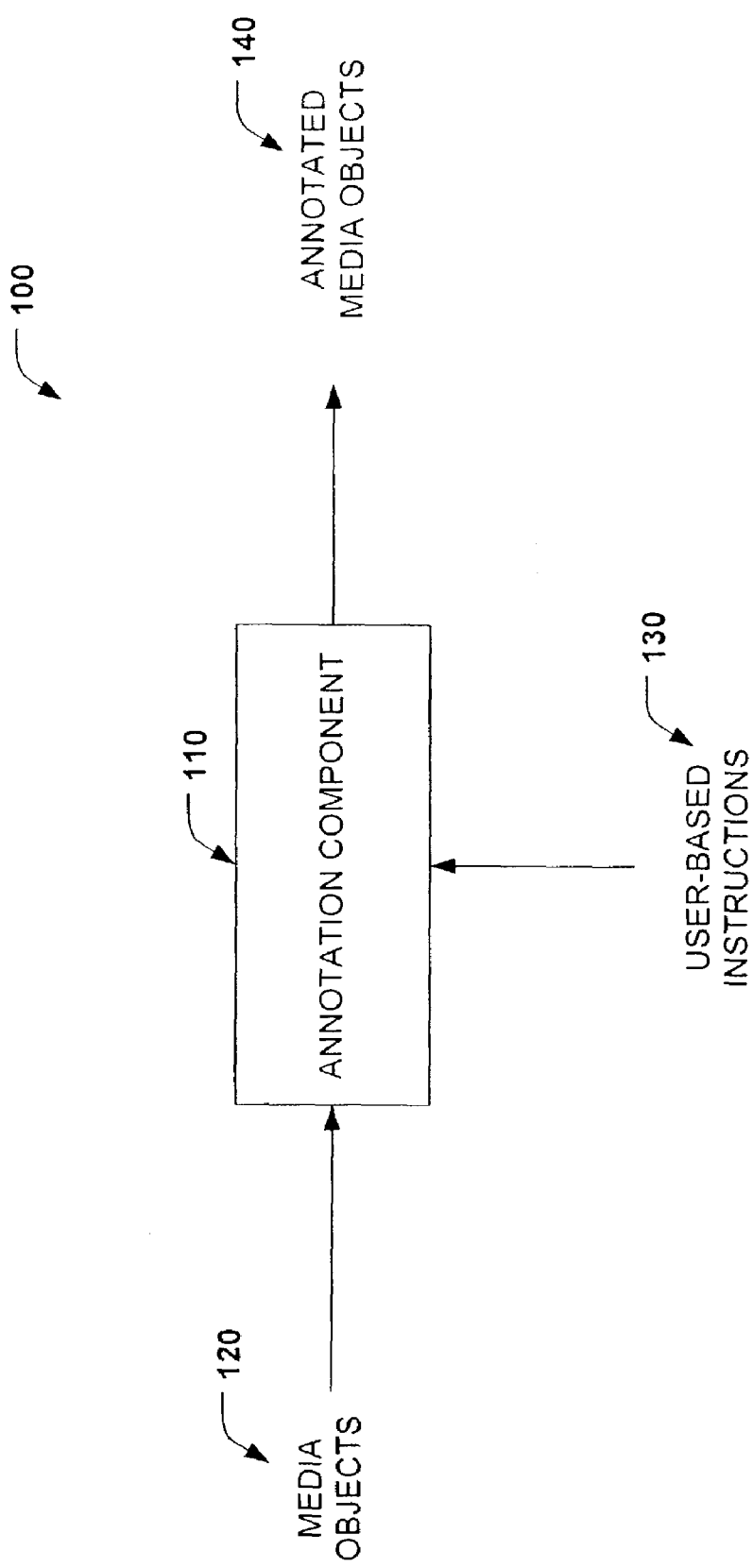
FIG. 1 is a block diagram of a media annotation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

In addition, the term "media object" as employed in this application is intended to refer to pictures, photographs, music, sounds, text, e-mail, movies, video, messages, documents, slides, movie or video stills, streaming video and/or audio, and/or any combination thereof and/or any cliplet thereof, and in any suitable format or file type for carrying out the subject invention.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Accordingly, the subject invention (e.g., in connection with the employment of bins) can employ various artificial intelligence based schemes for carrying out various aspects of the subject invention. For example, classification of media objects and annotation thereof can be facilitated via an automatic classification system and process. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information . . . ) so that the classifier(s) automatically annotate, file, group, cluster, merge media objects in accordance with user preferences. For example, with respect to Support Vector Machines (SVM) which are well understood—it is to be appreciated that other classifier models may also be utilized such as Naive Bayes, Bayes Net, decision tree and other learning models—SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$. In the case of text-based media classification, for example, attributes are words or phrases or other domain-specific attributes derived from the words (e.g., parts of speech, presence of key terms), and the classes are categories or areas of interest (e.g., levels of priorities).

Referring to FIG. 1, a media annotation system 100 in accordance with an aspect of the present invention is illustrated. The media annotation system 100 includes an annotation component 110 that receives one or more media objects 120, or a group thereof, selected by a user and annotates the media objects 120 based at least in part on user-based instructions 130. The annotation component 110 readily yields annotated media objects 140, which can be employed by the user in order to facilitate browsing, sorting, clustering, and the like of any number of media objects.

The user-based instructions 130 may correspond to the user's preferences and/or facilitate generating metadata (data about data) which is to be associated with the media objects 120. Generally, metadata is information about a file that can be located separate from the file or as part of the file. Examples, of metadata are date information regarding the file, developer information, modification information, file type information . . . . The metadata facilitates rapid classification of file types to facilitate efficient working with a plurality of files. As such, media objects 120 annotated with metadata are significantly easier to work with on a large scale as compared to un-annotated media objects. The subject invention provides unique system(s) and method(s) to effect such annotation as well as unique applications of such system(s) and method(s) to generate and use the annotated media objects. It is to be appreciated that the subject invention contemplates employment of static as well as dynamic metadata. The media objects 120 can be maintained and visualized in a media display component (not shown) and selected there from for annotation according to user-based instructions 130. The user-based instructions 130 may be provided to the system 100 via an optional user selection or pointing device component (not shown) such as a mouse, a keyboard, a joystick, a pen-ink recognition device, and/or a game pad.

According to one implementation, the media objects available for annotation and manipulation are maintained in a database. The contents of the database are displayed pictorially for the user in the media display component. More specifically, for example, images corresponding to the respective media objects are displayed and viewable by the user. The image can be a reproduction of the actual media object (e.g., photograph, picture) or can be representative of the media object (e.g., album cover for a video cliplet of a concert; image of artist for a song, videotape box cover, etc.).

Due to physical attributes of the media display component (e.g., screen size) and/or user preferences, the dimensions of each image, and thus its viewable size, may increase or decrease depending on the number of media objects present or selected for viewing. That is, the media display component optimizes the image dimensions depending on the number of media objects present for viewing. To view one media object in greater detail, a user may enlarge the object by positioning the user selection component thereover. For even greater detail, the user may "double-click" on it, if using a mouse, or perform a related action for any other type of user selection component employed.

Selection of the desired media objects which are to be annotated may be performed in any number of motions by the user. For instance, more than one media object may be highlighted at a time by a click and drag motion over the desired media objects. The command "control-click" while sweeping the pointer device over the media objects highlights many without also enlarging any of the highlighted media objects. To highlight media objects individually or one at time, selection may be made one click on the object.

The annotation component 110 may be interfaced with any number of bins and/or categories, both of which are described in further detail below. Bins are work spaces for facilitating the rapid annotation of media objects which means that they may be created and deleted quickly and easily and used effectively even by a novice user. A bin is created by a simple keystroke of a number. For example, to create a first bin, the user may strike or select the number "1" on a keyboard. If any media objects are highlighted just prior to creating the "1" bin, then those media objects are moved to the "1" bin. Such movement of the media objects may be viewed by the user via animation sequences, which are discussed below in greater detail.

The bins may also be labeled according to the media objects included therein. Such labeling may or may not be equivalent to a piece of metadata and thus annotation of metadata by way of the labeling may or may not occur. Multiple bins may be created and maintained. Media objects may be included in more than one bin and/or category. A relationship is maintained between media objects in the bins, category filters and in the main database. This is evidenced by a highlighting effect. For example, when mousing over a category filter, the media objects associated therewith are highlighted in the display area. Similarly, when mousing over a bin, the media objects included therein are highlighted in the database to demonstrate the continuity of the media objects between the various working areas.

Category filters behave similarly as traditional filters in that they facilitate the focusing of media objects. Media objects placed in the category filters are also annotated with the metadata associated with the categories. Categories may be easily created and deleted according to the user's preferences. In addition, each category may have one or more sub-categories which are viewable after selecting the category. For example, when selecting and/or "clicking" on a category, the media objects associated therewith are maximized in the viewable space while all other media objects are removed from the viewable space. The movement and/or rearrangement of the media objects may be visualized through animation sequence(s) discussed infra. More detailed information regarding bins, categories and their interactions with the media objects is described below in the following figures.

It is to be appreciated that the user-based instructions (e.g., to facilitate directing annotation of the media objects) are intended to include instructions provided via classifier(s) (e.g., explicitly and/or implicitly trained). Accordingly, as media object(s) 120 are received by the system 100, the system can automatically group, merge, file, annotate the media object(s) 120 based at least in part upon employment of classifier(s). Thus, the system 100 with a properly tuned classifier can greatly facilitate working with the media object(s) 120 in accordance with the subject invention.

Figure 2:
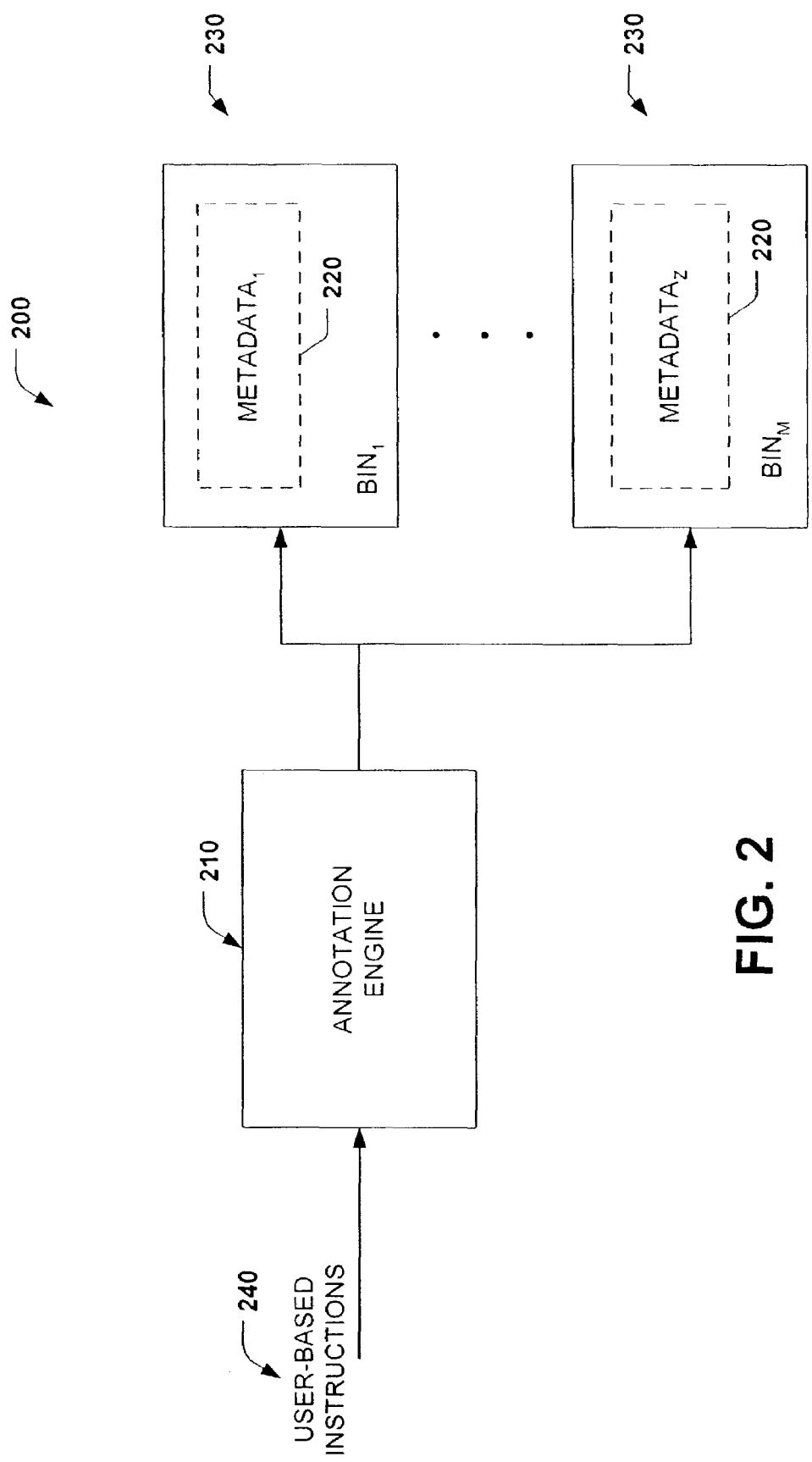
FIG. 2 is a block diagram of a media annotation system in accordance with another aspect of the present invention.

FIG. 2 depicts a media annotation system 200 in accordance with an aspect of the present invention. The media annotation system 200 includes an annotation engine 210 which operates by attaching any suitable number/amount of metadata 220 (e.g., METADATA$_1$ 222 to METADATA$_Z$ 224) to any number of bins 230 (e.g., BIN$_1$ 232 to BIN$_M$ 234) as designated by a user or user-based instructions 240. It is to be appreciated that the metadata can be independent, respectively, as well as nested, clustered, linked . . . to facilitate annotating media objects in accordance with the subject invention. User-based instructions 240 are provided to the annotation engine 210; and the annotation engine can process these instructions 240 to generate and/or obtain metadata 220 and associate the metadata 220 with respective bins 230. The annotation engine 210 can generate metadata, for example, based at least in part upon the instructions 240 as well as via historical information, inference, and other extrinsic data. As media objects are subsequently placed in the bins 230, the associated metadata 220 can attach to the media objects as a group or en masse which is easier and faster than annotating each individual media object separately. The group annotation of metadata can be selective according to the user's preferences. Moreover, annotation en masse of media objects facilitates rapid access and/or retrieval of the media objects in a random manner, such as while performing a search for desired media objects based at least in part upon the metadata associated therewith.

It is to be appreciated that if desired, the subject invention can employ bins to tag objects with metadata individually. Furthermore, it is to be appreciated that bin(s) 230 can be employed to attach metadata in a serial manner based at least in part upon a variety of predefined and/or dynamically generated protocols/schemes. For example, a single bin could be employed to attach differing subsets of metadata, respectively to various objects placed within a bin. A first media object placed in a bin with an Nth media object (N being an integer) could respectively be annotated with a first subset of metadata and a Mth subset of metadata (M being an integer).

Although not shown, it should be appreciated that one and/or more than one metadata 220 may be associated with a bin 230. Furthermore, it should be understood that one or more than one bin 230 may be created depending on the user's preferences and instructions.

Alternatively or in addition, the annotation engine can operate according to learned behavior or in an automated fashion using artificial intelligence. For example, when media objects are introduced into or interface with the system 200, the annotation engine 210 can automatically extract metadata such as intrinsic metadata from the media objects and order the media objects based at least in part on the intrinsic metadata. The annotation engine 210 can also perform an analysis of the media objects based at least in part upon any one of content, pattern recognition, face detection, and like. Subsequently, the annotation engine 210 can generate and/or obtain metadata relating to such characteristics without requiring constant instructions from the user—thus, the annotation engine 210 can exhibit learned behavior (e.g., based at least in part on previous input provided by the user, or training—explicit as well as implicit).

Accordingly, for example, the system 200 can receive a set of pictures and annotate the respective pictures with metadata that identifies individual(s) within the pictures and relationship(s) among the individual(s)—the identification of the individual(s) can be based at least in part upon face recognition systems employed by the system 200. It should be readily apparent that any of a variety of analytical techniques for analyzing content of media objects can be employed with the annotation aspects of the subject invention to provide an extremely powerful tool for handling large amounts of media objects as well as for providing for a more rich and robust system (as compared to conventional system) for handling media objects at an extremely granular level that is highly scalable and optimizes use of valuable computational resources let alone user time.

In addition, the annotation engine 210 can facilitate searching through any number of media objects according to the metadata of at least one media object. In this instance, the annotation engine 210 can generate metadata "mom", for example based on at least one media object having mom's face and/or voice therein. The user can request to find other media objects having this "mom" attribute. Hence the annotation engine 210 facilitates browsing, clustering, sorting and rapid annotation of the clustered and sorted media objects. It is to be appreciated that nearest neighborhood techniques can be employed to expand the search capabilities. For example, searches can be conducted based upon metadata that are in close proximity to a selected metadata—the bases for proximity (e.g., in Euclidean space) can be predetermined and/or dynamic employing any variety of suitable benchmarks.

Figure 3:
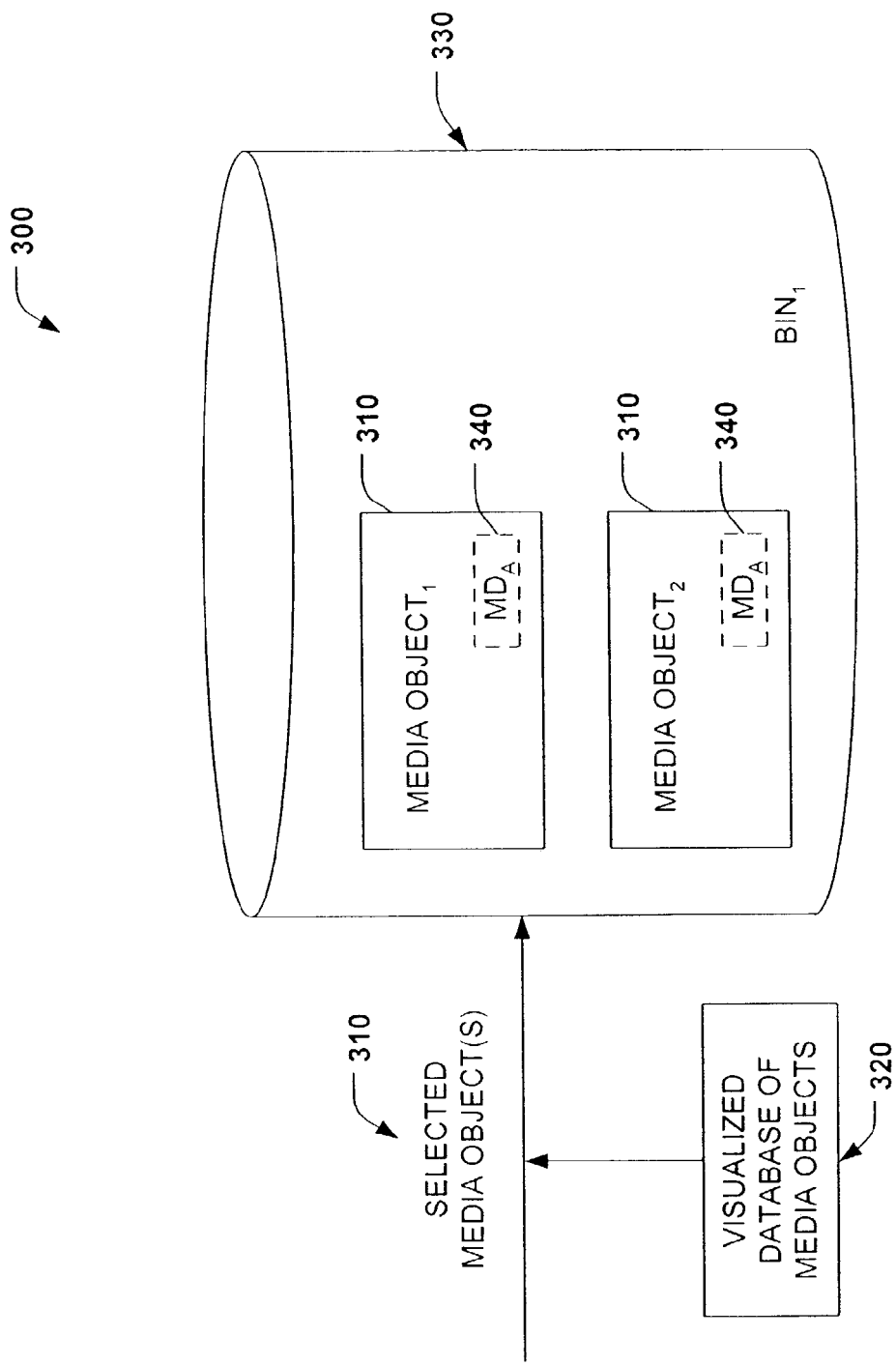
FIG. 3 is a block diagram of a media annotation system in accordance with yet another aspect of the present invention.

FIG. 3 illustrates a media annotation system 300 in accordance with another aspect of the present invention. The media annotation system 300 includes media objects 310 which can be selected from a visualized database 320 and placed into a bin 330 such as $BIN_1$. As demonstrated by the figure, the media objects 310 are annotated with metadata such as $MD_A$ 340. Although only two media objects 310 are represented in the figure, it should be appreciated that any suitable number of media objects 310 can be introduced into the bin 330 and annotated with any suitable amount of metadata 340 in a similar manner. As noted above, it is to be appreciated that a single bin can be employed to tag different media objects with differing subsets of metadata respectively. Such selective tagging can be based upon any suitable protocol/scheme (e.g., hierarchical-based, temporal-based, class-based, predefined . . . ).

When placed into the bin(s) 330, the media objects 310 can be maintained in their "original" form in the database 320. Thus, any further annotation or manipulation of the media object (e.g., by dropping into a bin) may be merely temporary such that the "original" version of the media object in the database 320 remains unaffected and not modified by the bin annotation. If desired, however, the bin(s) can be employed to permanently modify the media objects 310. Further, the bins can be deleted at any time as desired by the user. Therefore, if the bin is deleted, the annotated versions of the media objects therein may be discarded as well. Hence, the bins may constitute temporary work spaces for conducting rapid annotation, browsing, clustering, and sorting of the media objects. It is to be appreciated that a bin library can be employed storing previously generated bins (including metadata associations), which can be accessed in connection with manipulating a set of media objects. Additionally, the system 300 can include an attribute library that can be employed in connection with generating a bin and associating desired metadata with the bin.

It is also to be appreciated that the system can employ techniques such as data fusion to dynamically learn correlations among media objects grouped together in a bin and generate metadata corresponding to the correlations. The present invention may thus employ data fusion in situations in order to take advantage of information fission which may be inherent to a grouping of objects. Because complete details of phenomena being analyzed may not be contained within a single window of observation as to the objects, there can be information fragmentation which results from this fission process. These information fragments may include both independent and dependent components. The independent components may be used to further fill out (or span) an information space and the dependent components may be employed in combination to improve the quality of common information recognizing that all data may be subject to error and/or noise. In this context, data fusion techniques employed in the present invention can include algorithmic processing of data in order to compensate for the inherent fragmentation of information because a particular phenomena may not be observed directly using a single window of observation. Thus, data fusion can provide a suitable framework to facilitate condensing, combining, evaluating and interpreting available analyzed information in the context of a particular application in order to infer or derive attribute information not directly measurable or ascertainable. For example, a user may feel that a group of media objects are associated with each other, but not cognitively recognize why; and the data fusion aspect of the subject invention can be employed to learn corollaries with respect to the grouping and generate corresponding metadata which can be used for tagging the present set of media objects as well as identify new media objects that should belong to the grouping. It is to be appreciated that such learning can be employed in connection with a classifier for training thereof (e.g., to facilitate searching).

As noted supra, alternatively and according to user preference, bin annotation of the media object 310 may be more permanent such that the original version of the media object in the database 320 may also be modified by the bin annotation and remain as such even after the bin has been discarded. That is, the media objects 310 may be more permanently annotated with the metadata 340. For example, bin annotations of metadata may be programmed to remain attached to the media objects for a desired period of time or during designated applications invoked by the user. The annotated media objects can also be saved in their annotated state (as well as in their "original" or non-annotated state) as desired by the user. Thus, the bin annotation of metadata can be either temporary or persistent in view of the user's preferences.

Figure 4:
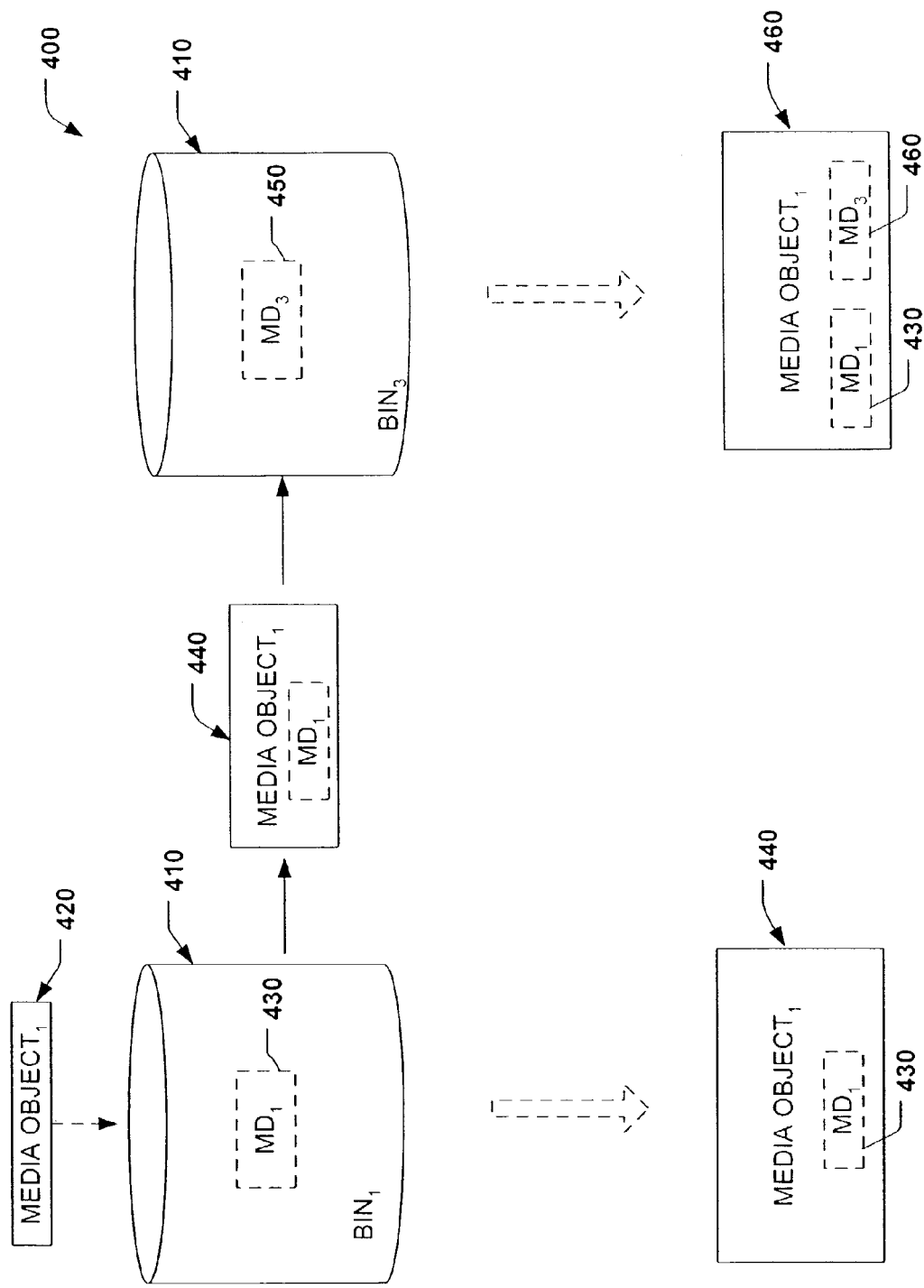
FIG. 4 is a block diagram of a media annotation system in accordance with still another aspect of the present invention.

Referring now to FIG. 4, a media annotation system 400 is demonstrated in accordance with an aspect of the present invention. The media annotation system 400 includes any number of bins 410 such as $BIN_1$ ($410_1$) and $BIN_3$ ($410_3$)—it is understood that the number of bins depicted is merely for illustrative purposes, and that any suitable number of bins can be employed. As shown, MEDIA OBJECT$_1$ 420 is dropped into the bin $410_1$ and annotated with metadata $MD_1$ 430. Annotated MEDIA OBJECT$_1$ 440 is produced as shown. Subsequently, the MEDIA OBJECT$_1$ 420 can be removed from the $BIN_1$. Upon being removed from the $BIN_1$, the MEDIA OBJECT$_1$ 440 does or does not remain annotated with metadata $MD_1$ 430, depending on a user's instructions. The MEDIA OBJECT$_1$ 440 may then be dropped into $BIN_3$, with which metadata $MD_3$ 450 is associated. Thus, the media object$_1$ 440 is annotated with metadata $MD_3$ 450 as well to yield MEDIA OBJECT$_1$ 460. Moreover, the metadata can continually build on or within a media object until or unless the metadata are manually or automatically removed. It is to be appreciated that various metadata can also include code to remove, modify or augment metadata already associated with an object.

Figure 5:
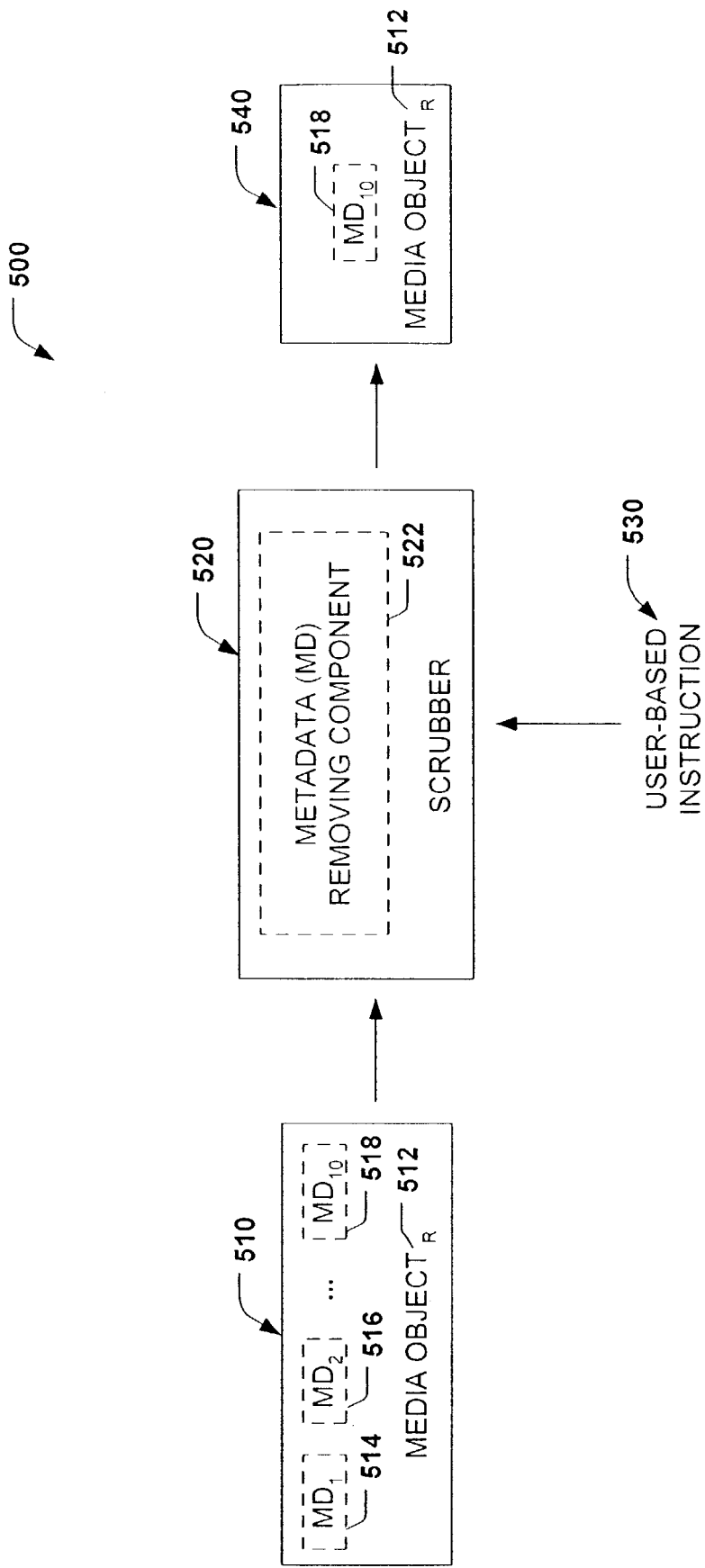
FIG. 5 is a block diagram of a media annotation system in accordance with an aspect of the present invention.

FIG. 5 depicts a media annotation system 500 in accordance with an aspect of the present invention. The media annotation system 500 includes an annotated media object 510 which comprises a MEDIA OBJECT$_R$ 512 and metadata $MD_2$ 514, $MD_2$ 516 and up to $MD_{10}$ 518, for example. The media object 510 interfaces with a scrubber 520 which facilitates distilling the most pertinent metadata associated with the media object 510 apart from the other metadata.

The scrubber 520 comprises a metadata removing component 522 that removes extraneous metadata which have been tagged to the media object 510 through various object/ bin annotations and manipulations. The metadata removing component 522 determines which metadata to remove based at least in part on user-based instructions 530. The system yields media object 540 comprising the MEDIA OBJECT$_R$ 512 annotated with merely metadata MD$_{10}$ 518 as a result of the scrubber's operation(s). Although, the scrubber 520 has facilitated the removal of all except one metadata, it should be understood that additional metadata may remain tagged to the MEDIA OBJECT$_R$ 512 as long as at least one metadata is removed from the MEDIA OBJECT$_R$ 512 as desired. Further, it should be appreciated that any number of metadata may be initially attached to the MEDIA OBJECT$_R$ 512 prior to interfacing with the scrubber 520. The scrubber 520 for example could be employed to remove properties associated with a set of documents and/or images as well as reset the properties (e.g., thus including bin-like functionality).

The scrubber 520 can include a variety of filters (not shown) that can facilitate selective removing of undesired metadata from an object while keeping intact desired metadata. The scrubber 520 can be tailored as desired by a user to view metadata associated with a media object and/or bin and remove or add metadata thereto as desired. It is to be appreciated that the scrubber can also be used to modify/update existing metadata with updated attributes (e.g., Jane Doe changing from her maiden name to Jane Smith). It is also to be appreciated that the scrubber can perform compression on an existing metadata set so as not to necessarily remove the metadata but make more efficient use of storage capabilities.

FIG. 6 illustrates a media annotation system 600 in accordance with yet another aspect of the present invention. The media annotation system 600 includes one media object 610 or a group comprising of more than one media objects 610 that are selected to be dropped, moved or placed into or obtained by a bin 620 such as BIN$_K$. The media object(s) 610 may be placed in more than one bin 620 as well. According to user input, metadata 630 MD$_1$ 632 and/or any number of metadata MD$_Z$ 634 is associated with the bin 620. When the media object(s) 610 are placed into the bin 620, the metadata 630 attach to the media object(s) 610 en masse, thereby resulting in annotated media object(s) 640 as shown. It is to be appreciated that a first bin can be dropped into a second bin so as to impart the characteristics of the first bin to the second bin. Furthermore, such functionality can make use of filters to provide for selective transfer of bin attributes.

FIG. 7 represents a media annotation system 700 in accordance with yet another aspect of the present invention which is similar to the system 600 described above in FIG. 6. However, the system 700 in FIG. 7 has a few characteristics distinct from the system 600 (FIG. 6). The media annotation system 700 also includes a bin 710 in which one or more media objects 720 may be dropped. When the media objects 720 are placed into the bin 710, a media object analyzer and annotation component 730 is employed to analyze the media objects 720 in order to generate and/or obain metadata suitable for the media objects. Analysis of the media objects can include content analysis, pattern/voice recognition, face detection, data fusion, and the like to facilitate extrapolating characteristics common to the media objects 720 situated in the bin 710.

Alternatively or in addition, the system 700 can also include a media specific analyzer component(s) 740 which interfaces with the media object analyzer and annotation component 730. The media-specific analyzer component(s) 740 can readily identify the types of media objects 720 in order to facilitate a more rapid and accurate analysis of the media objects 720. Multiple media-specific analyzer components 740 may be accessible to the system 700 according to the type of media objects 720 subjected to the system 700.

Moreover, annotated media objects 750 result in the bin 710. The annotated media objects 750 may have at least one metadata MD$_1$ 760 or more than one metadata MD$_Z$ 770 attached thereto. Though merely one bin 710 is depicted in the system 700, it should be appreciated that more than one bin and any number of bins may be employed.

Figure 8:
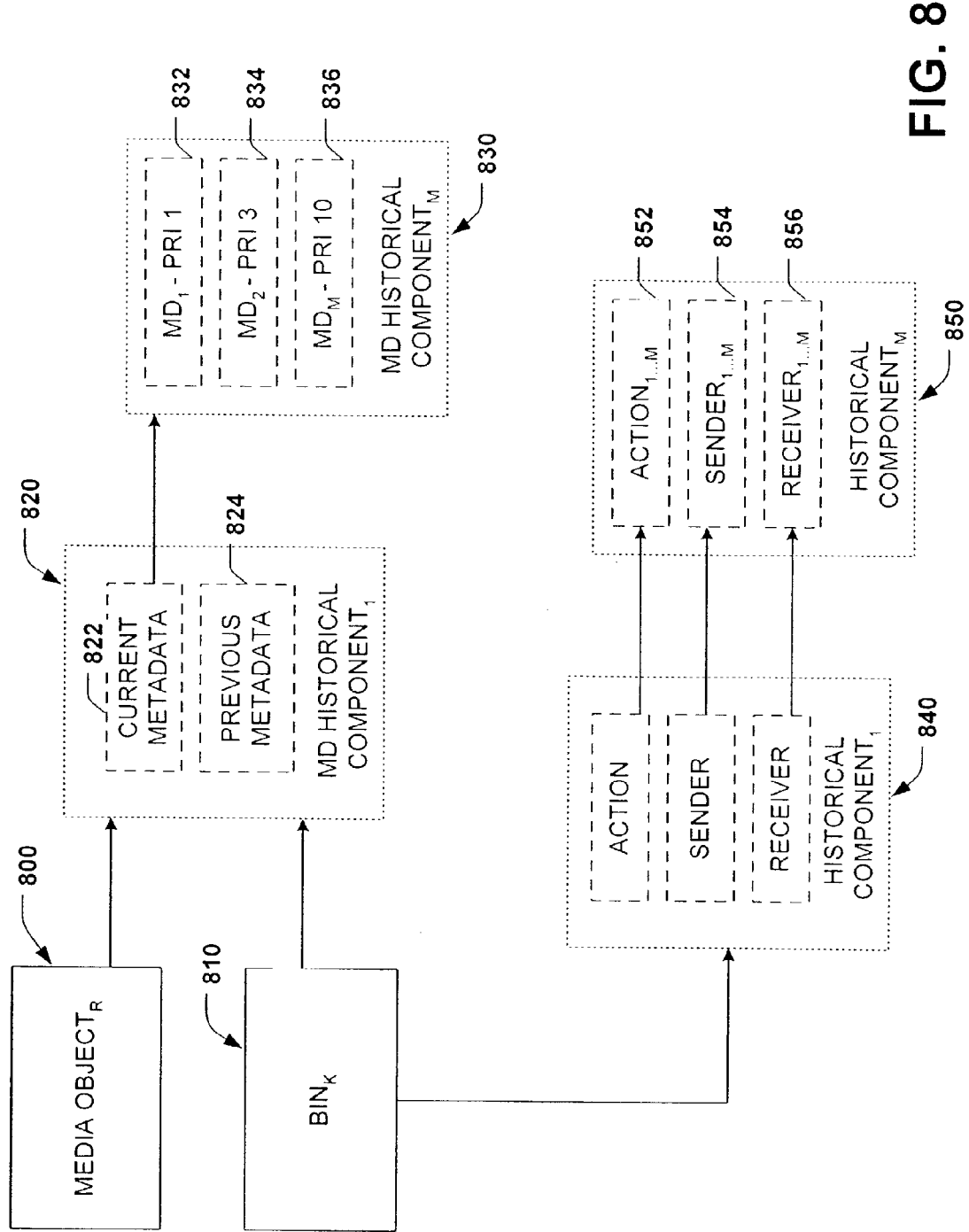
FIG. 8 is a block diagram of an exemplary media object in accordance with an aspect of the present invention.

Turning now to FIG. 8, an exemplary media object 800 (e.g., MEDIA OBJECT$_R$) and an exemplary bin 810 (e.g., BIN$_K$) as employed in a media annotation system described above in at least one of FIGS. 1–7 are illustrated in accordance with an aspect of the present invention. The media object 800 and/or the bin 810 can include a metadata historical component 820 (e.g., MD HISTORICAL COMPONENT$_1$) that tracks and records metadata which have been attached to and/or associated with the media object 800 and/or the bin 810, respectively. For example, the metadata historical component 820 may include a component that records current metadata 822 attached to the media object and a component that stores previous metadata 824 which have since been removed from the media object 800. The component 820 can for example populate a database with the acquired information so as to build a library as discussed supra. Moreover, the metadata historical component 820 can facilitate random access and/or retrieval to at least one media object 800, at least a subset of media objects, and/or a plurality of media objects.

In addition, the current metadata component 822 may be further expanded to a sub-metadata historical component 830 in order to provide a priority rating of each metadata (e.g., current 822 and/or previous 824 metadata). The priority rating may facilitate organization and/or placement of the bins and/or media objects on a visual display component. Priority ratings may be based at least in part on user instructions, use, frequency, importance, and the like. For example, the sub-metadata historical component 830 may rate metadata$_1$ with a highest priority of 1 (e.g., MD$_1$-PRI$_1$ 832. Other metadata associated with the media object and/or bin may be similarly denoted for instance as MD$_2$-PRI$_3$ 834 and MD$_M$-PRI$_{10}$ 836. Moreover, a classifier (e.g., Bayesian) can be employed to infer priorities associated with the media object(s) as well as metadata—the prioritization for example can employ a cost-benefit analysis, probabilistic-based analysis, statistical-based analysis, utility analysis, combinations therof or the like.

Since the bin(s) 810 may undergo a variety of manipulations and actions potentially by one or more users having access to the bin(s) 810, the bin(s) 810 can also include a bin historical component 840 that records substantially all activity involving the respective bin(s) 810. The bin historical component 840 can include one or more components which can provide information relating to any action(s) 842 performed including sender 842 and/or receiver 844 information where applicable. For example, the action component 842 may comprise action 1 up to action M (e.g., ACTION$_1 \ldots {}_M$ 852). The corresponding sender and/or receiver information may be similarly represented by SENDER$_1 \ldots {}_M$ 854 and RECEIVER$_1 \ldots {}_M$ 856 in HISTORICAL COMPONENT$_M$ 850. The historical components relating to the bins and/or the media objects may be accessed by a pop-up menu, for example, which is associated with each media object and/or each bin.

Figure 9:
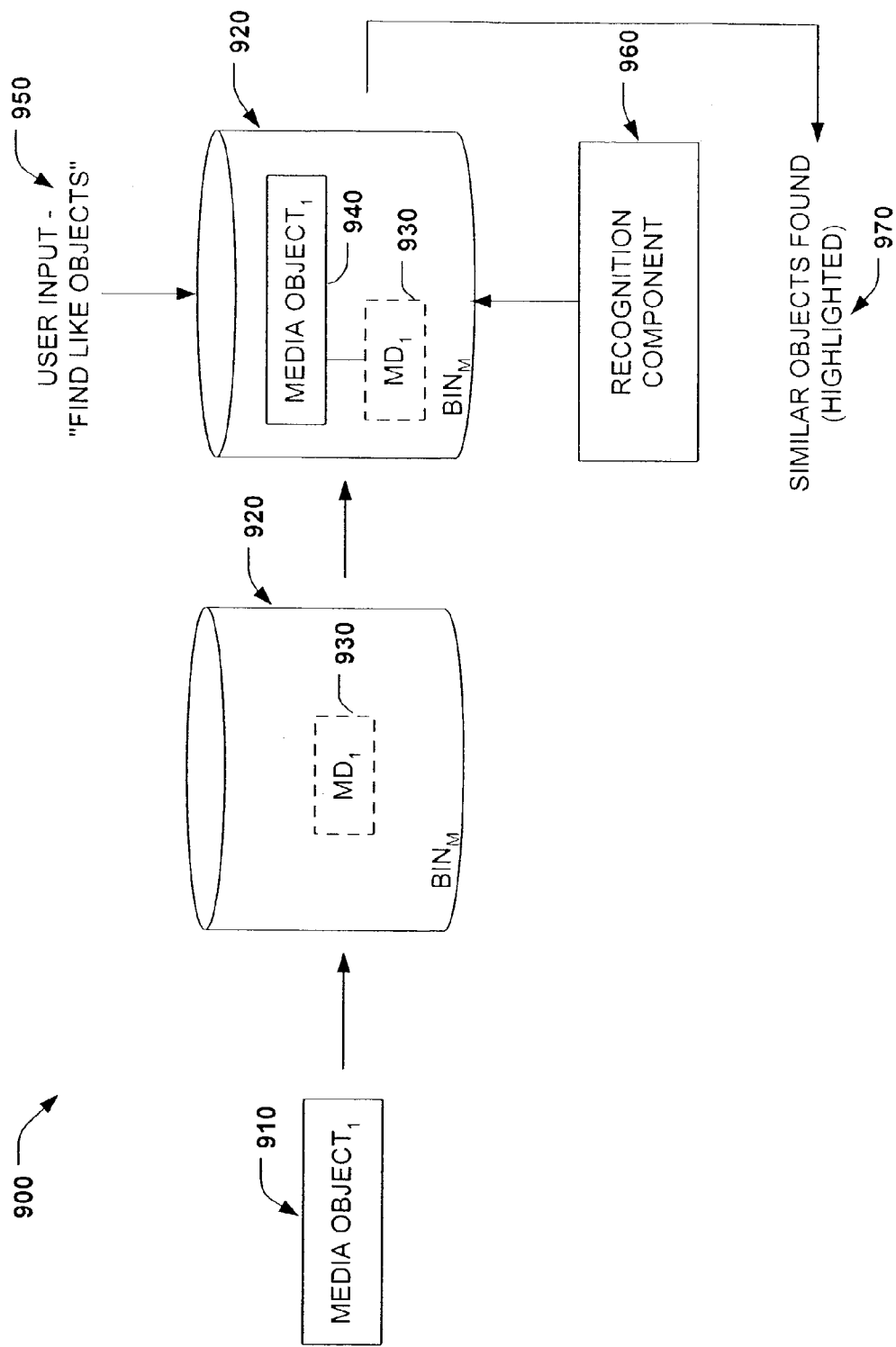
FIG. 9 is a block diagram of a media browser system in accordance with an aspect of the present invention.

In FIG. 9, a media browser system 900 by way of metadata annotation is illustrated in accordance with an aspect of the present invention. The media browser system 900 comprises media objects 910 and at least one media object 910 (e.g., MEDIA OBJECT$_1$) that is selected and placed into a bin 920 (e.g., $BIN_M$). The bin 920 has been associated with metadata $MD_1$ 930, for instance, thereby yielding annotated media object 940. The annotated media object 940 is essentially tagged with the metadata 930.

The media browser system 900 can facilitate browsing and searching for media objects related to the annotated media object 940 in the bin 920. Thus, user instructions 950 corresponding to "find like objects" or something of that effect may cause the system 900 to search through all other media objects in a database, for example, which are related to the annotated media object 940 based at least in part on the metadata 930 attached to the media object(s) 940. The searching and/or browsing of the database can be enhanced by employing a recognition component 960. The recognition component 960 can utilize face detection, voice and/or pattern detection, content analysis, context analysis, pen/ink recognition, etc. to extract intrinsic metadata information as well as content information about the available media objects. Similar or related objects 970 can be indicated to the user once determined. It is to be appreciated that such searching and/or browsing is not limited to media objects in other bins, but that the searching and/or browsing can be conducted across an intra-net, distributed network or even the Internet. For example, a media object could be dropped in a bin and the system can identify attributes associated with the media object (e.g., the identification can be based upon historical data, currently extracted data, combination thereof . . . ), and perform a search for objects across the Internet. The system 900 can provide links to the found objects as part of the search results, or even retrieve the objects (and place them in a search results bin for example). As a user sifts through the bin, and deletes unwanted objects found via the search, a classifier could be employed and implicitly trained using such deletion information to refine the system 900 so as to improve future searching and/or browsing.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 10:
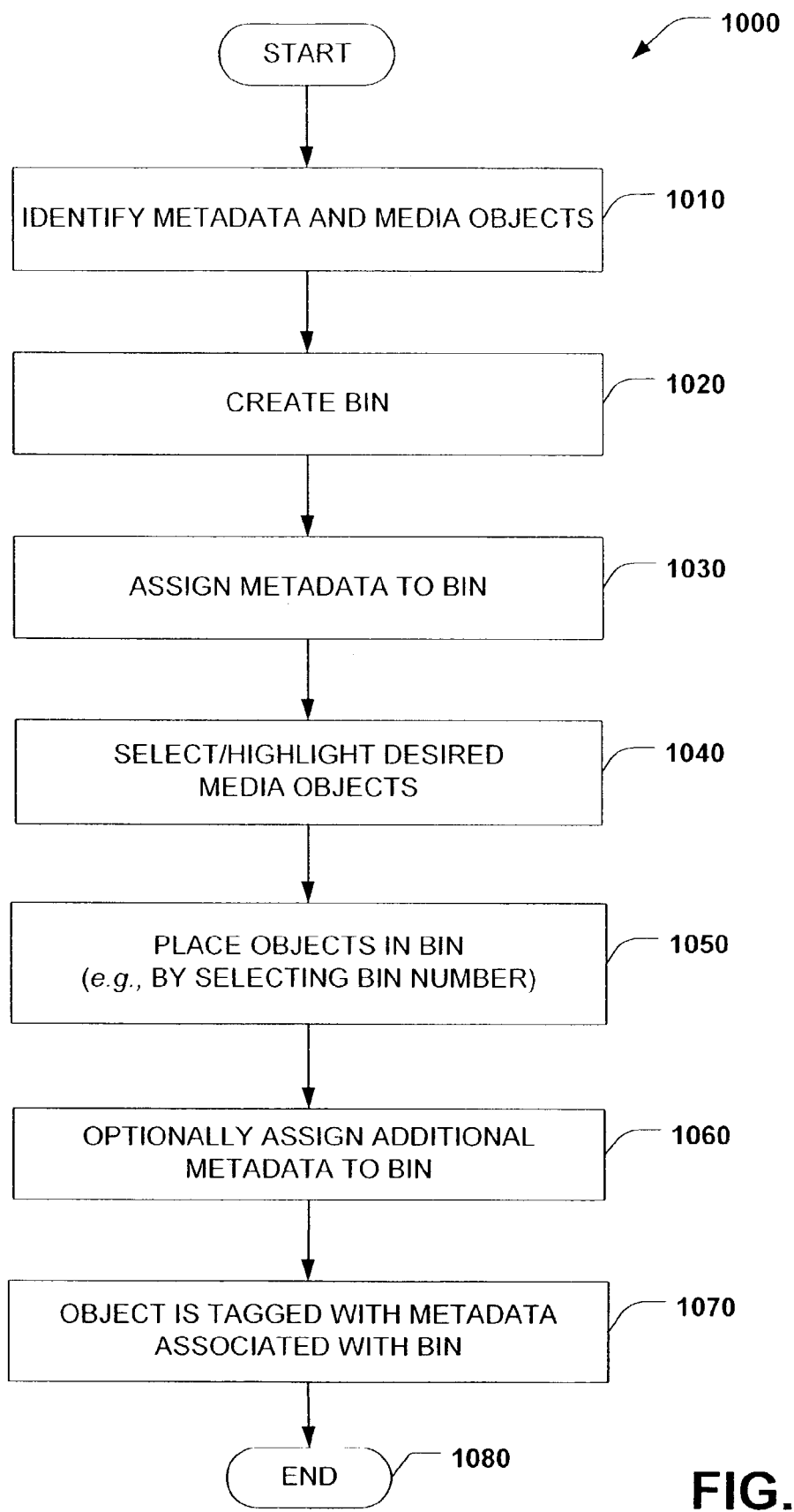
FIG. 10 is a flow chart illustrating an exemplary methodology for rapid annotation of media objects in accordance with an aspect of the present invention.

Referring now to FIG. 10, a flow diagram of an exemplary method 1000 that facilitates rapid annotation of any number of media objects is represented in accordance with an aspect of the present invention. The method 1000 begins at 1010 with receiving media objects to be subjected to the method 1000 and to generate any suitable number of metadata which relate to some aspect of at least one media object.

At 1020, one or more bins are created by key stroking any number (e.g., 1, 2, . . . 9). More detailed information is provided below on the creation of bins. At 1030, metadata is assigned or associated with one or more bins depending at least in part on a user's instructions. For example, metadata "birthday" can be assigned to the bin by way of a bin label for instance. This indicates to the user that the media objects in the "birthday" bin relate to a birthday.

At 1040, X number (X being an integer) of media objects are selected (e.g., highlighted) and placed in one or more bins at 1050. Placing the highlighted media objects into the desired bin can be performed by striking the desired bin number. For example, the user can strike the number key "1" to move the highlighted media objects to "bin #1". The movement of the media objects to the bins is discussed in further detail below. Once the media objects are in the bin(s), additional metadata can be assigned to the bin(s) at 1060. For example, metadata "dad" and "2002" can also be assigned to the bin to note that the media objects relate to or include "dad" in them and were created in 2002. At 1070, the media objects located in the bin(s) are annotated or tagged with the metadata associated with the bin(s). The method 1000 ends at 1080, however the act of annotating media objects can be repeated as desired by a user or system.

Figure 11:
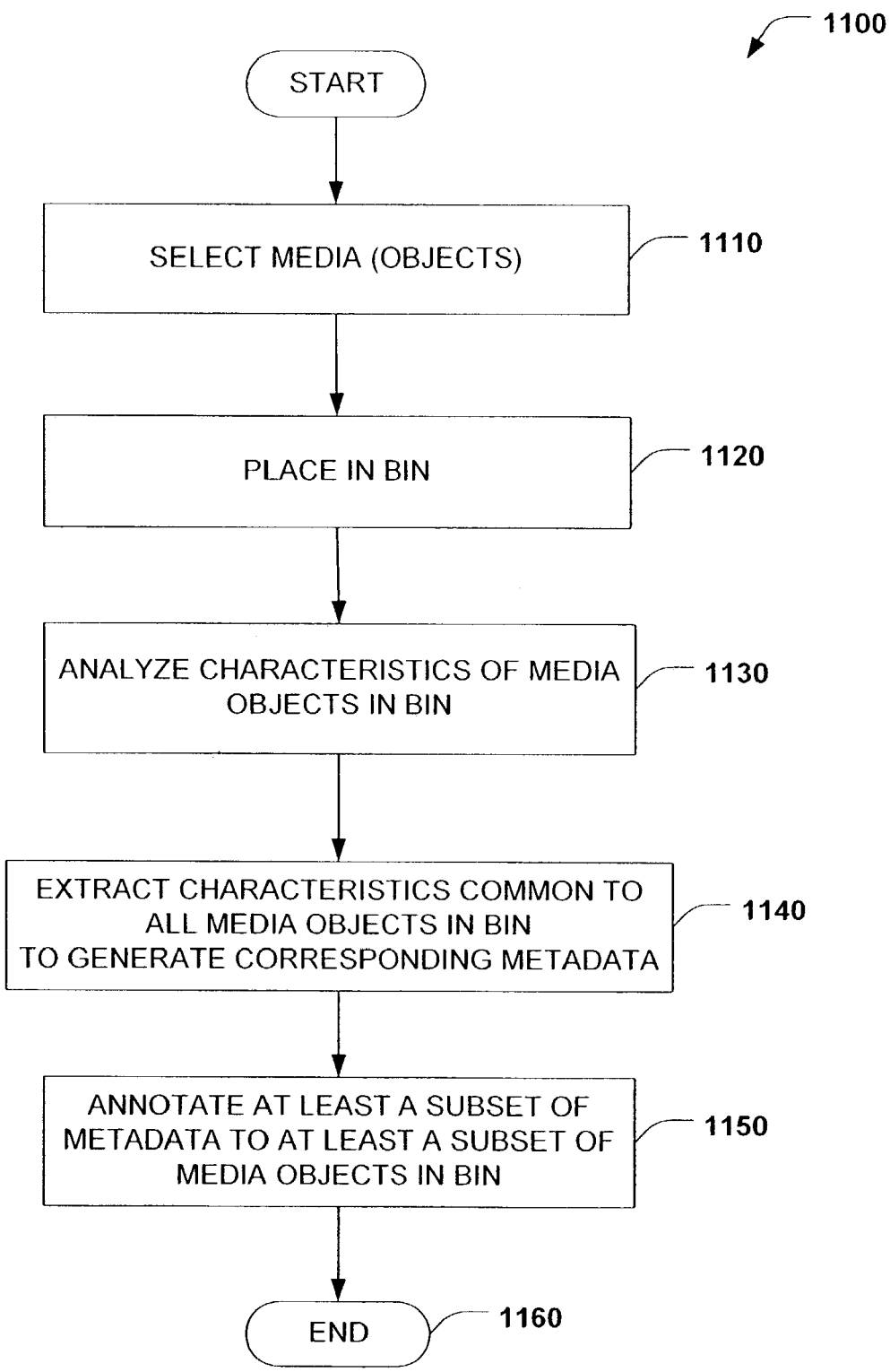
FIG. 11 is a flow chart illustrating another exemplary methodology for rapid annotation of any number of media objects in accordance with an aspect of the present invention.

FIG. 11 illustrates a flow diagram of an exemplary method 1100 for rapidly annotating media objects in accordance with another aspect of the present invention. The method 1100 begins with selecting media objects using a mouse component, for example, at 1110. At 1120, the media objects are placed in the desired bin(s). At 1130, the media objects placed in the bins are analyzed in order to determine characteristics of the media objects relating to content, creation date, length, and the like.

Characteristics common to all the media objects in the bin can be extracted in order to generate corresponding metadata at 1140. Generation of metadata can be accomplished in part manually by a user and/or automatically by various programmed components. At least a subset of the media objects in the bin can be annotated with at least a subset of the metadata at 1150 according to a user's instructions and/or preferences. At 1160, the method ends. However, the act of annotating additional media objects may continue and be repeated as necessary.

Figure 12:
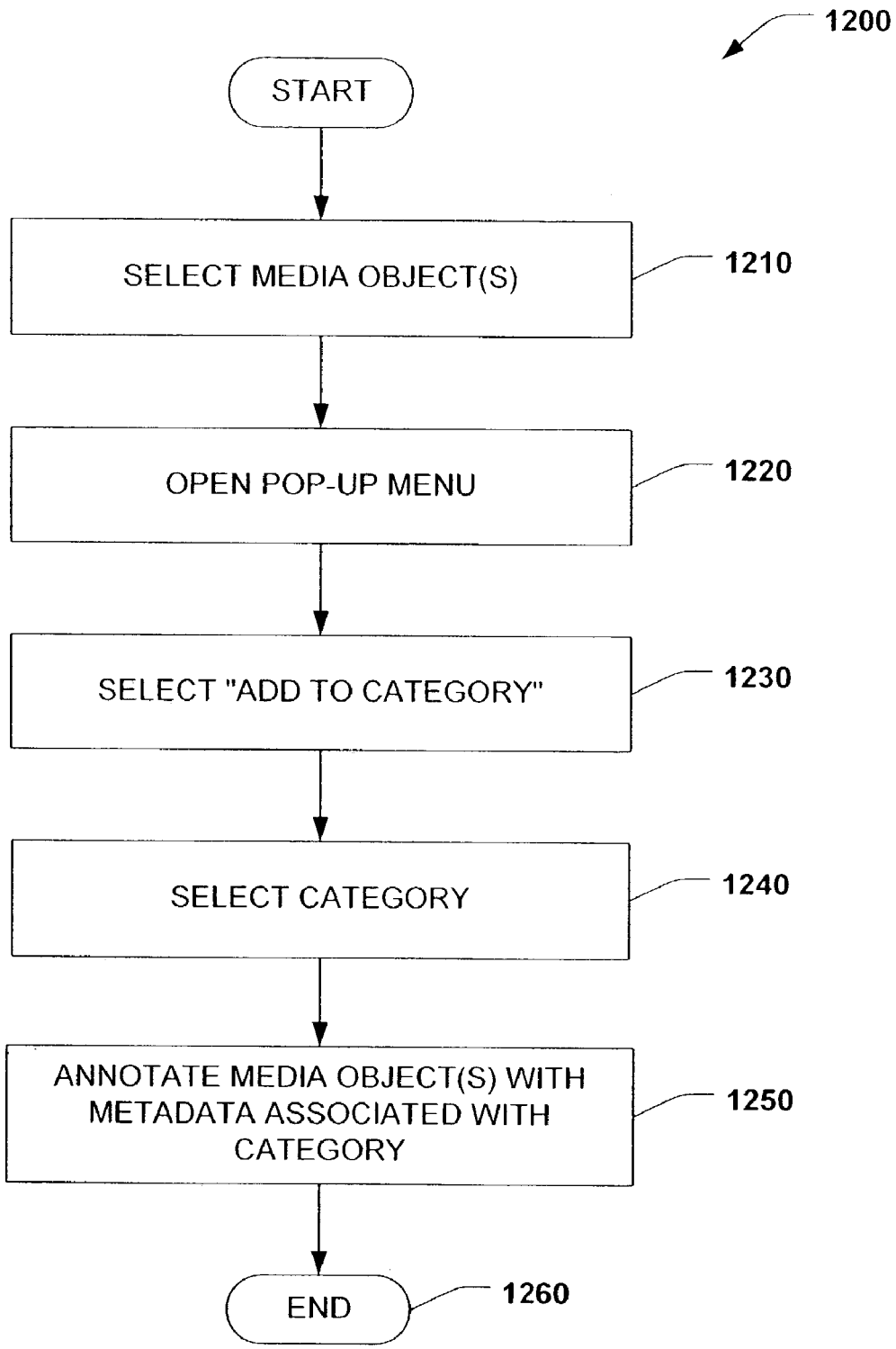
FIG. 12 is a flow chart illustrating an exemplary methodology for enhancing rapid annotation of a grouping of media objects in accordance with an aspect of the present invention.

FIG. 12 demonstrates a flow diagram of an exemplary method 1200 that enhances rapid annotation of at least one or a group of selected media objects in accordance with yet another aspect of the present invention. The method can initiate via selecting media object(s) at 1210. At 1220, a pop-up menu can be opened (e.g., by right-clicking on the selected media object(s)). The pop-up menu can include any number of options to choose, from which can result in an action performed on the selected media objects.

At 1230, an option is selected such as "add to category," for example. At 1240, an expanded list of categories can be presented as an expanded list. Category filters can be presented for example in a peripheral viewing space of a media display component or screen. Category filters can also have metadata associated therewith and such metadata can be identified by the name of the category. Categories are discussed in greater detail below. At 1250, the selected media objects are annotated with the metadata associated with the selected category and a copy of the media object is assigned to the category filter as well.

It should be understood that although selected media objects are placed, dropped or moved to bins and/or categories, an "original" version of the media objects can be maintained in a visual database display area. The original version of the media object may or may not be already annotated with intrinsic metadata such as creation date, length, content type, and the like. Furthermore, media objects in the visual database display area may or may not be modified by any subsequent annotation of extrinsic metadata, depending on the user and the desired application.

Figure 13:
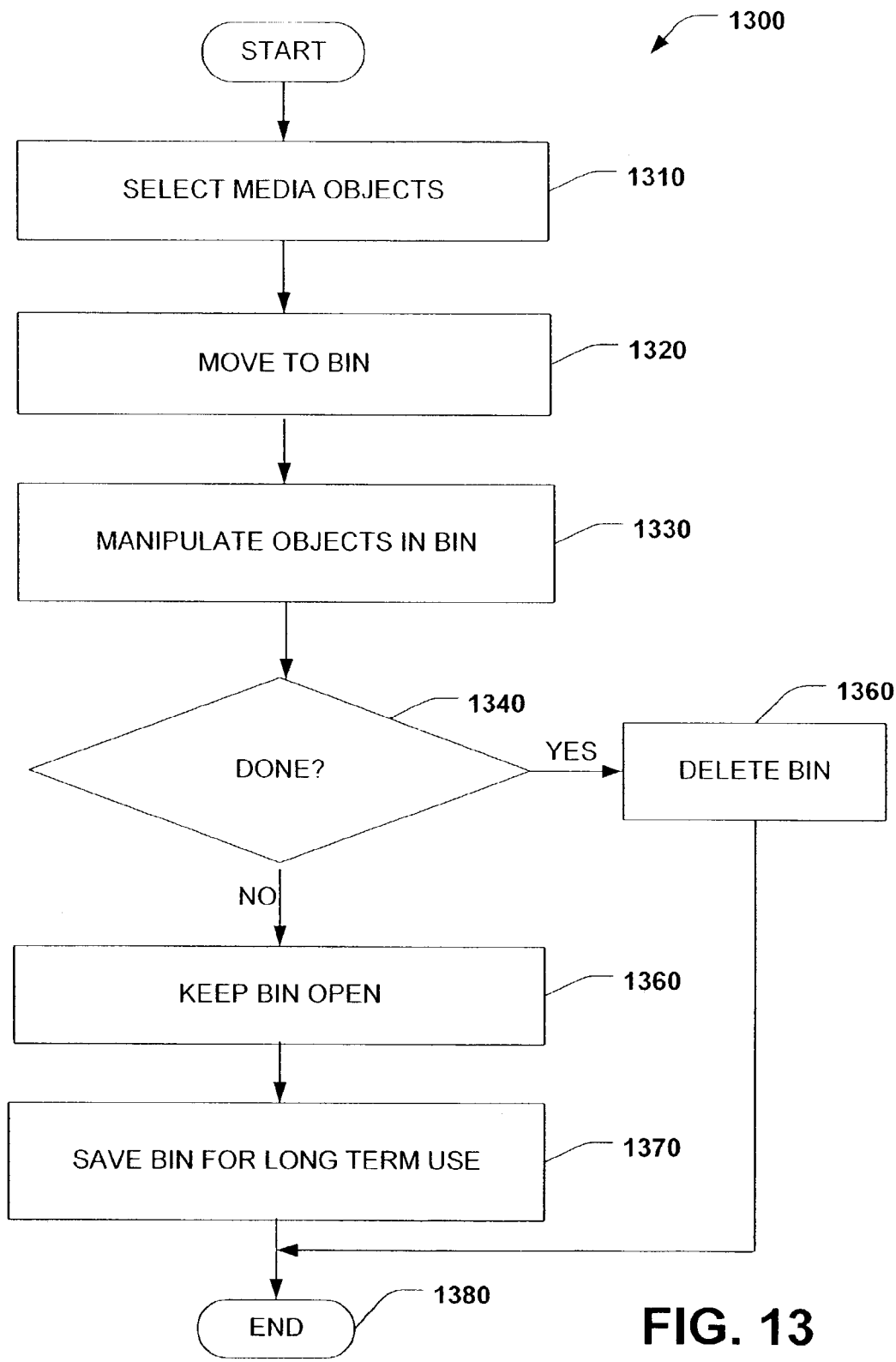
FIG. 13 is a flow chart illustrating an exemplary methodology for facilitating rapid annotation and visualization of media objects in accordance with an aspect of the present invention.

FIG. 13 depicts a flow diagram of an exemplary method 1300 that facilitates rapid group annotation of any number of media objects and the visualization of such in accordance with an aspect of the present invention. The method 1300 begins with selecting media object(s) at 1310. At 1320, the selected media objects are moved to a designated bin. The media objects in the bin can be annotated and undergo further manipulations in the bin at 1330. Examples of manipulations include altering the orientation of the object(s), emailing the object(s), deleting the object(s) and/or the bin, adding the object(s) to a side-bar category, viewing a slideshow of the objects, making a movie of the objects, moving the object(s) to another bin, hiding the object(s) or the bin from other users, and securing the object(s) and/or bin from manipulation by other users by password protection and other related security techniques. Viewing the metadata history of current and previous metadata attached to the media object may be another option available to the user.

If the manipulations are done and no further manipulations are desired at 1340, then at 1350, the bin may be deleted. The objects annotated with metadata associated with that bin will be deleted as well; however, the objects are still maintained in the database in their form prior to annotation in any bin or category. If the manipulations are not done, then at 1360 the bin can be kept open and/or accessible to the user. In addition, the bin can be saved at 1370 for later use.

Figure 14:
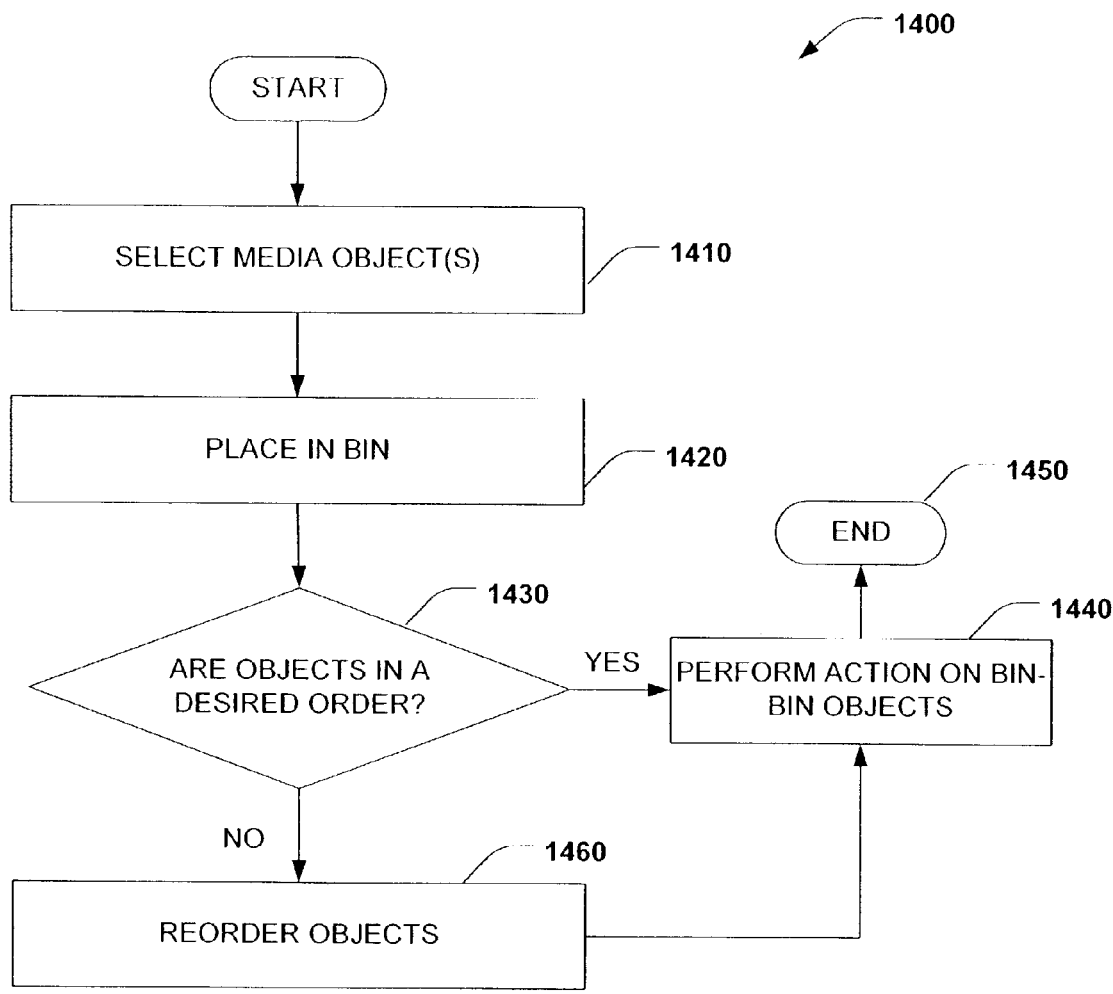
FIG. 14 is a flow chart illustrating an exemplary methodology for manipulating selected media objects in accordance with an aspect of the present invention.

FIG. 14 illustrates a flow diagram of an exemplary method 1400 that facilitates manipulating any number of media objects which have been placed in a bin in the process of annotating, grouping, clustering and/or sorting them. The method begins at 1410 with selecting the media objects and placing them in their appropriate bins at 1420. At 1430, a user may need to determine whether the media objects are in a desired order before any action on the media objects is performed. If they are in an order desired by the user, the action can be performed on the media objects in the bin at 1440; and the method ends at 1450. However, if the objects are not in their desired order, a user can manually re-order them accordingly or the re-ordering may be done automatically at 1460 based at least in part on user-based instruction(s). Once the objects are reordered as desired, the action on the item(s) can be performed at 1440.

In one implementation, the bins can be employed as a creating or mixing tool. In particular, media objects can be spliced together, either temporarily or more permanently, in order to create something new from any number of "old" media objects. For example, the bin may contain video of "mom", "mom's" favorite songs, photographs of at least mom, mom's voice, and the like, which all share the metadata "mom". By ordering them and then selecting to view a slideshow or make a movie of the mom media objects, a new media object relating to mom is created. For instance, her favorite songs may be playing in the background during such movie or slideshow. Thus, the bins facilitate editing and/or creating new media objects based at least in part on portions of or whole annotated media objects. Further, because the bins allow for the annotation of cliplets, sounds bytes, partial streaming video, etc., lengthy video streams, audio files and the like may be broken down relatively quickly and easily.

For example, a two-hour video recording taken on a family vacation of mom and other family members may be rapidly broken down into any number of media objects. Those media objects annotated with "mom" may be annotated en masse and then employed in creating a slide show tribute to Mom. Thus, the two-hour long video recording may be randomly searched and portions thereof accessed for a quick annotation. Hence, linear searching through the video recording for portions including mom, which would otherwise be required, are no longer necessary in view of the present invention. Furthermore, the bin can be trained to automatically to correlate video with audio in order to capture more relevant and meaningful portions of the video and audio and to eliminate or mitigate undesirable pauses and breaks in the video and audio.

It is to be appreciated that such aspect of the subject invention provides for numerous functions. For example, multiple and disparate objects can be placed in a bin, and the invention can automatically generate a collage of the items. Such collage can be generated randomly as well as with some predetermined and/or in situ determined order. Such aspect of the invention can also employ data fusion to identify corollaries between objects placed in a bin where such corollaries are not known and/or completely known as discussed supra with respect to FIG. 3.

Figure 15:
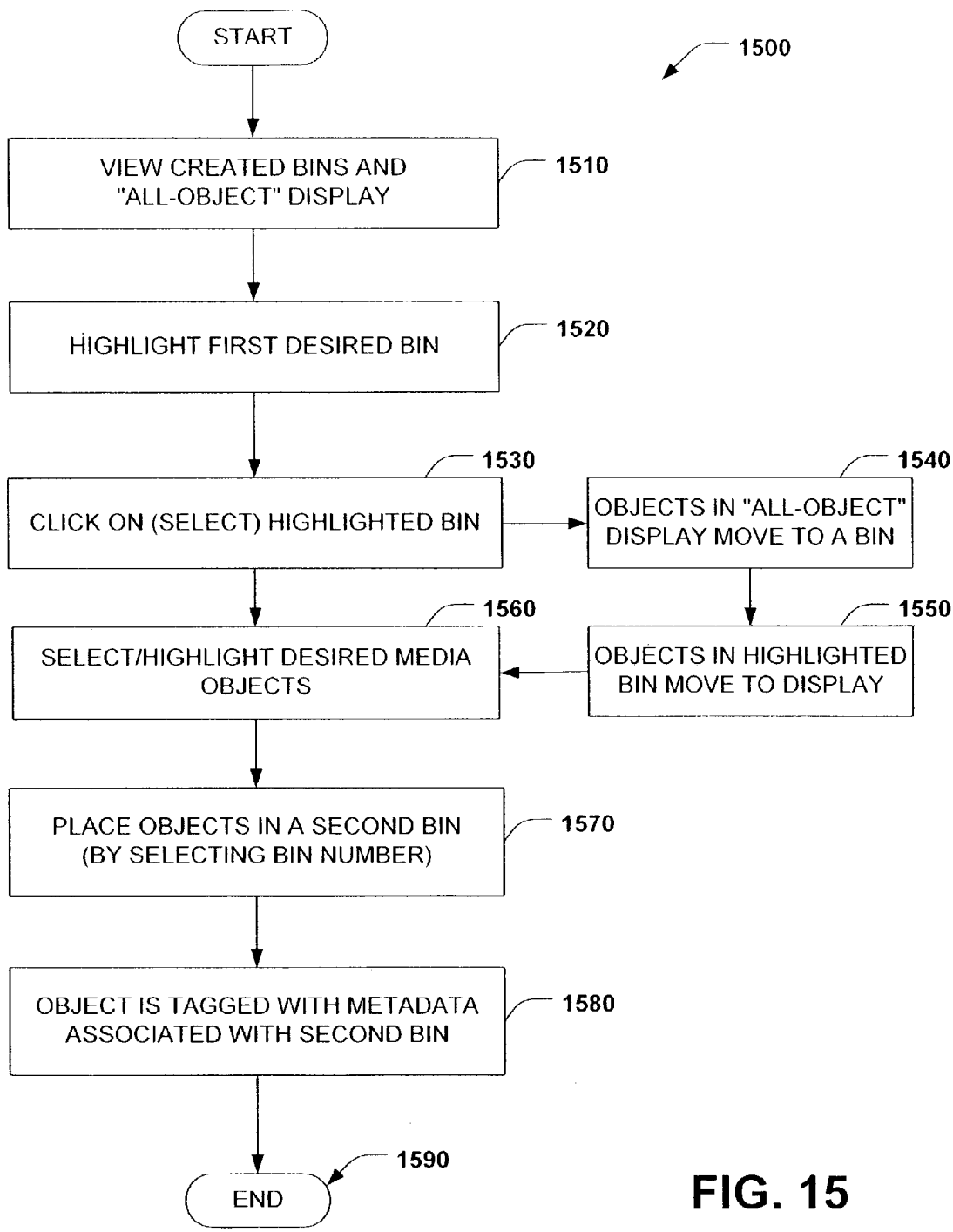
FIG. 15 is a flow chart illustrating an exemplary methodology of optimizing visualization and manipulation of selected media objects in accordance with an aspect of the present invention.

FIG. 15 is a flow diagram of an exemplary method 1500 that optimizes visualization and manipulations of media objects which have been placed into bin(s) in accordance with an aspect of the present invention. The method 1500 begins at 1510 by viewing created bins including selected media objects therein and a visual display component including a database showing media objects available for manipulation.

At 1520, a first desired bin can be selected (by highlighting) in order to perform further actions on the bin and the media objects therein. At 1530, a user can select the highlighted bin using a pointing device component (e.g., mouse). Upon selecting the bin, all objects in the database move by way of animation from the visual display component to a bin designated for the database at 1540. At 1550, objects in the first bin move to the display component and thus are visually enlarged. The media objects may be manipulated by the user in the larger viewing space. In addition, any number of these media objects can be selected at 1560 and placed in at least a second bin at 1570 such that the media object(s) is effectively removed from the first bin. Consequently, the object(s) can be tagged with metadata associated with the second bin at 1580 and the metadata from the first bin may or may not be removed once the object is discarded from the respective bin, depending on the user's instructions. The method 1500 ends at 1590 but may be repeated with any number of media objects as desired.

Figure 16:
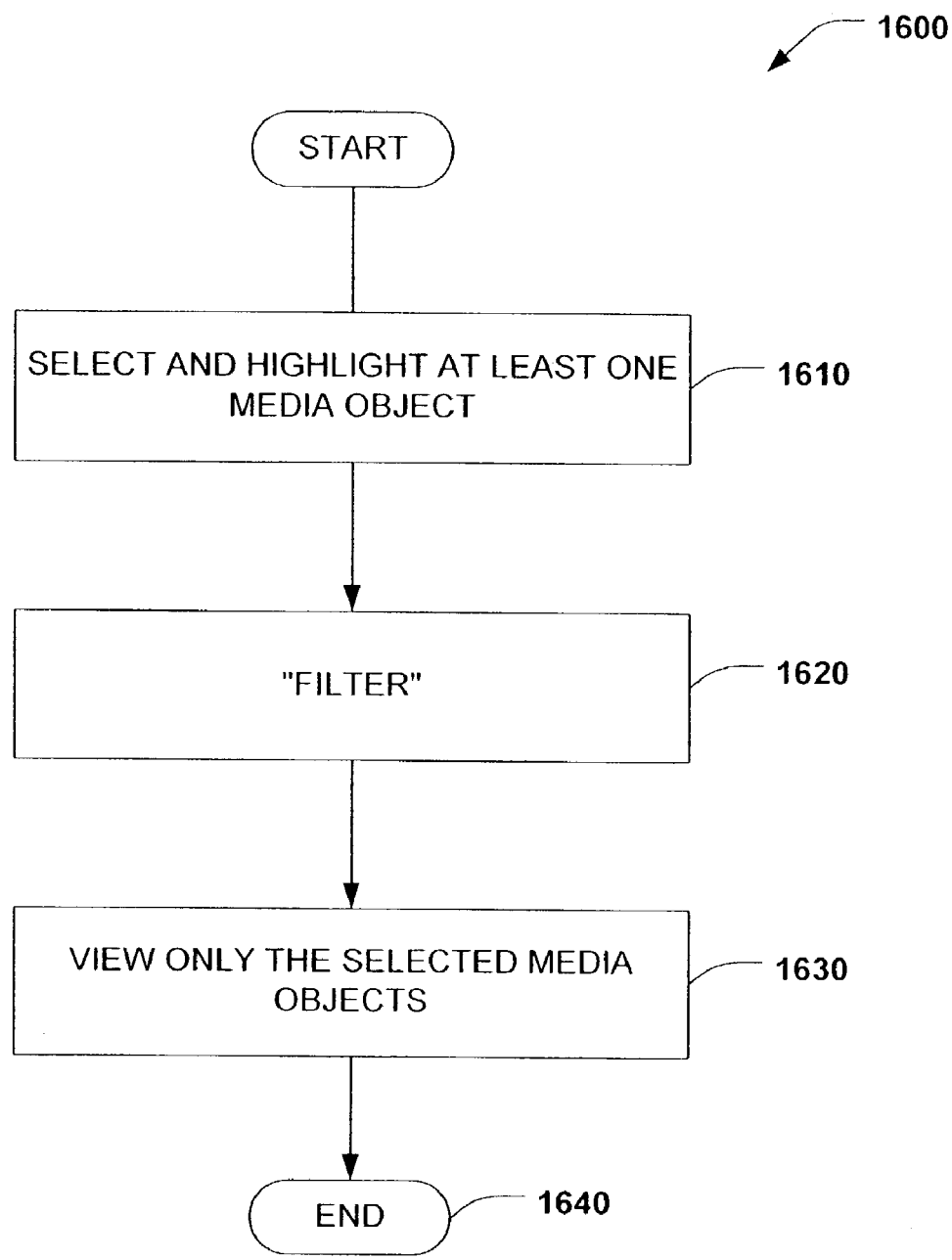
FIG. 16 is a flow chart illustrating an exemplary methodology that facilitates browsing, clustering, grouping, and sorting of any number of media objects in accordance with an aspect of the present invention.

FIG. 16 illustrates a flow diagram of an exemplary method 1600 that facilitates browsing, clustering, grouping, and sorting of any number of media objects in accordance with an aspect of the present invention. At 1610, the method 1600 begins with selecting at least one media object. At 1620, a "filter" or the like command can be employed, thereby removing all other media objects except for the selected media object(s) at 1630. The method 1600 ends at 1640. The filter command facilitates focusing of media objects, thereby providing enhanced browsing, clustering and sorting of the media objects. Alternatively or in addition, an "inverse" option can be employed, thus selecting all other media objects and de-selecting the object(s) initially selected by the user. Employing the "filter" command again would hence lead to the opposite result of media objects remaining to be viewed.

Figure 17:
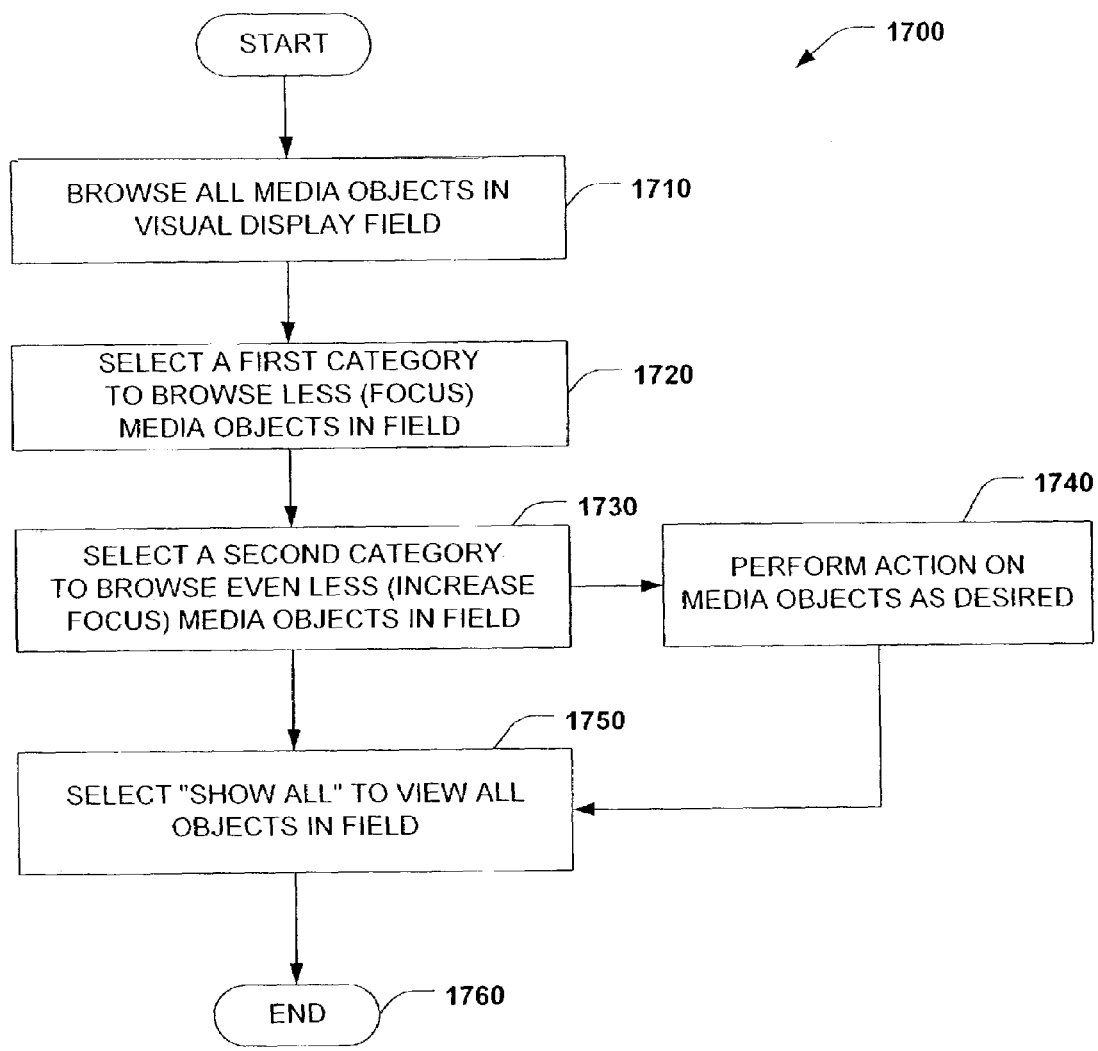
FIG. 17 is a flow chart illustrating another exemplary methodology that facilitates browsing, clustering, grouping, and sorting of any number of media objects in accordance with an aspect of the present invention.

FIG. 17 depicts a flow diagram of an exemplary method 1700 that facilitates browsing, clustering, grouping, and sorting of any number of media objects in accordance with another aspect of the present invention. The method 1700 begins by browsing through all media objects in a database visualized in a display area of a media display component (e.g., screen) at 1710. Any number of category filters can be associated with the database and appear in the media display component as well. At 1720, a first category filter is selected in order to focus on media objects in that category. For example, only those media objects associated with the selected category are viewed in the display area, thereby decreasing the number of media objects available for browsing. All other objects disappear from the media display component (in an animation sequence, discussed infra). The resulting media objects can be associated with a smaller set of categories or attributes. Those category filters appear in the display area.

At 1730, a second category filter may be selected to focus further on media objects in that selected category. Thus, even fewer media objects are available for browsing. As the number of media objects to view and browse decreases, the size of the media objects can increase proportionately in order to promote easier viewing of the individual media objects. Any suitable action can be performed on the focused set of media objects as desired at 1740.

In order to visualize the media objects again, a command that makes all or substantially all media objects accessible again in the display field (e.g., "show all") may be selected, thus ending the method at 1750. It should be appreciated that the selection of category filters may continue until a desired grouping of or individual media object is visualized or until the array of category filters remaining does not permit further focusing of the media objects. More detail is provided below with respect to utilizing category filters in this described manner.

Alternatively or in addition, the category filters can be employed as another tool to facilitate browsing, sorting, clustering, and the like when filtering is not desired by a user.

FIGS. 18–61 which follow below illustrate exemplary visualizations for carrying out at least one aspect of the present invention as described above in FIGS. 1–17. It should be appreciated that the arrangement and/or configuration of the various elements and components illustrated below are not intended to limit the scope of this application. Rather, such arrangements are merely demonstrative and any other configurations of the components suitable to carry out the present invention are contemplated to fall within the scope of the present invention.

In general for FIGS. 18–44, a block diagram of a media display component in accordance with an aspect of the present invention will be described and then discussion of an exemplary user interface corresponding to the particular media display component shall follow.

Figure 18:
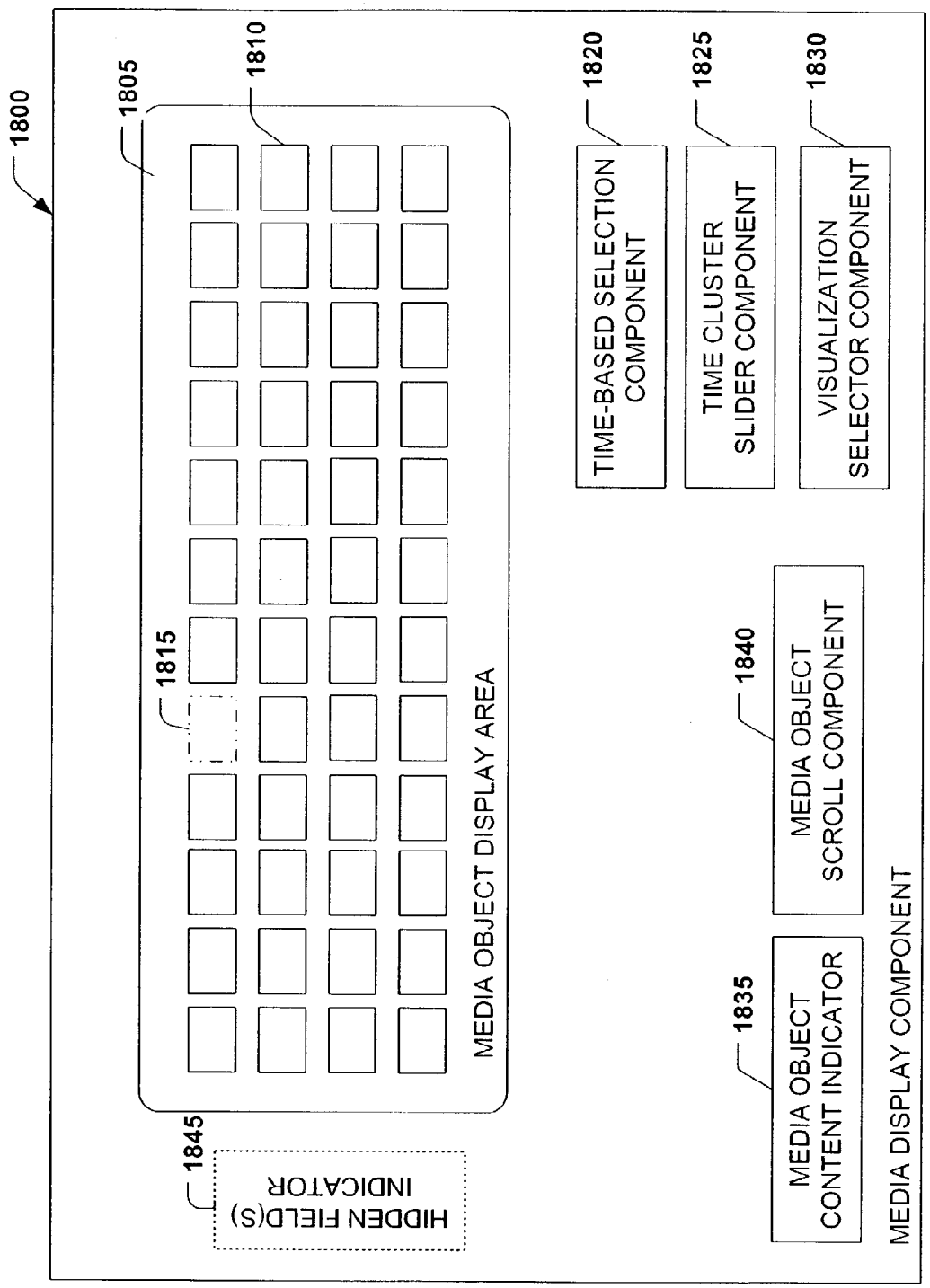
FIG. 18 is a block diagram of a media display component in accordance with an aspect of the present invention.

Referring to FIG. 18, an exemplary media display component 1800 in accordance with an aspect of the present invention is depicted. The media display component 1800 includes a media object display area 1805 that provides a visual guide of a database of media objects 1810 available and accessible to the user for subsequent annotation, browsing, clustering, filtering and/or sorting. Any number of media objects 1810 may be included in the database and viewed in the display area 1805. When the user desires to select one or more media objects, the selected media object(s) appear highlighted. A highlighted media object 1815 is illustrated as having a dashed-and-dotted border.

The component 1800 also includes a time-based selection component 1820, a time cluster slider component 1825 and a variable view component 1830. The time-based selection component 1820 highlights media objects 1810 based at least in part upon a date and/or time metadata associated with each respective media object 1810. The time cluster slider component 1825 facilitates browsing media objects 1810 that are clustered by date and/or time metadata.

The visualization selector component 1830 allows the user to switch or toggle between at least two viewing perspectives which may be referred to as stacked view and raster view, for example. Raster view displays each media object as a whole without overlapping of the media objects from a two-dimensional perspective. The media objects 1810 are shown in raster view. Stacked view creates a three-dimensional perspective of the media objects which can be clustered into groupings based on similar date/time metadata. The time cluster slider component 1825 may facilitate browsing and the like of the media objects when the media display component 1800 is toggled to the stacked view.

The media display component 1800 can also include a media object content indicator 1835 that specifies the types of media represented in the display area. For example, video may be indicated if video cliplets comprise at least one media object 1810 in the display area 1805. This may be useful to a user to quickly identify the types or content of media objects currently in the display area 1805.

An optional media object scrolling component 1840 can also be included in the media display component 1800. The scrolling component 1840 facilitates browsing through the display area 1805 particularly when not all of the media objects can be viewed in the display area 1805 at the same time.

In addition, the media display component 1800 can include a hidden field(s) indicator 1845 that signifies to the user that other working spaces may be available for use. For example, the user may desire to hide these field(s) in order to maximize the viewable size of the components and elements within the media display component 1800. Further, such field(s) may be hidden when not in use at the current time. Examples of the hidden fields include category filters which relate to the content and/or annotated metadata of the media objects such as "wedding", "vacation", "zoo", and "birthday". The media objects corresponding to one or more of these categories may be annotated with the respective metadata for those categories. Moreover, category filters facilitate focusing of media objects while any browsing, clustering, and sorting of them occurs.

Figure 19:
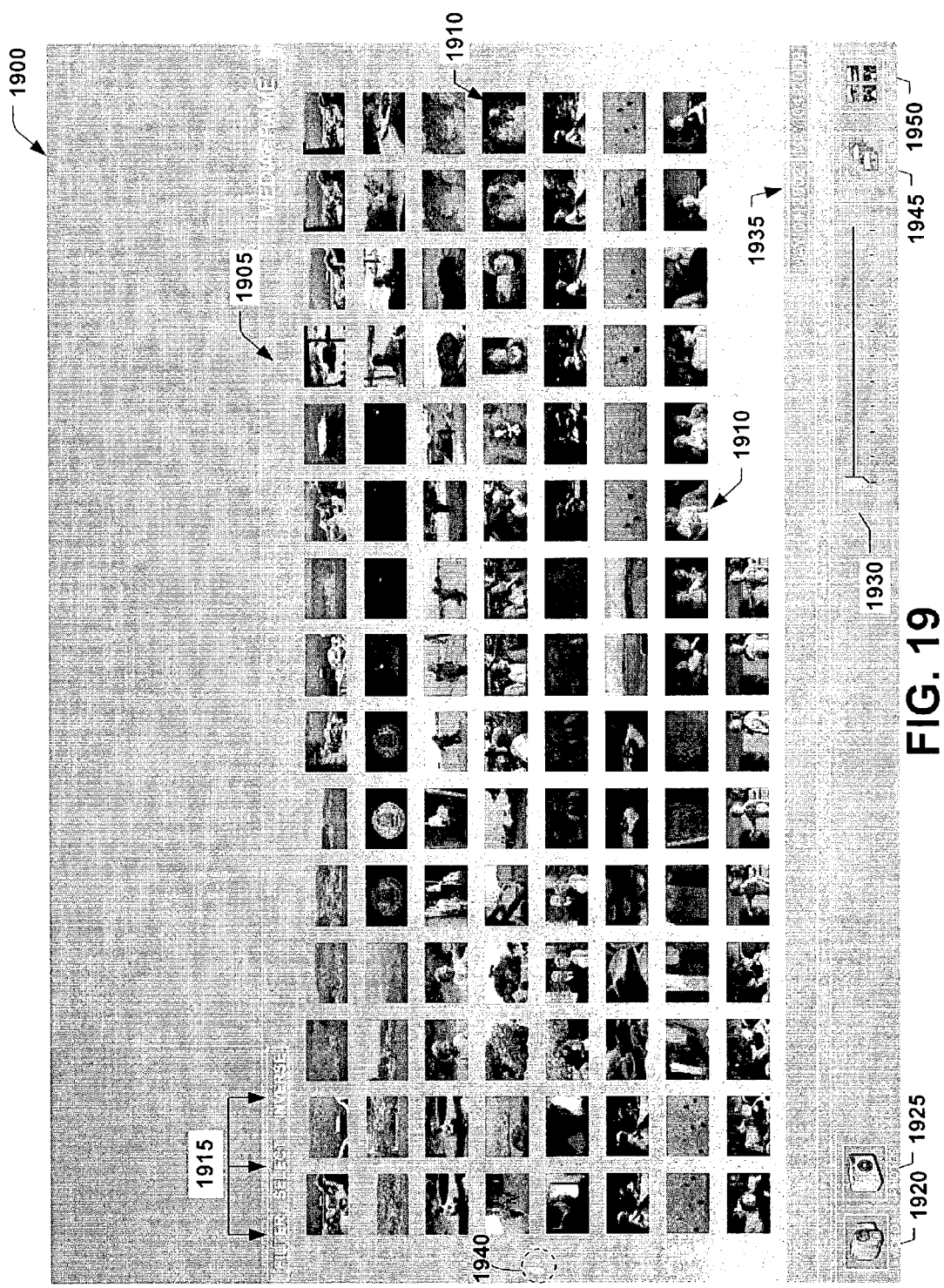
FIG. 19 is an exemplary user interface of the media display component of FIG. 18 in accordance with an aspect of the present invention.
Figure 20:
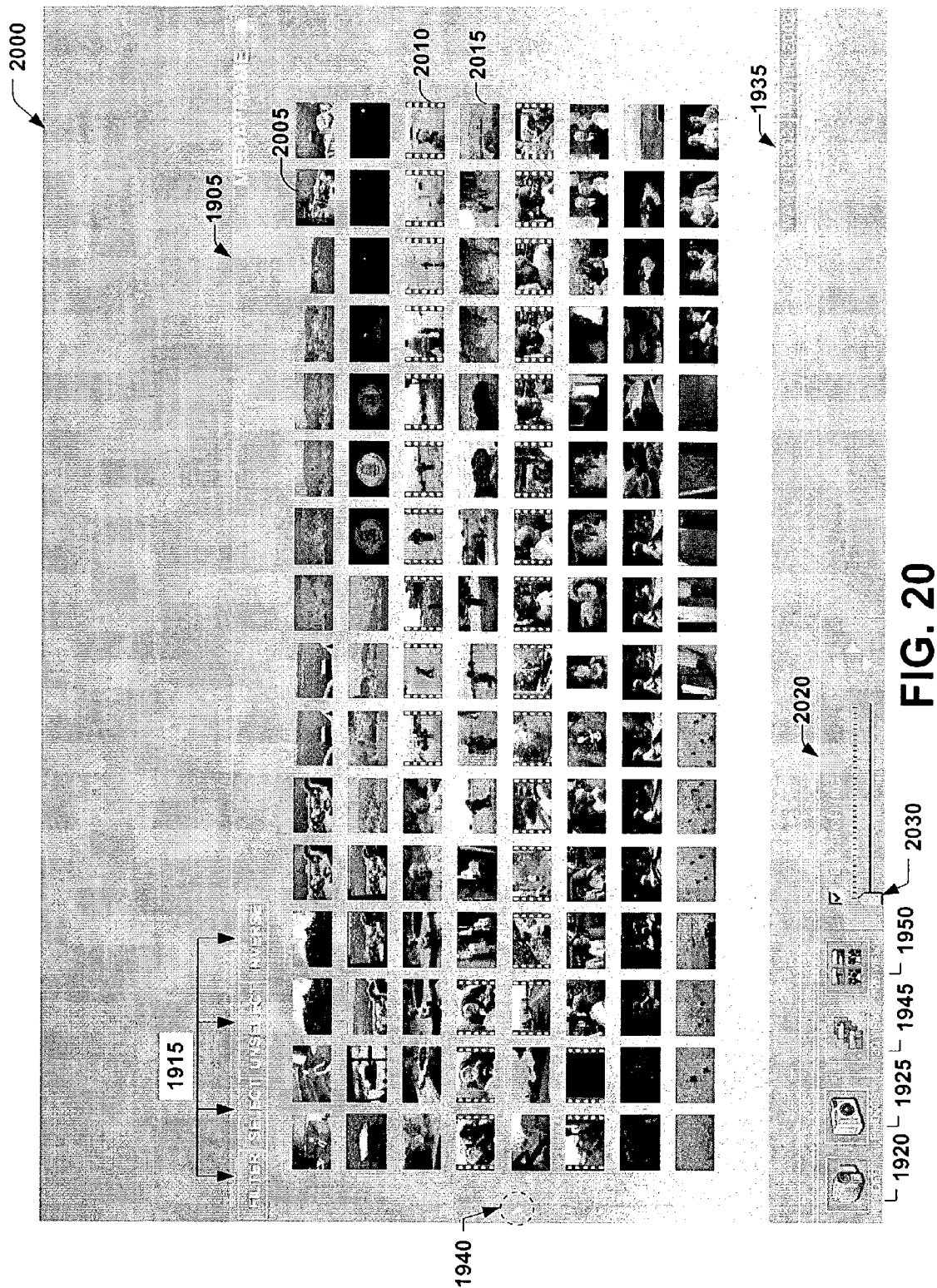
FIG. 20. is an exemplary user interface of the media display component of FIG. 18 in accordance with an aspect of the present invention.

FIGS. 19 and 20 are exemplary user interfaces 1900 and 2000, respectively, of a media display component 1800 as described in FIG. 18 in accordance with an aspect of the present invention. The user interface 1900 in FIG. 19 demonstrates one implementation of the media display component 1800. In particular, a media object display area 1905 comprises any number of media objects 1910. Commands 1915 such as filter $1915_1$, select $1915_2$, and inverse $1915_3$, to name a few, may be associated with the media object display area 1905 to facilitate browsing, clustering and sorting the media objects 1910.

In another area of the user interface 1900 are video 1920 and photos 1925 indicators that, when illuminated, specify the content of media objects present in the display area 1905. Also present in the user interface 1900 is a time clusters scroll bar 1930 which groups the media objects being viewed (e.g., in the display area 1905) into clusters sorted and arranged by the creation date and/or time of the media objects. The time-based scroll bar 1935 shows the end date corresponding to the media objects 1910 presently in the display area 1905.

Lastly, the user interface 1900 includes a hidden field indicator 1940, a stacked view indicator 1945 and a raster view indicator 1950. The media display area 1905 is currently in raster view 1950 (e.g., 2D view); thus that indicator is illuminated to signify the same.

User interface 2000 illustrates a media display component similar to the user interface 1900 described above in FIG.

19. As in FIG. 19, the user interface 2000 also includes media objects 2005, however the media objects 2005 comprise video 2010 as well as photographs 2015. Thus both the video 1920 and the photo 1925 indicators may be illuminated to signify that both types of media are present in the display area 1905.

The user interface 2000 also comprises a scroll bar 2020 for two-dimensional scrolling of the media object display area 1905. The scroll bar 2020 includes a slider for adjusting the size of the media objects 2005 while scrolling with the scroll bar 2020.

Figure 21:
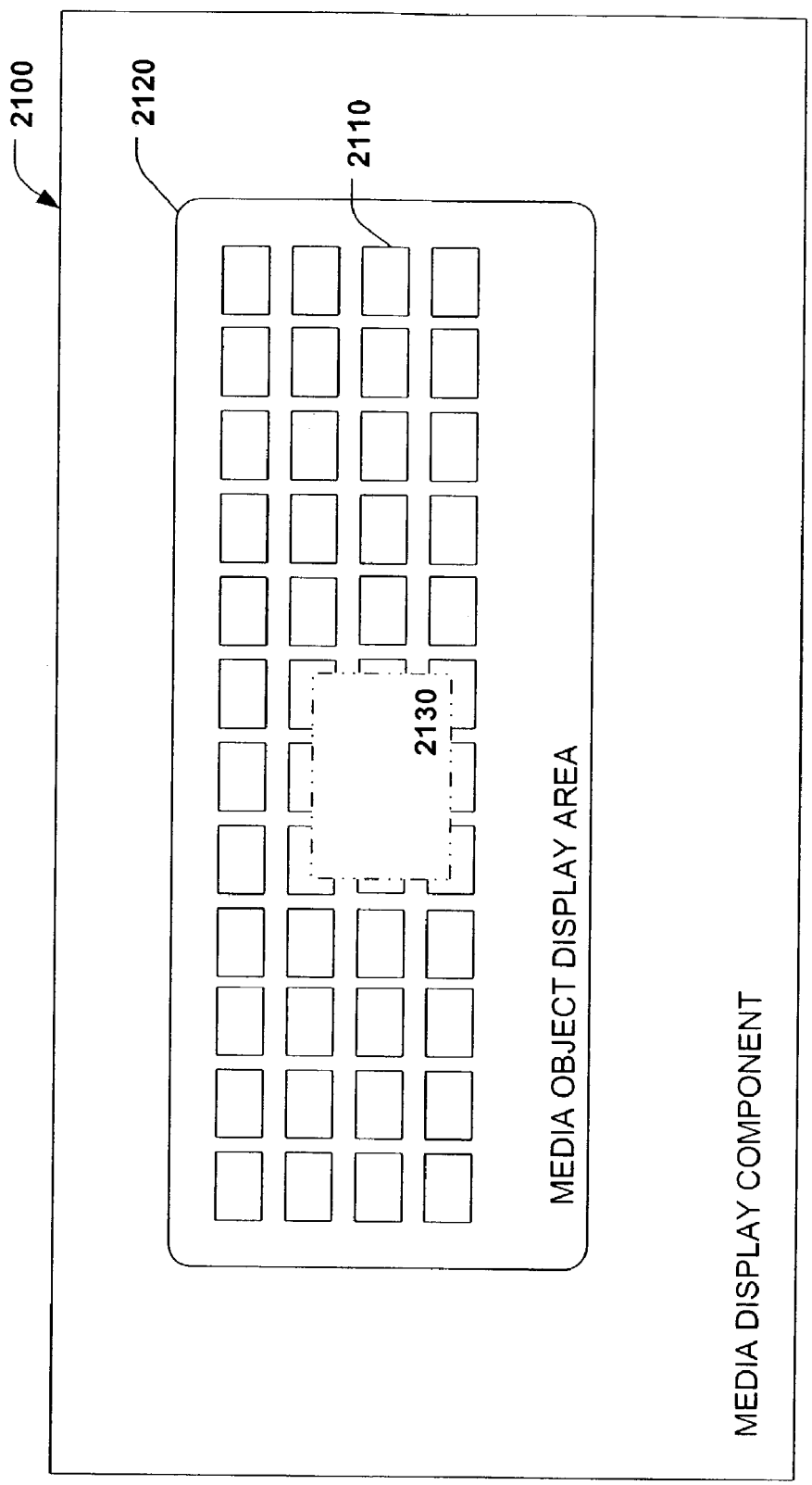
FIG. 21 is a block diagram of a media display component in accordance with an aspect of the present invention.

Turning now to FIG. 21, an exemplary media display component 2100 is demonstrated in accordance with an aspect of the present invention. The media display component 2100 comprises any number of media objects 2110 as defined above in the application residing in a media object display area 2120. A user selection component such as a mouse can be positioned over the media object 2130, thereby enlarging its size while the mouse remains over or in contact with the media object 2130. To mitigate the enlarging of each "moused" over media object during selection, the command "control-click" may be employed when sweeping over multiple media objects for selection purposes.

Figure 22:
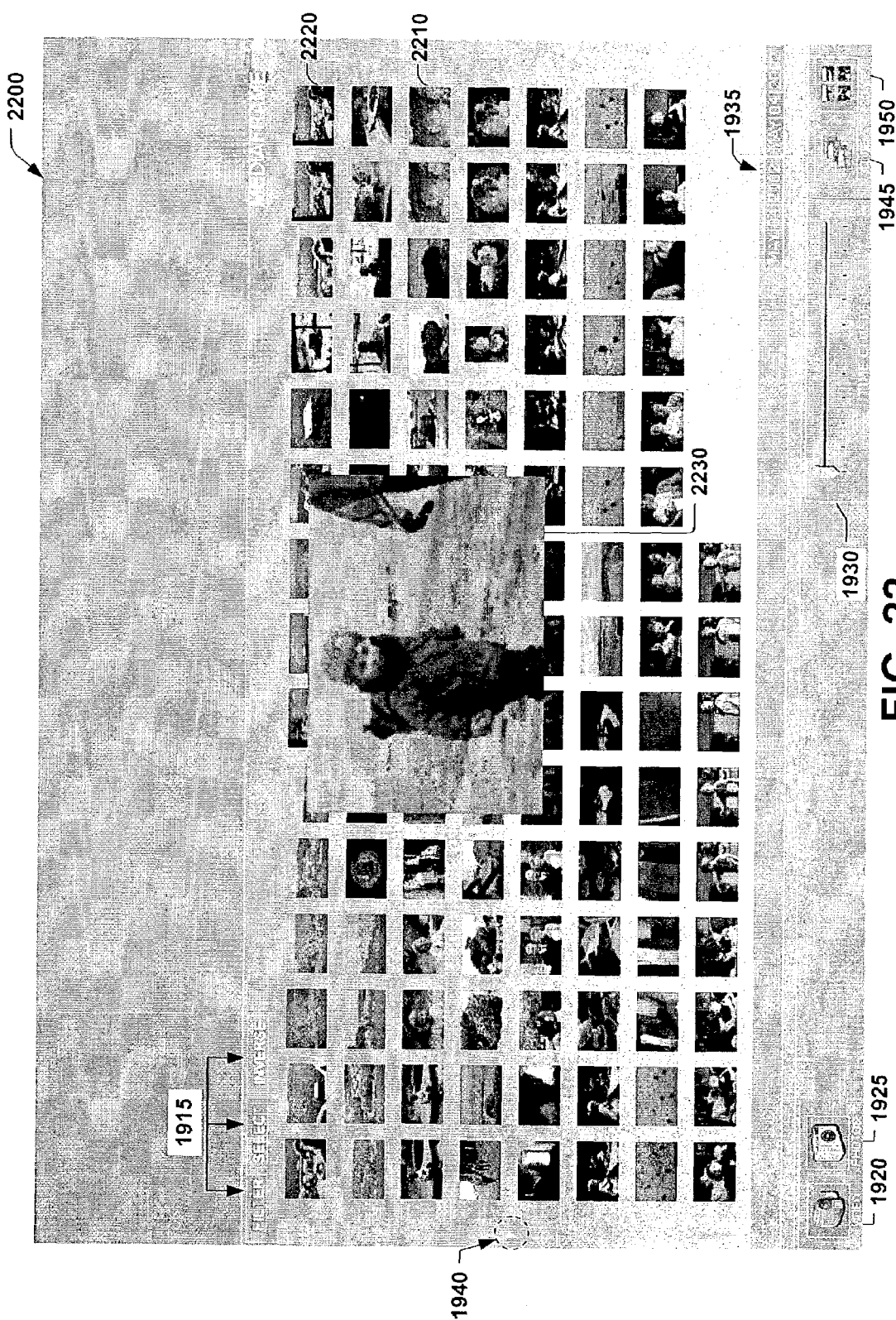
FIG. 22 is an exemplary user interface of the media display component of FIG. 21 in accordance with an aspect of the present invention.

FIG. 22 depicts an exemplary user interface 2200 of a media display component 2100 in accordance with an aspect of the present invention. The user interface 2200 demonstrates one implementation of the media display component 2100. For example, media objects 2210 reside in a media object display area 2220. As shown, media object 2230 appears enlarged which may be due in part by a pointer device positioned over or in contact with at least a portion of it.

Figure 23:
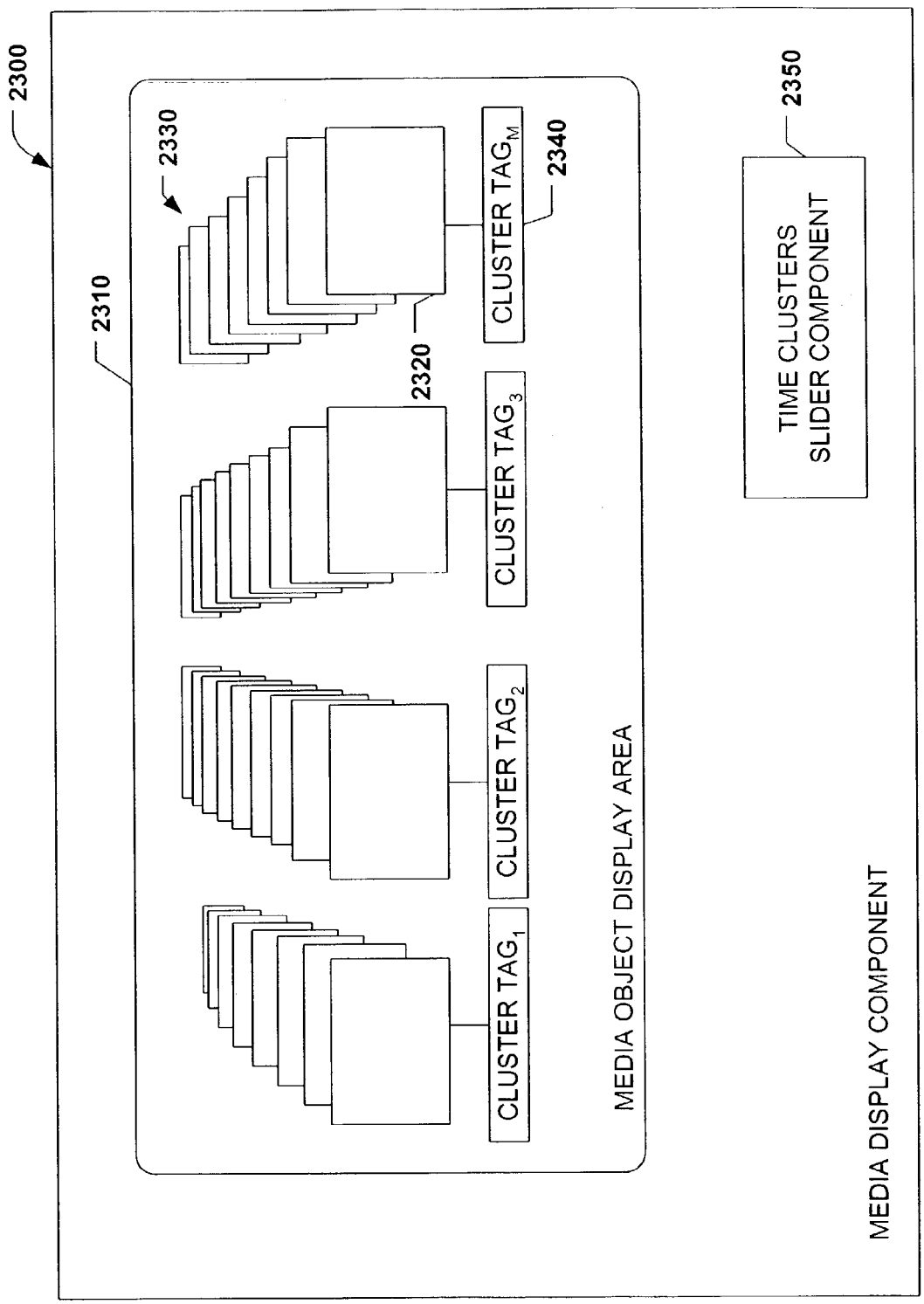
FIG. 23 is a block diagram of a media display component in accordance with an aspect of the present invention.

FIG. 23 is an exemplary media display component 2300 in accordance with an aspect of the present invention. The media display component 2300 comprises a media object display area 2310 that facilitates visualization of any number of media objects 2320. The media objects 2320 are illustrated in stacked view. While in stacked view, the media objects 2320 can be grouped or clustered together by intrinsic metadata, such as creation date and time, into media object time cluster(s) 2330.

Each time cluster 2330 can be labeled or identified by a cluster tag 2340 (e.g., CLUSTER TAG$_1$, CLUSTER TAG$_2$, CLUSTER TAG$_3$, and up to CLUSTER$_M$ as desired). In order to rapidly highlight an entire time cluster 2330, the cluster tag 2340 may be highlighted (via a user selection component) without having to highlight each individual media object within that particular time cluster. Furthermore, the number and viewable size of media object time clusters 2330 represented in the media object display area 2310 can vary in part by the user's preferences. In particular, the user may adjust the number and viewable size of the clusters 2330 using a time clusters slider component 2350.

Figure 24:
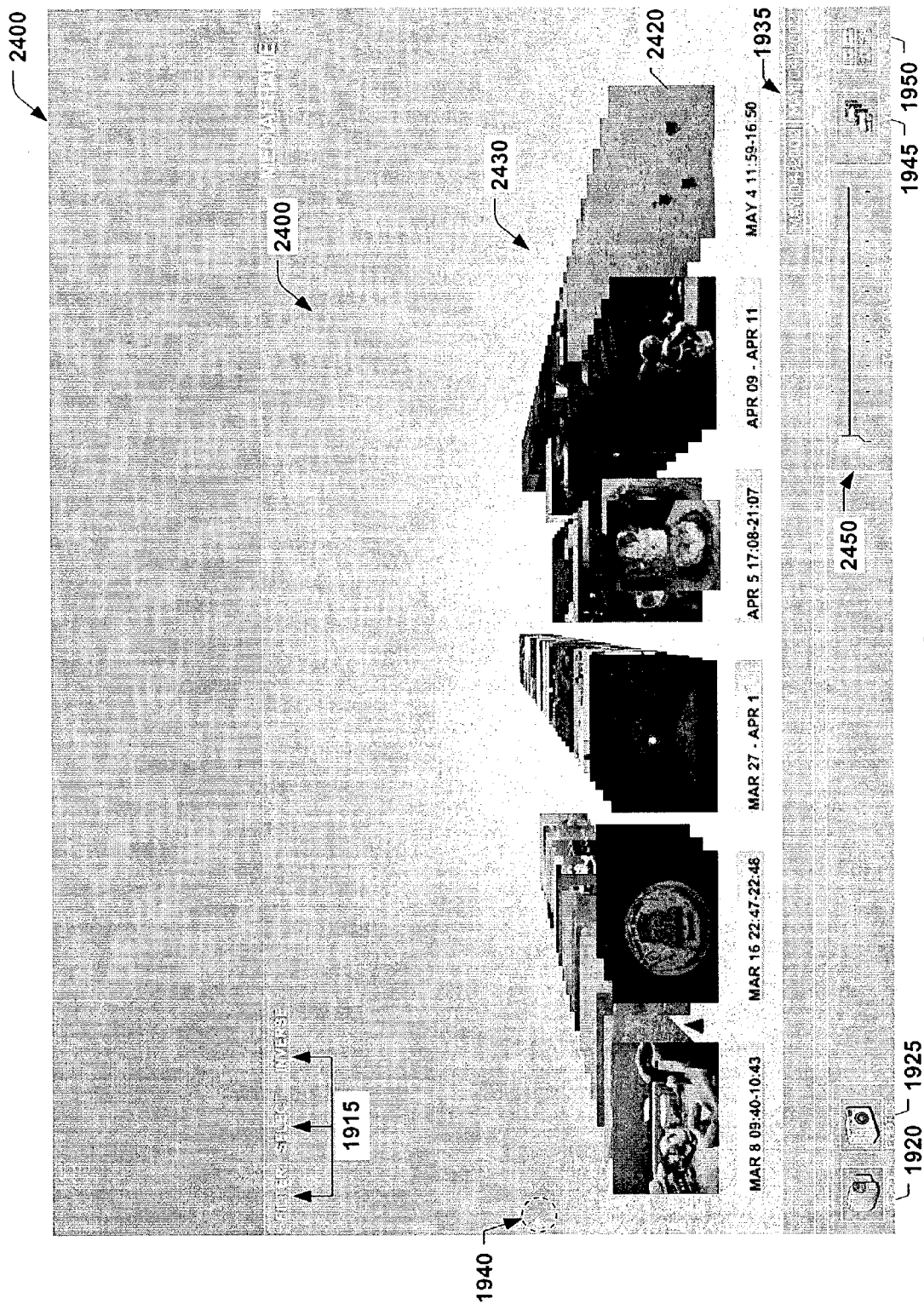
FIG. 24 is an exemplary user interface of the media display component of FIG. 23 in accordance with an aspect of the present invention.

FIG. 24 illustrates an exemplary user interface 2400 of the media display component 2300 discussed above in FIG. 23. The user interface 2400 demonstrates a media object display component 2410 comprising media objects 2420 which are arranged in a stacked view. In particular, the media objects 2420 are grouped in media object time clusters 2430 based at least in part upon the creation date and time of each media object 2420. The time clusters 2430 may be identified by cluster tags 2440 which denote the creation date and time of the media objects 2420 located within the particular cluster 2430. A time cluster slider component 2450 maybe employed to adjust the number and viewable size of the time clusters 2430 as desired by a user.

Figure 25:
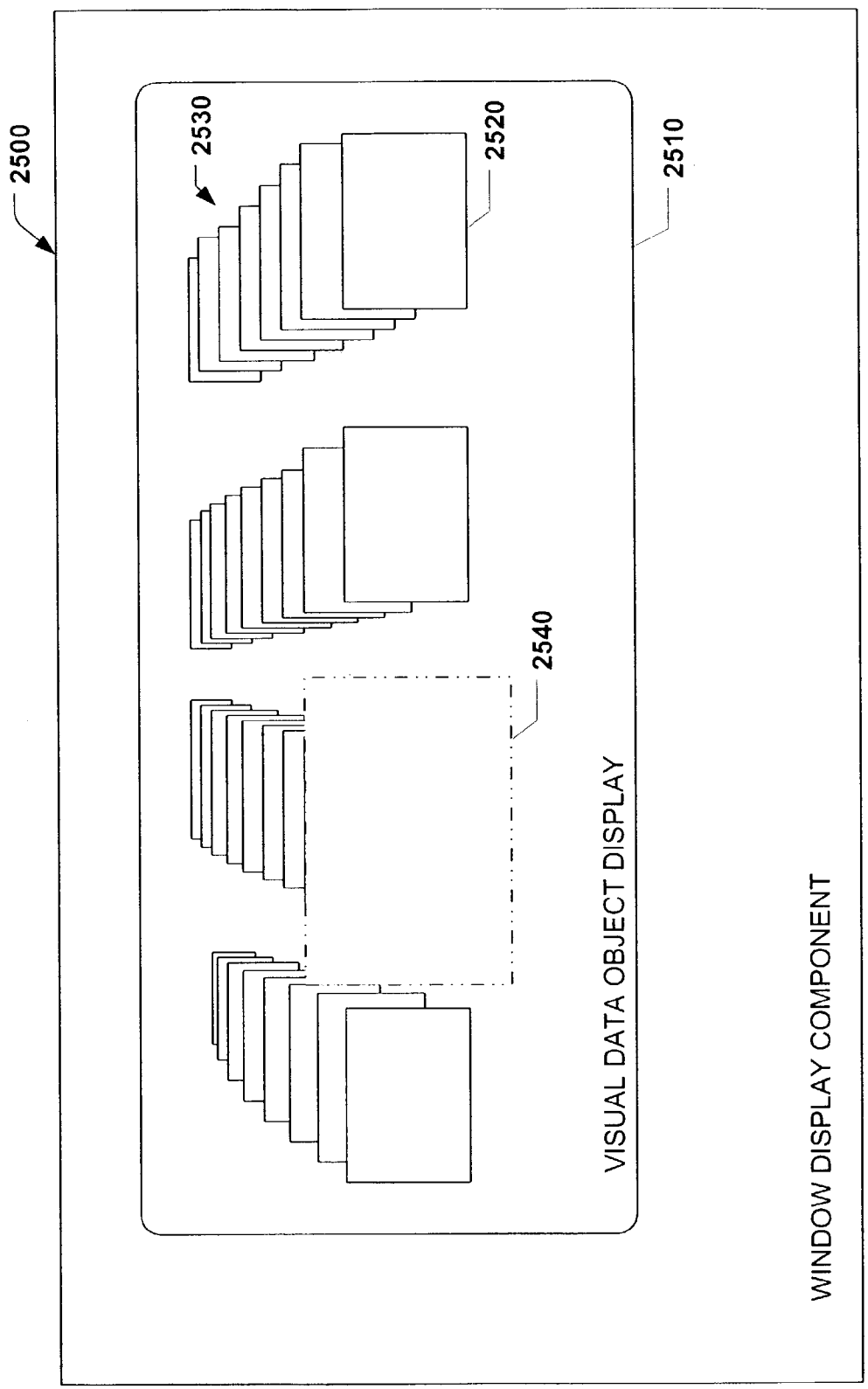
FIG. 25 is a block diagram of a media display component in accordance with an aspect of the present invention.

FIG. 25 represents an exemplary media display component 2500 in accordance with an aspect of the present invention. The media display component 2500 includes a media object display area 2510 that comprises any number of media objects 2520. Similar to FIG. 23, the media objects 2520 appear in stacked view and thus are arranged in media object time clusters 2530. A user selection component such as a mouse may contact at least a portion of media object 2540 to indicate the location of the mouse with respect to the media object display area 2510. As the mouse contacts at least a portion of any one media object 2520, the media object 2520 may appear enlarged as shown with media object 2540, for example.

Figure 26:
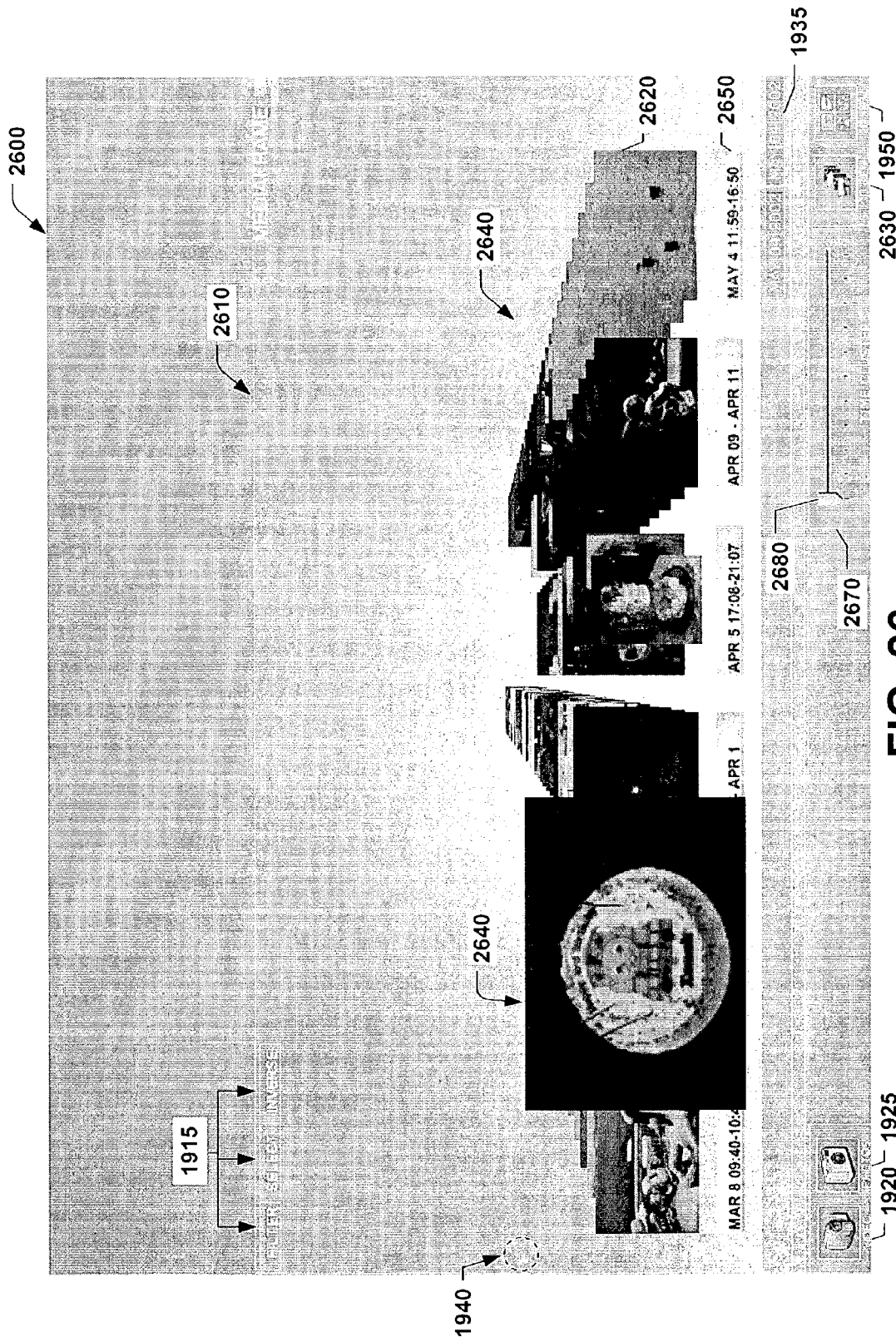
FIG. 26 is an exemplary user interface of the media display component of FIG. 25 in accordance with an aspect of the present invention.

FIG. 26 illustrates an exemplary user interface 2600 for the media display component 2500 in accordance with an aspect of the present invention. The user interface 2600 includes a media object display area 2610 that comprises any number of media objects 2620. As shown, the media objects 2620 appear in stacked view 2630 (e.g., three-dimensional block 2630 is illuminated). Therefore, the media objects may be arranged in media object time clusters 2640.

Furthermore, the media object time clusters 2640 are labeled with cluster tags 2650 to indicate the date/time associated with the media objects 2620 grouped therein. The data/time may reflect the creation date/time or the last modified date/time according to a user's preferences. Media object 2660 is shown enlarged as a result of a mouse contacting or being positioned over at least a portion of the media object 2660.

The user interface 2600 also includes a time cluster slider 2670, which when moved in either direction, adjusts the viewable size and/or number of the media object time clusters 2640. As shown in FIG. 26, the slider component is at its default (resting) position 2680. As the slider component is moved from its default position 2680, the number of the time clusters 2640 may increase, thereby decreasing the viewable size of each time cluster 2640. This phenomenon can be seen in FIGS. 27 and 28 below.

Figure 27:
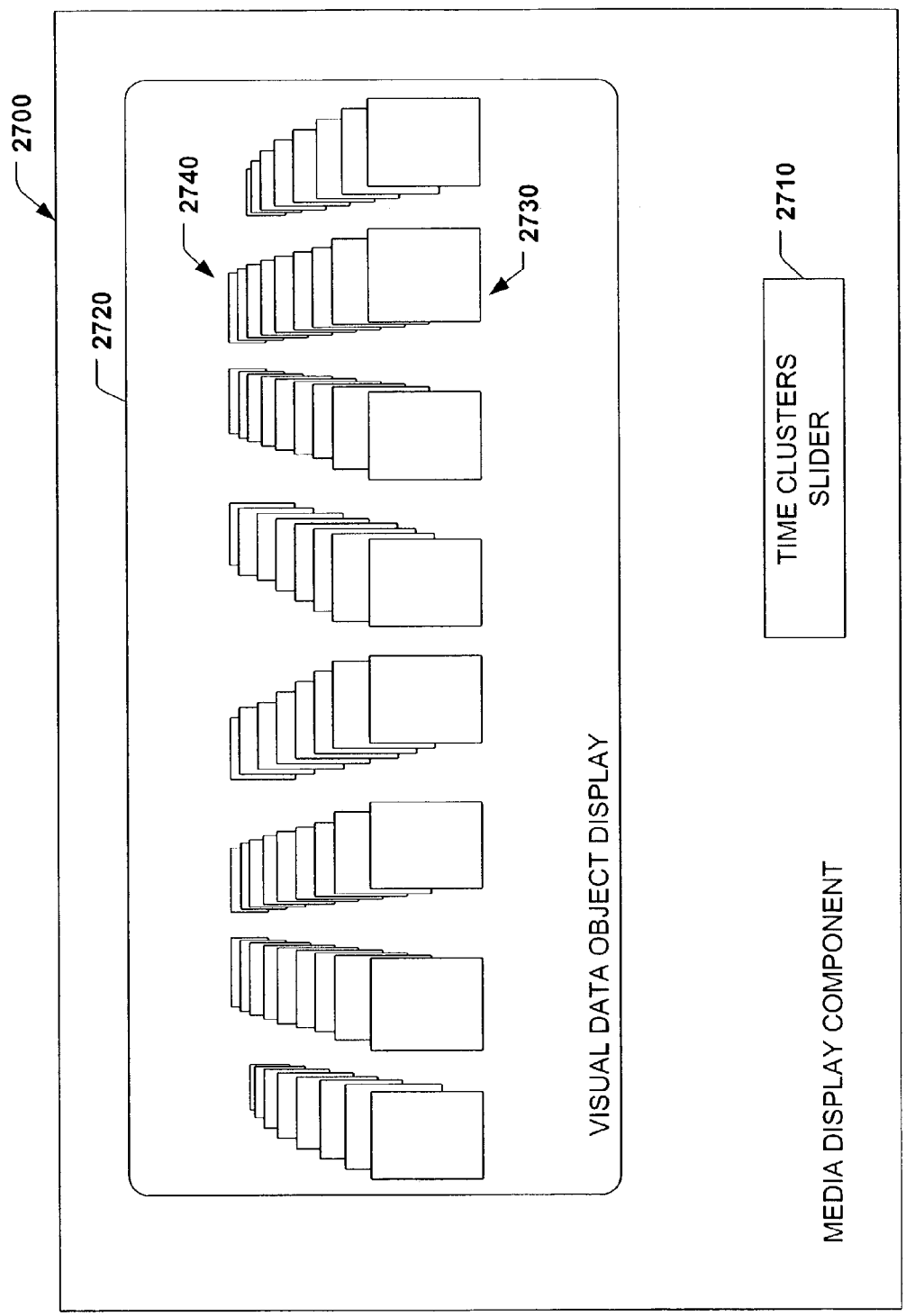
FIG. 27 is a block diagram of a media display component in accordance with an aspect of the present invention.

FIG. 27 depicts an exemplary media display component 2700 which results from a user sliding a time cluster slider component 2710 such as described above in FIGS. 25 and 26. The media display component 2700 comprises a media object display area 2720. The media object display area 2720 includes any number of media objects 2730 that are arranged into media object time clusters 2740.

As the time cluster slider component 2710 is moved (e.g., from its default position 2680 as shown in FIG. 26), the number of time clusters 2740 increases and the viewable size of each cluster 2740 decreases accordingly in order to present the number of time clusters 2740 desired, while maintaining the largest viewable size possible of each time cluster 2740 given the limited physical attributes of the media display component 2700 (e.g., screen size) and the media object display area 2720. Increasing the number or quantity of time clusters viewed by a user in the display area 2720 indicates that each time cluster 2740 represents a shorter range of date/time. This can be seen when comparing the time clusters 2640 discussed in FIG. 26 above with time clusters in FIG. 28 below.

Figure 28:
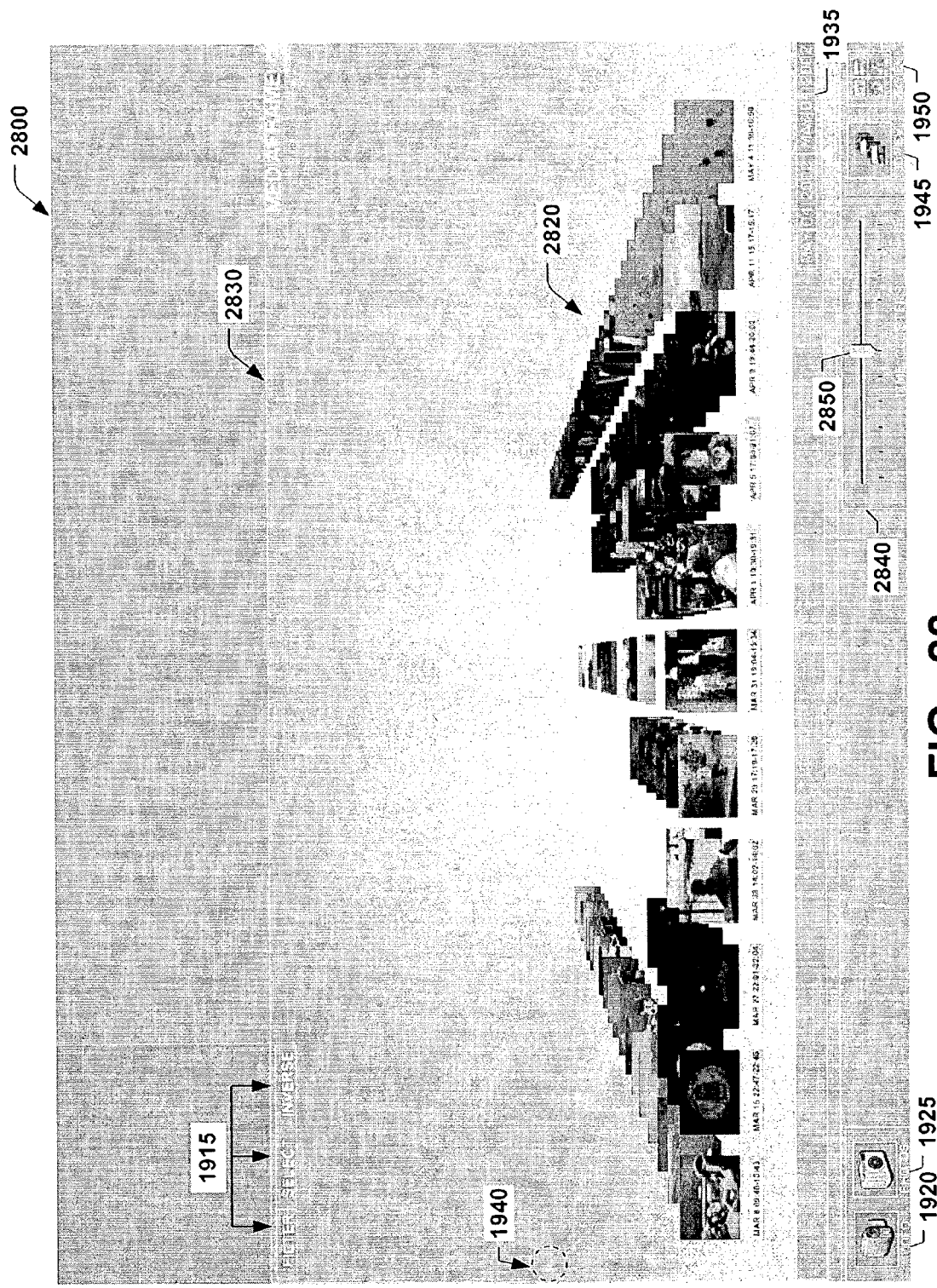
FIG. 28 is an exemplary user interface of the media display component of FIG. 27 in accordance with an aspect of the present invention.

FIG. 28 illustrates an exemplary user interface 2800 of the media display component 2700 described with respect to FIG. 27. The user interface 2800 comprises a media objects 2810 arranged in any number of media object time clusters 2820 and shown in a media object display area 2830 of the user interface 2800. A time cluster slider component 2840 has been adjusted in order to increase the number of time clusters 2820 in the display area 2830. In particular, the slider component 2840 is at a position 2850 about midway from minimum and maximum positions of the slider component 2840. Compared to the media object time clusters 2640 described in FIG. 26, the time clusters 2820 as shown in FIG. 28 are greater in quantity but smaller in viewable size. However, each time cluster tag 2860 indicates that a shorter span of time is represented in each time cluster 2820.

Figure 29:
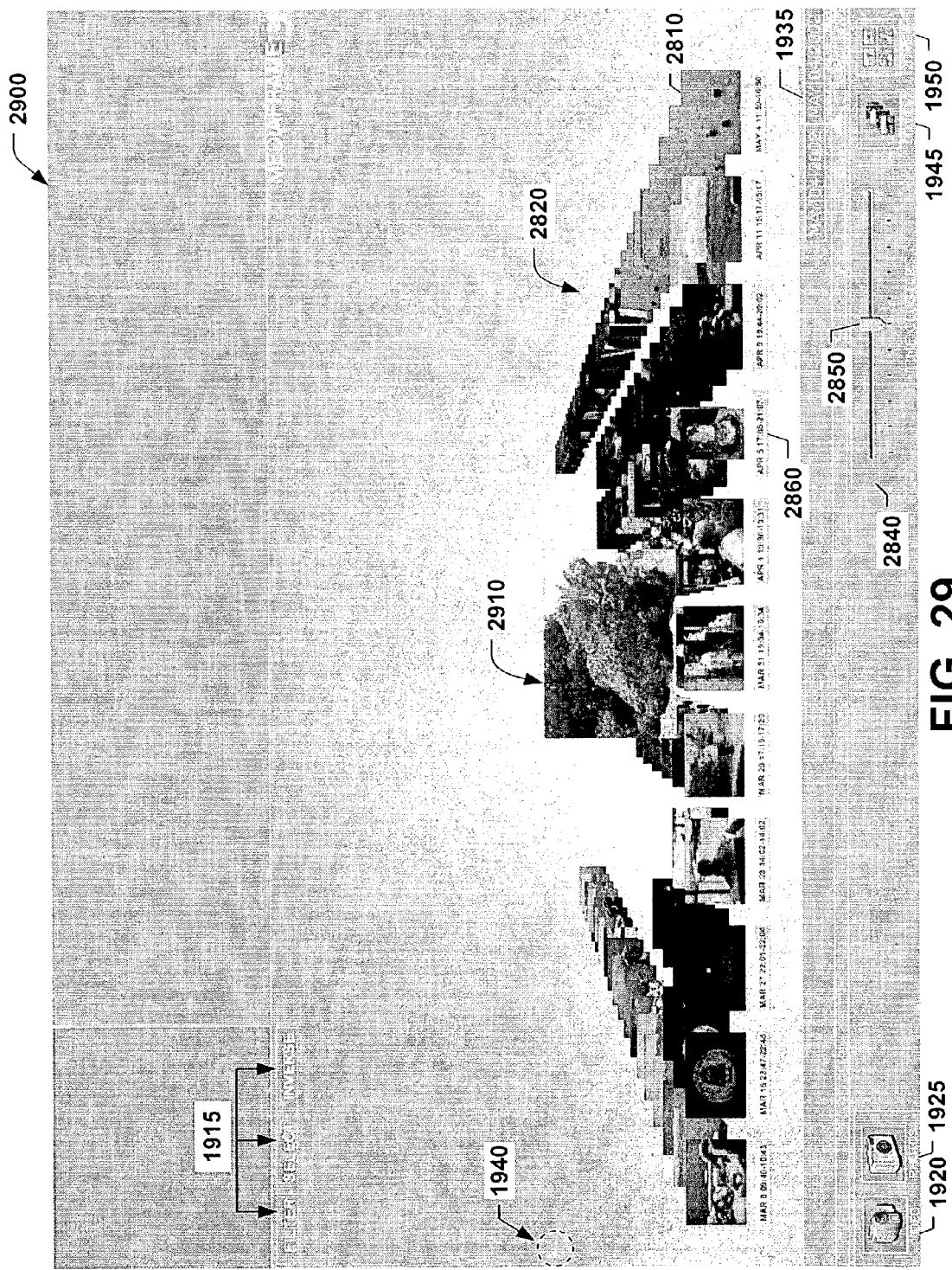
FIG. 29 is an exemplary user interface of the media display component of FIG. 27 in accordance with an aspect of the present invention.

FIG. 29 is an exemplary user interface 2900 which may be described in conjunction with FIG. 28. In FIG. 29, a media object 2910 is shown as being enlarged as a result of a pointing device contacting at least a portion of the media object 2910. Regardless of the location of the media objects 2810 in the time cluster 2820, it may still be enlarged for easier viewing during browsing of the media objects 2810.

Figure 30:
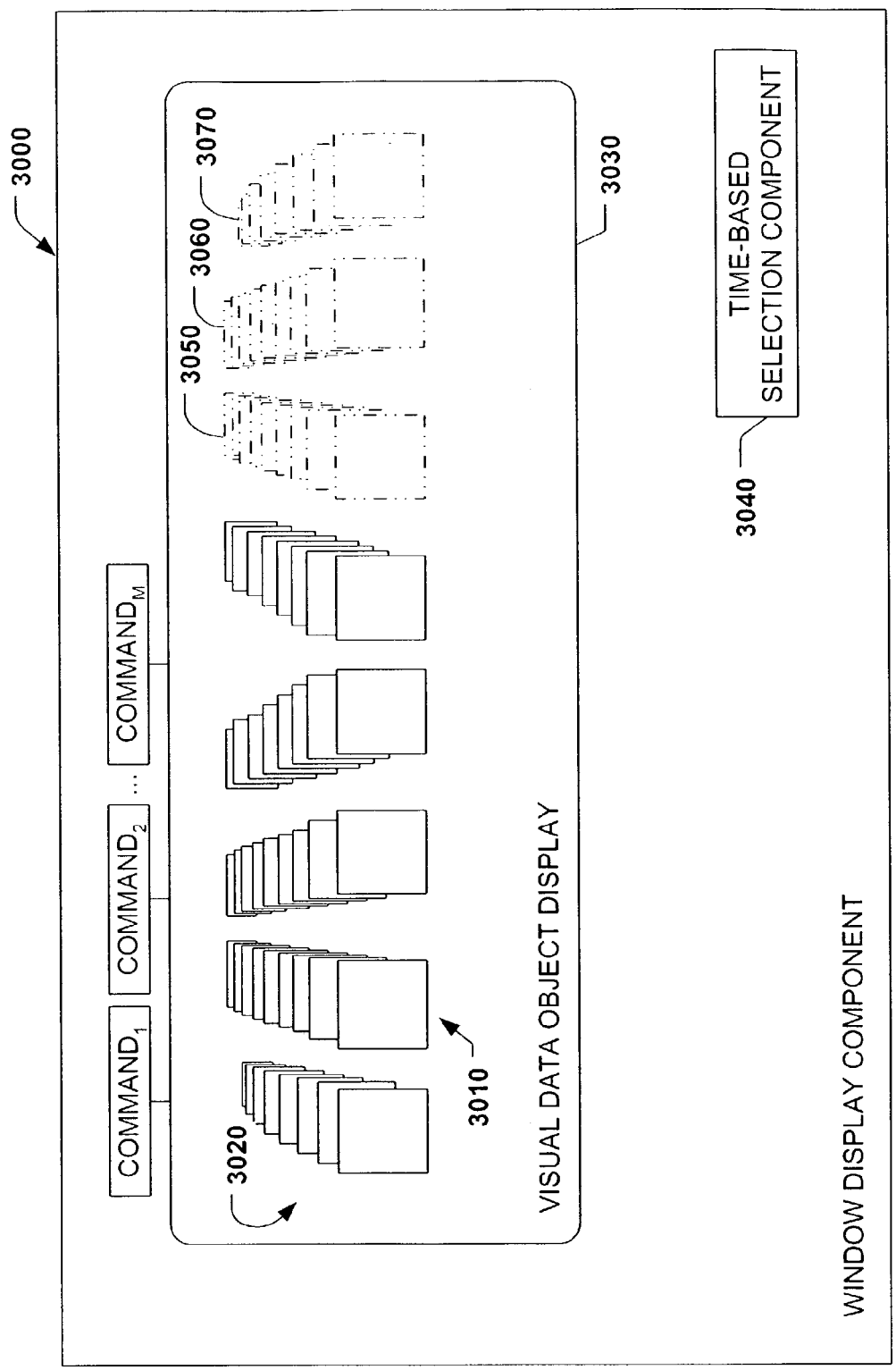
FIG. 30 is a block diagram of a media display component in accordance with an aspect of the present invention.

FIG. 30 demonstrates an exemplary media display component 3000 in accordance with an aspect of the present invention. The media display component 3000 is similar to the media display component 2700 as described supra in FIG. 27. The media display component 3000 comprises media objects 3010 which are arranged in media object time clusters 3020. The media objects 3010 are displayed for a user in a media object display area 3030.

Selection of the media objects may be performed using one or more techniques. One method involves a time-based selection component 3040. At its default position, the time-based selection component 3040 indicates the latest date (e.g., end date) corresponding to any one of the media objects 2810 in the media display area 3030. In particular, the time-based selection component 3040 shows the end date when not employed by a user.

According to the user's preferences, the user can slide the time-based selection component 3040 from its default position. As it is moved, a date range appears and is variable according to the user's movement of the selection component 3040. Any media objects which are tagged with a date that falls within the current date range shown is highlighted. For example, time clusters 3050, 3060, and 3070 are highlighted by employing the time-based selection component 3040. Moreover, the time-based selection component 3040 is based in part on the metadata attached to the media objects 3010. Similar selection components which may be based on other types of metadata may be utilized as well.

Figure 31:
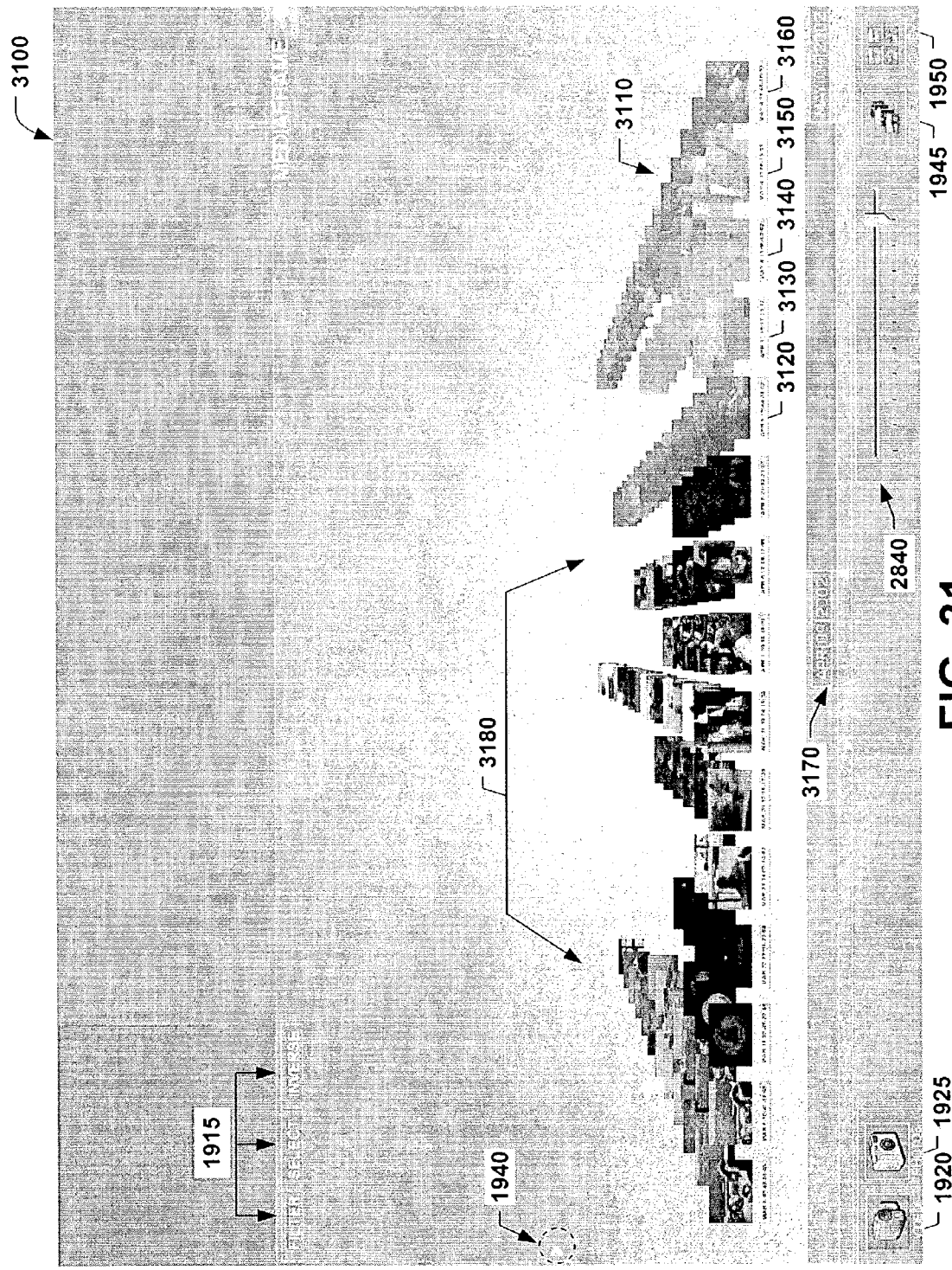
FIG. 31 is an exemplary user interface of the media display component of FIG. 30 in accordance with an aspect of the present invention.

FIG. 31 represents an exemplary user interface of the media display component 3000 as described above in FIG. 30. In FIG. 31, media objects 3110 which are arranged in time clusters 3120, 3130, 3140, 3150, and 3160 are highlighted by way of a time-based selection component 3170. The time-based selection component displays a date range of Apr. 9, 2002 to May 4, 2002. Thus, the time clusters 3120, 3130, 3140, 3150, 3160 are highlighted. The time cluster tags verify and confirm that the media objects included in the highlighted clusters fall within the current date range.

Figure 32:
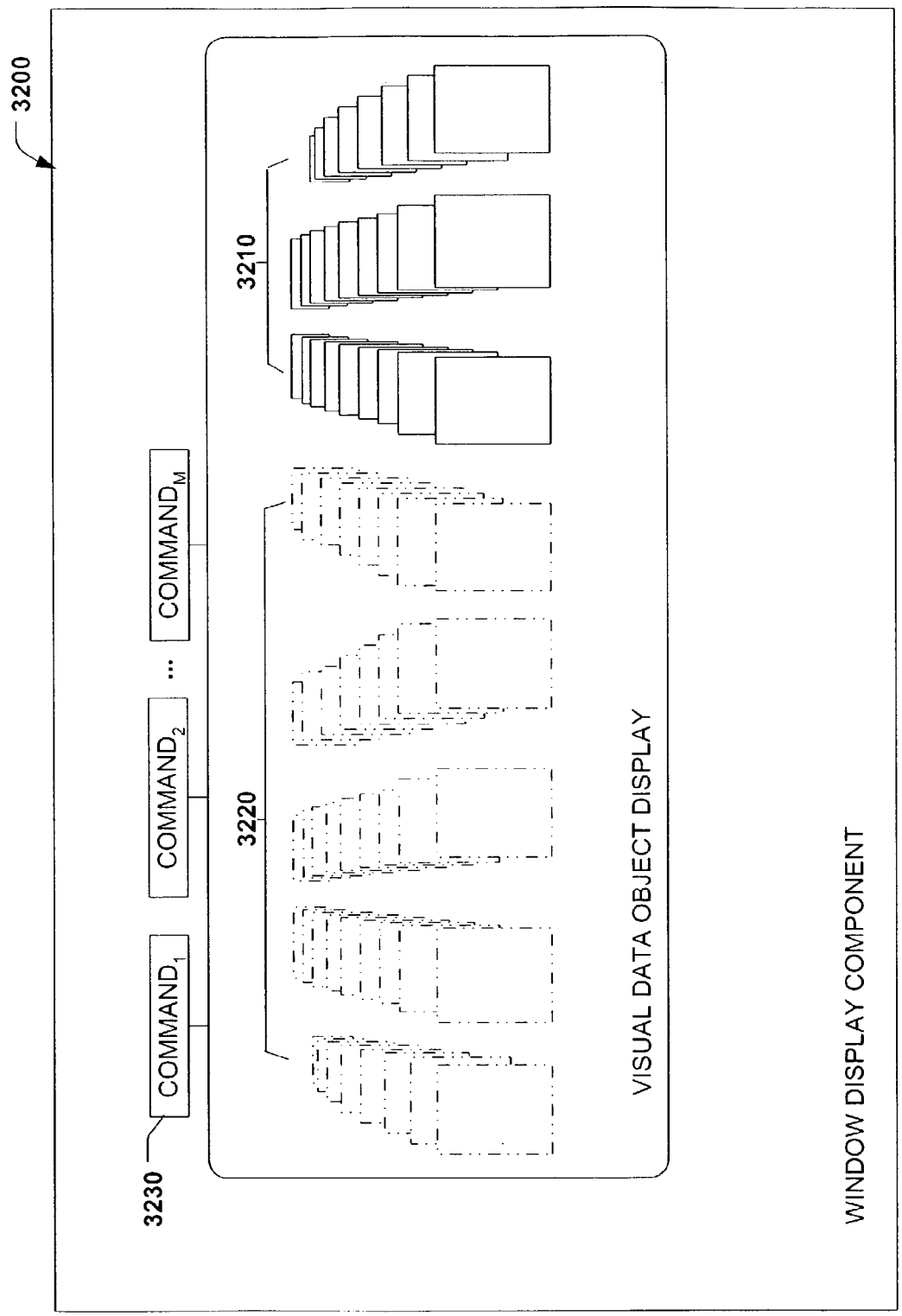
FIG. 32 is a block diagram of a media display component in accordance with an aspect of the present invention.
Figure 33:
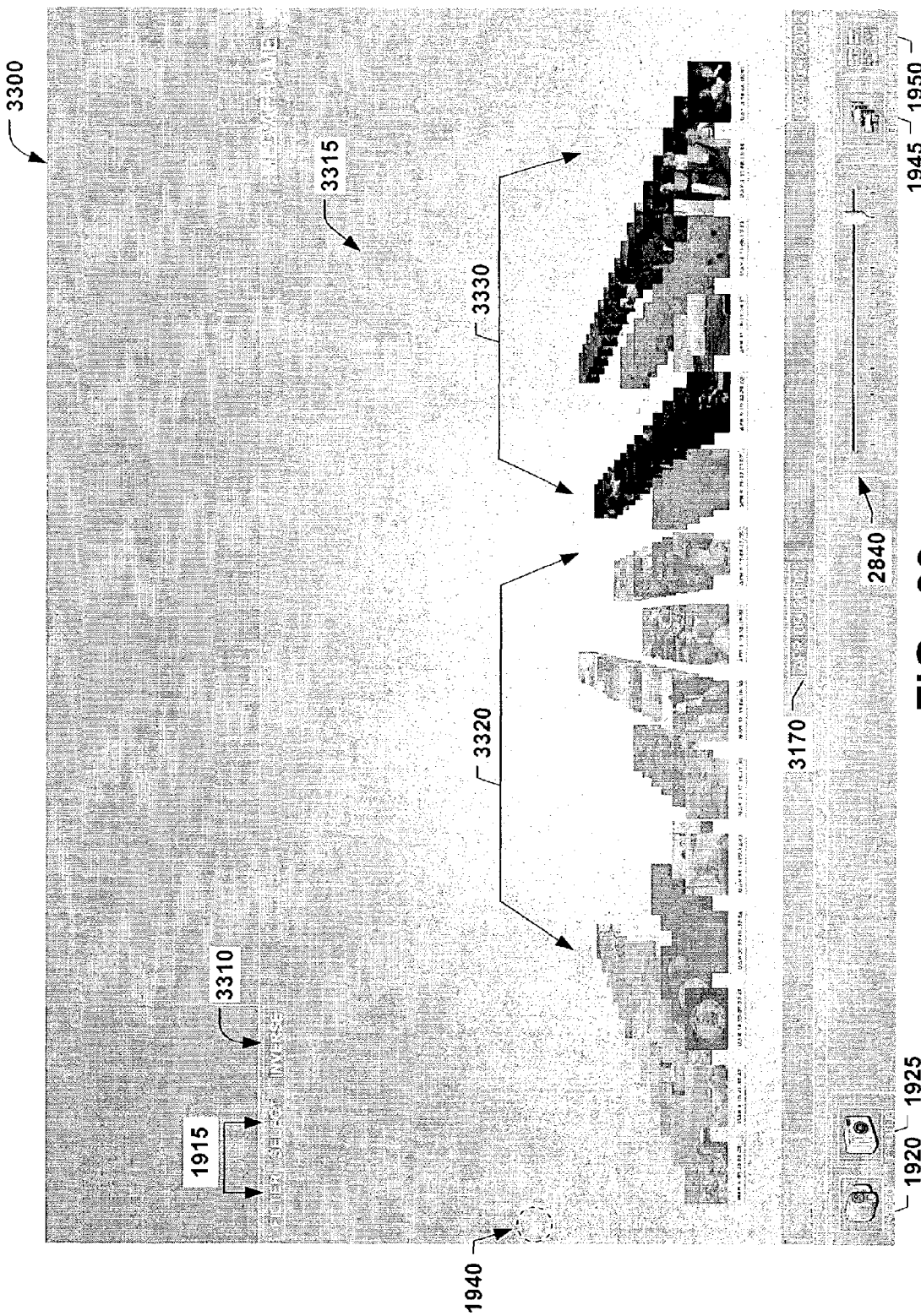
FIG. 33 is an exemplary user interface of the media display component of FIG. 32 in accordance with an aspect of the present invention.

In order to highlight all other media objects 3180 and to de-highlight the media objects 3110 in as few keystrokes as possible, a command key present in the user interface 3100 can be employed as shown in FIGS. 32 and 33.

FIG. 32 illustrates a media display component 3200 which is described in conjunction with FIG. 30. In FIG. 32, the highlighted media objects 3050, 3060, 3070 (FIG. 30) are now de-selected (3210) while the other media objects 3020 are now highlighted (3220) in the media display component 3200. This rapid change of selected media objects can be accomplished in part by employing an "inverse" command option 3230 in the media display component 3200. Any number of suitable command options may be made available to a user for performing rapid manipulations on the media objects (3210, 3220).

FIG. 33 is an exemplary user interface 3300 of the media display component 3200 as described above in FIG. 32 and as follows from the user interface 3100 in FIG. 31. FIG. 33 demonstrates the status of the media objects 3110,3180 (FIG. 31) when implementing an "inverse" command option 3310 available to a user in order to quickly manipulate, cluster, and sort media objects in the media object display area 3315. The "inverse" command option permits a user to highlight all other objects 3180 which are not highlighted at the current moment and to simultaneously de-select the objects 3110 which are highlighted at the current time. As a result, media objects 3320 are now highlighted and media objects 3330 are not highlighted.

Figure 34:
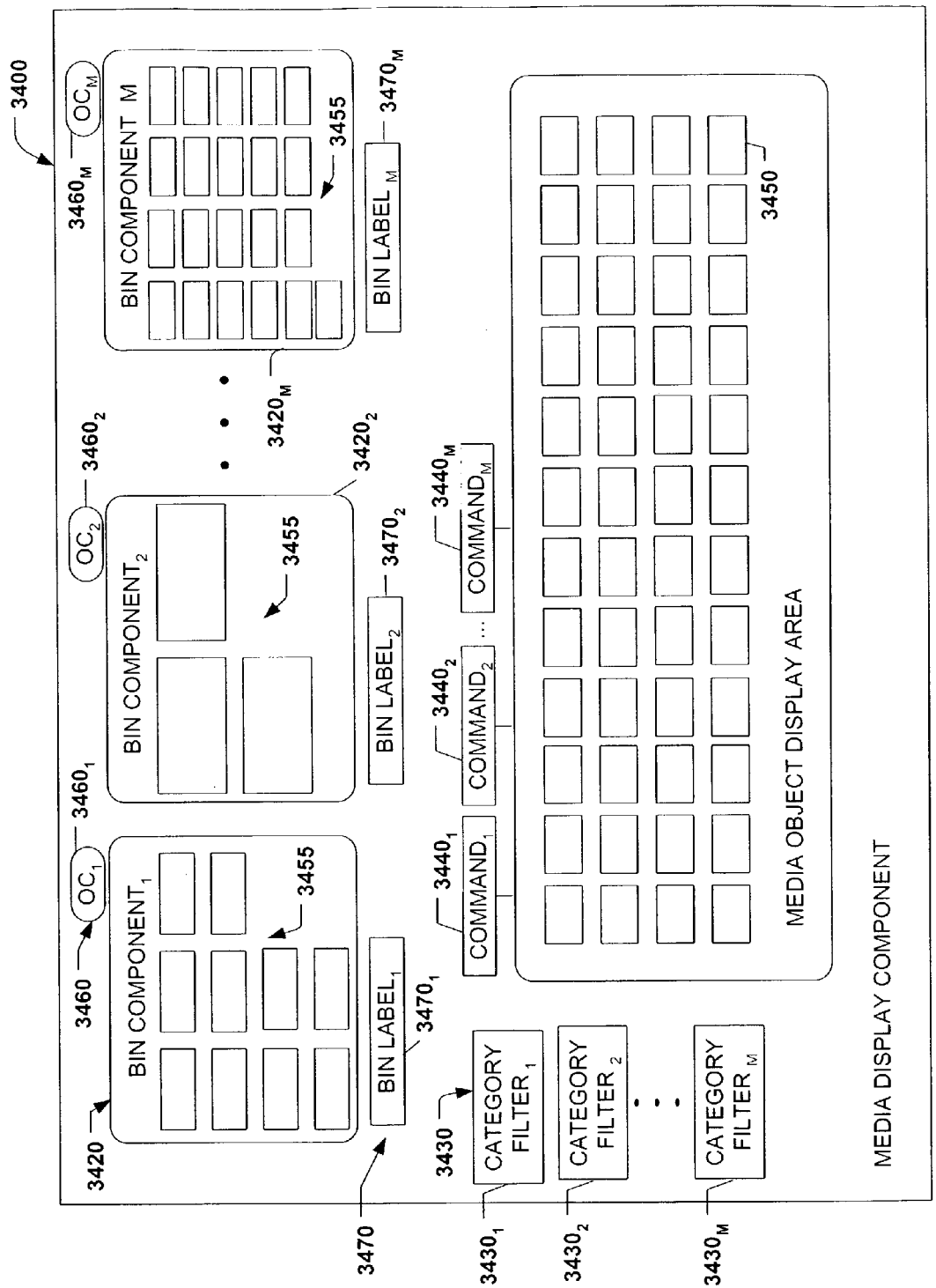
FIG. 34 is a block diagram of a media display component in accordance with an aspect of the present invention.

Turning now to FIG. 34, a media display component 3400 in accordance with an aspect of the present invention is shown. The media display component 3400 comprises a media object display area 3410, one or more optional bin components 3420 (e.g., $3420_1$, $3420_2$, $3420_M$), one or more optional category filters 3430 (e.g., $3430_1$, $3430_2$, $3430_M$), and one or more optional command keys 3440.

The media object display area 3410 includes any number of media objects 3450 which are arranged in raster view. The media objects 3450 are spaced and organized within the media object display area 3410 in order to optimize the viewing size of them given the physical attributes of the available space (e.g., screen size). Therefore, as the number of the media objects decreases, the viewable size of them increases. The converse applies as well.

The optional bin components 3420 may be created to facilitate rapid annotation of the media objects, particularly when large numbers of media objects require sorting and organization in order to provide meaningful information to a user. Each bin component 3420 may comprise any number of media objects 3455 moved thereto. Again, the viewable size of the media object(s) in the bin component 3420 depends in part on the number of media objects placed therein. Each bin component may also include an object counter 3460 (e.g., $3460_1$, $3460_2$, $3460_M$) that tracks and records the quantity of media objects presently in the bin component 3420. The bin components 3420 may also be labeled ($3470$–$3470_1$, $3470_2$, $3470_M$) according to a user's preference in order to quickly identify the media objects grouped together in the bin component 3420. The bin labels 3470 may or may not correspond to a piece of metadata attached to the media objects, as desired by the user.

Further, the bin components 3460 may be hidden from or shared among more than one user via secured passwords and connections, for example. In addition, the media objects 3455 therein and/or the selected bin component 3460 may be exported, emailed, deleted, rotated, printed, viewed as a slideshow, viewed as a movie, and/or assigned to one or more of the optional category filters 3430.

The optional category filter(s) 3430 facilitates visualization of the media objects 3450 as well as rapid annotation, sorting, clustering and browsing of the media objects 3450. The category filters 3430 may also include object counters (not shown) similar to the object counters 3460 associated with the bin components 3420. In addition, the names of the category filters 3430 may correspond to a piece of metadata which is attached to media objects assigned thereto.

The category filters 3430 may be hidden or secured from others' viewing. In addition, a scrolling option may be employed in order to view all of the category filters. The category filters have any number of media objects assigned thereto. For example, when a category filter $3430_1$ is selected (e.g., by a user selection component), only those media objects assigned thereto remain in the media display area 3410. All other media objects appear to fall off the media display component 3400. For the remaining set of media objects, another attribute set (e.g., metadata) of category filters may appear. Thus, the remaining media objects can be further filtered and sorted. A media object's set of attributes may decrease as the user continues to filter via the category filters and/or other filter commands available on the media display component 3400.

The optional command keys 3470 may also facilitate rapid manipulation, sorting, clustering, browsing and searching of any number of media objects. They provide immediate access to either quickly narrow or quickly broaden the media objects 3450 appearing in the media object display area 3410. Examples of such command keys 3470 include, but are not limited to, filter, select, unselect, inverse, and show all.

Moreover, the filtering, sorting, clustering and browsing capabilities of the present invention relate to a hierarchal arrangement of media objects and their associated metadata. This hierarchal arrangement facilitates rapid annotation, random accessibility of media objects or portions thereof, and visualization of the media objects and any actions performed thereon.

Figure 35:
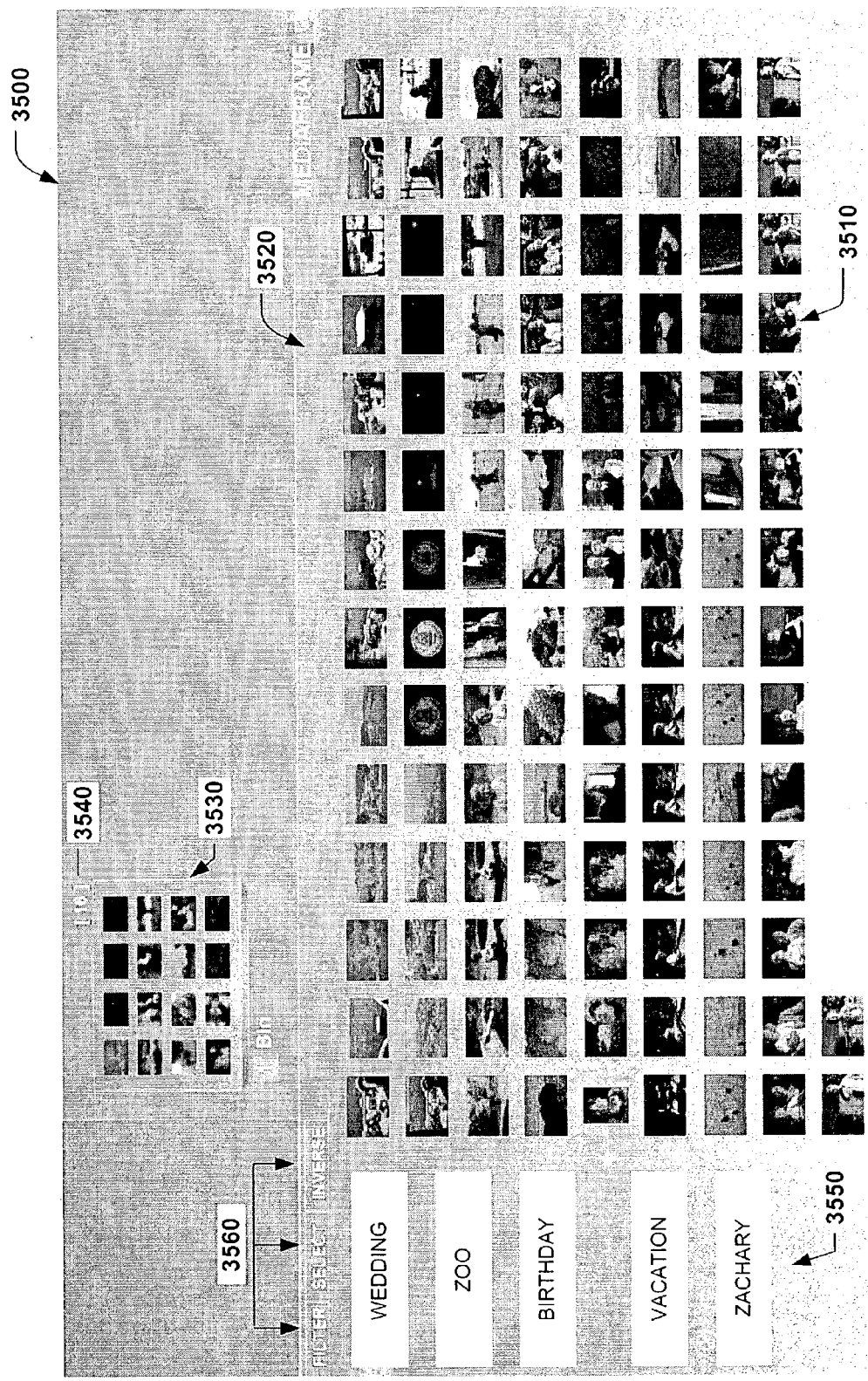
FIG. 35 is an exemplary user interface of the media display component of FIG. 34 in accordance with an aspect of the present invention.

FIG. 35 demonstrates an exemplary user interlace 3500 of the media display component 3400. The user interface 3500 comprises any number of media objects 3510 that are arranged by their intrinsic metadata (e.g., creation date, length, content, etc.) or according to some other metadata, as desired by a user, in a media object display area 3520. One bin 3530 comprising any number of media objects, and in particular 16 media objects, as evidenced by an object counter 3540 connected thereto, is also included in the media display component 3500. Optional category filter(s) 3550 as well as optional command key(s) 3560 are also shown in the media display component 3500.

Figure 36:
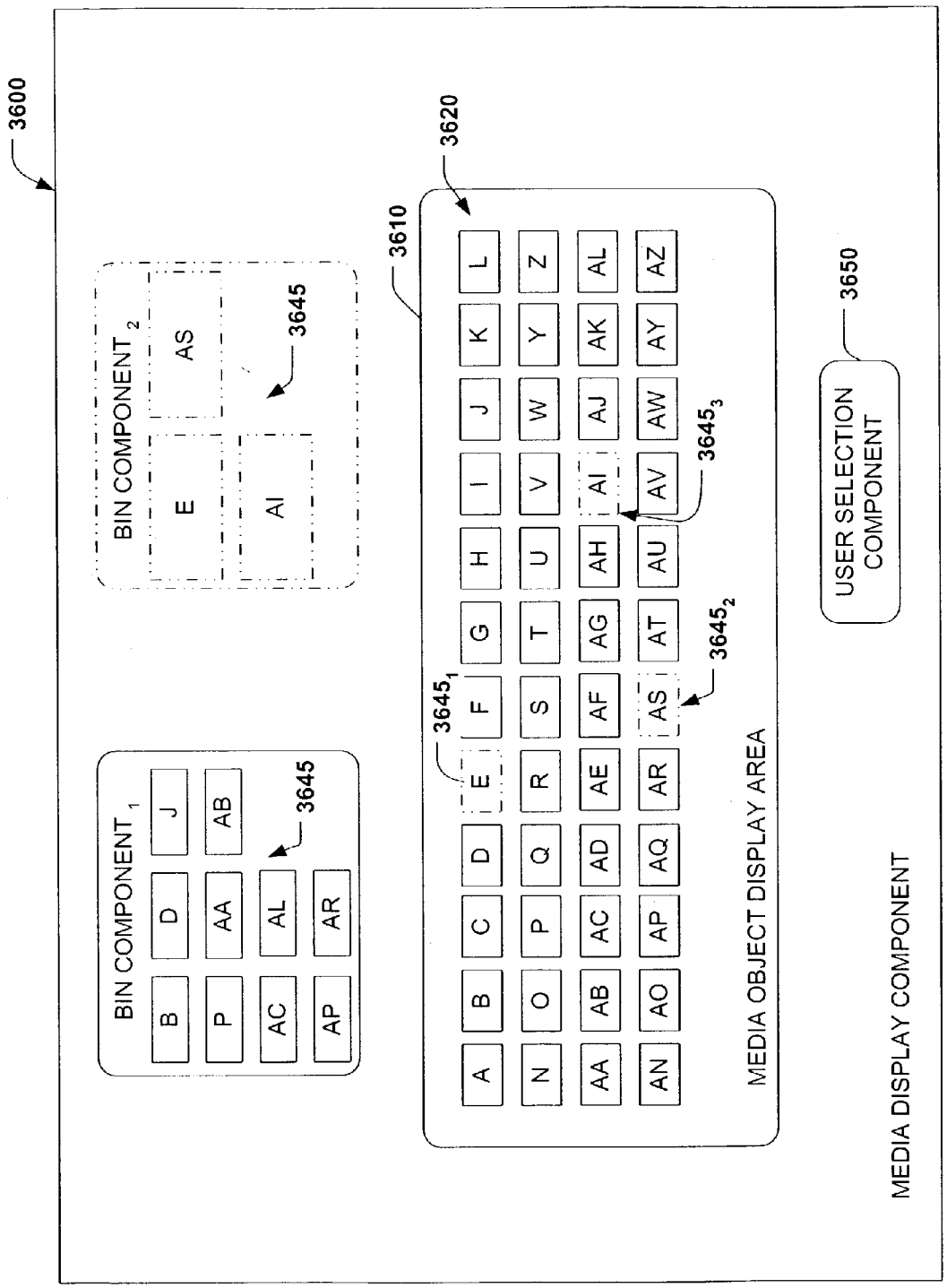
FIG. 36 is a block diagram of a media display component in accordance with an aspect of the present invention.

FIG. 36 illustrates a media display component 3600 in accordance with an aspect of the present invention. The media display component 3600 comprises a media object display area 3610 that includes any number of media objects 3620. As shown, two bin components, 3630 and 3640, have been created. Media objects 3635 and media objects 3445 appear in each bin, respectively.

As can be seen, the media objects 3635 in the first bin component 3630 and the media objects 3645 in the second bin component 3640 remain in the media object display area 3610. The media objects 3620 shown in the display area 3610 may also be known as a master database or as an everything database, denoting that these are all the media objects available to the user for annotation and/or other manipulation. Additional media objects can be added to increase the number of total media objects in the master database by importing them from other sources.

In order to visualize the relationship between the media objects (3620, 3635, 3645), the bin components (3630, 3640), and the master database in the display area 3610, a user selection component 3650 is employed to contact at least a portion of the bin component 3640 and/or to highlight the bin component 3640. When at least a portion of the bin component 3640 is contacted, the appearance or color of the bin 3640 and its media objects 3645 is temporarily altered. At the same time, the appearance or color of the media objects in the display area 3610 corresponding and identical to the media objects 3645 in the bin 3640 also is temporarily altered for the duration of the contact. This change or alteration of the appearance of the media objects is evidenced by the dashed and dotted lines of the bin 3640. the media objects 3645, and the media objects (3645$_1$, 3645$_2$, 3645$_3$) in the display area 3610.

Figure 37:
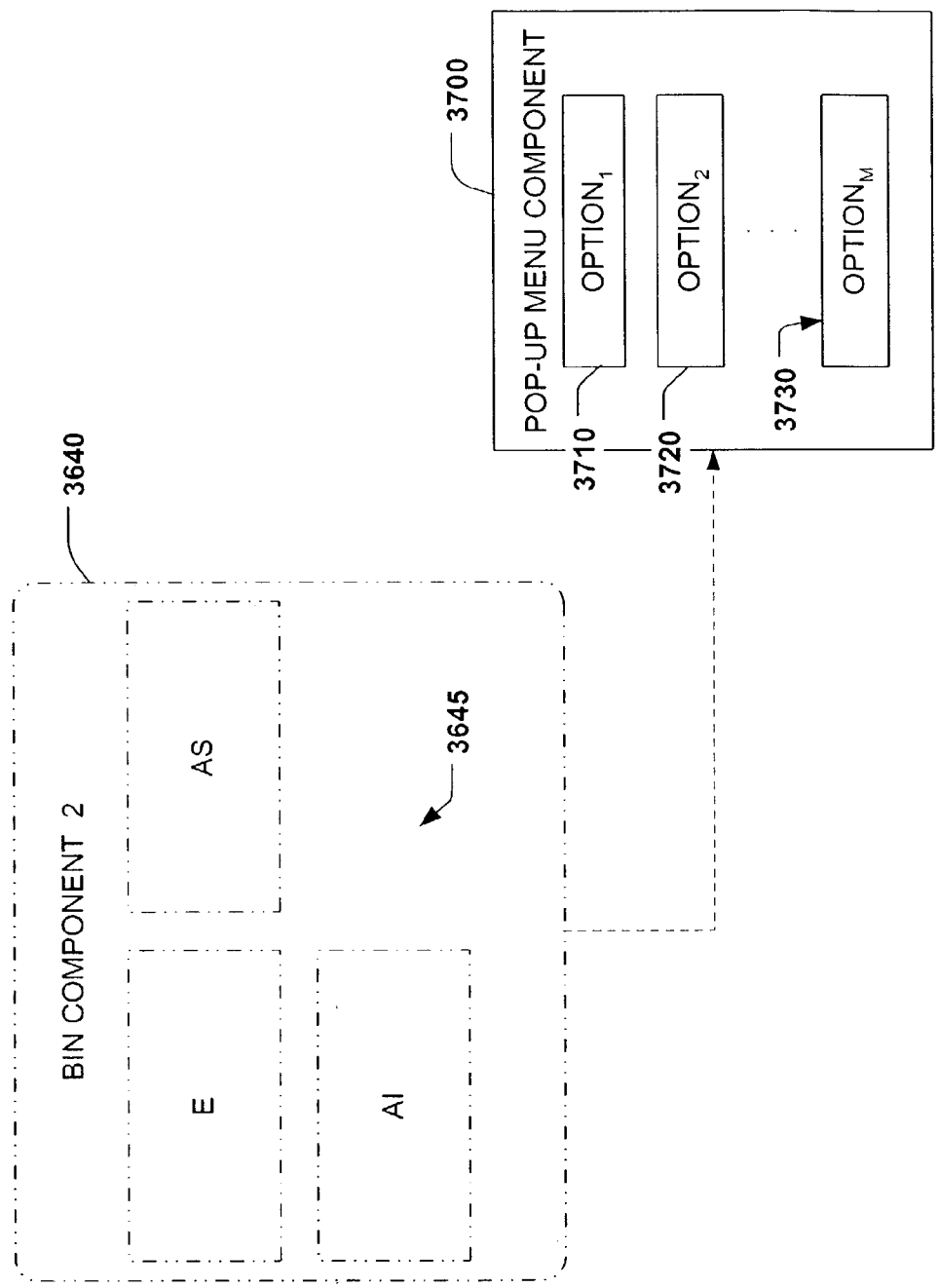
FIG. 37 is an exemplary bin component in accordance with an aspect of the present invention.

FIG. 37 depicts the exemplary bin component 3640 in greater detail. As shown, a pop-up menu component 3700 may be accessible in each bin component having at least one media object located therein. The pop-up menu component 3700 provides any number of optional actions (3710, 3720, 3730) or tasks to a user which may be applied to the media objects 3645 in the bin component 3640.

Figure 38:
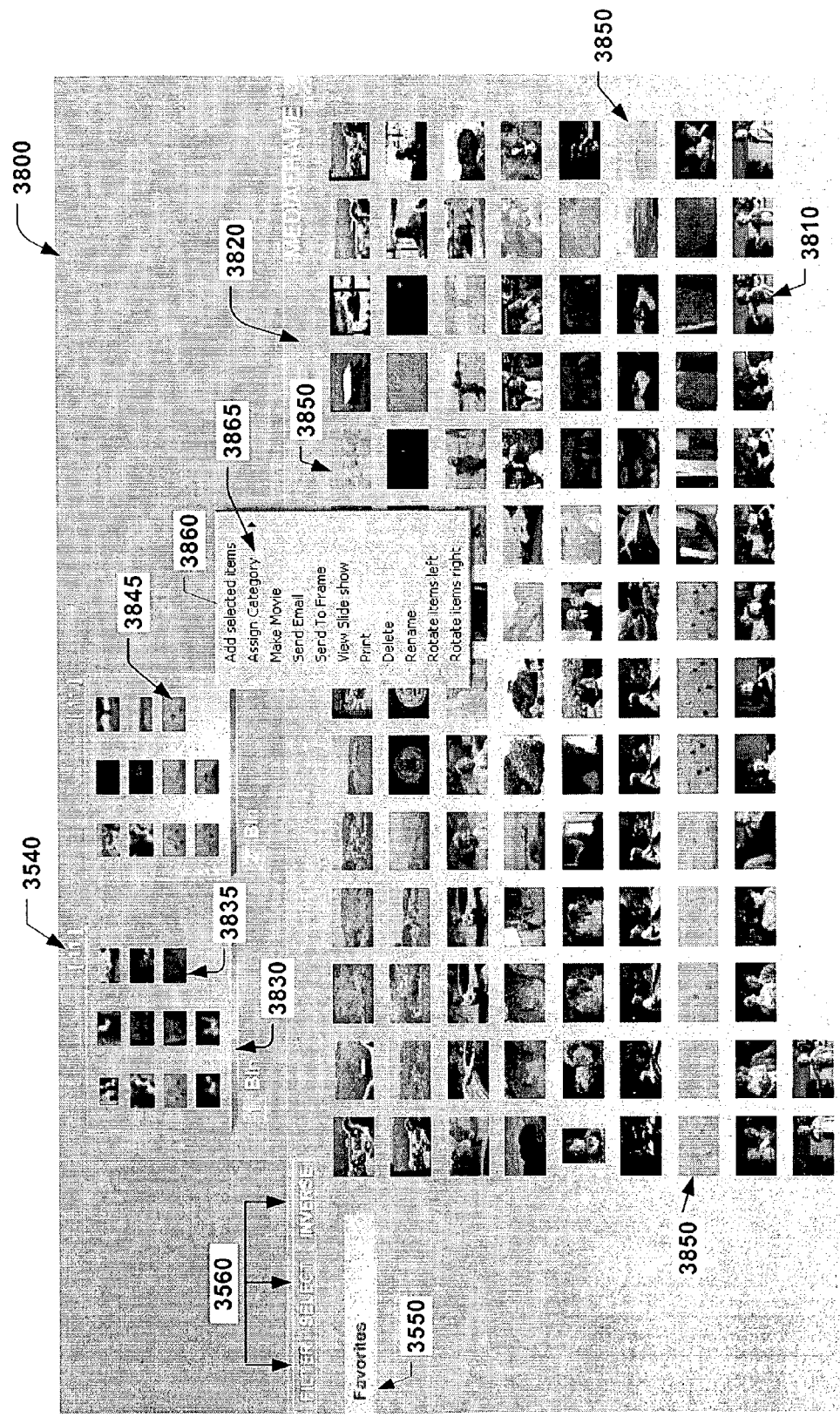
FIG. 38 is an exemplary user interface of the media display component of FIG. 36 in accordance with an aspect of the present invention.

FIG. 38 demonstrates an exemplary user interface 3800 of the media display component 3600. The user interface 3800 comprises any number of media objects 3810 in a media object display area 3820. A first bin component 3830 comprising one or more media objects 3835 and a second bin component 3840 comprising one or more media objects 3845 are also included in the media display component 3800. As shown in the figure, bin component 3840 is highlighted. Thus, the media objects 3850 in the display area 3820 that correspond to the media objects 3845 in the bin 3840 are also highlighted in the display area 3820.

Finally, a pop-up menu 3860 associated with the second bin 3840 has been opened (e g., by right-clicking on some portion of the bin 3840). The pop-up menu 3860 comprises any number of options a user may implement or perform on the bin 3840 and its media objects 3845. Some options such as "assign category" 3865 may contain further options to choose from in order to complete the desired task.

Figure 39:
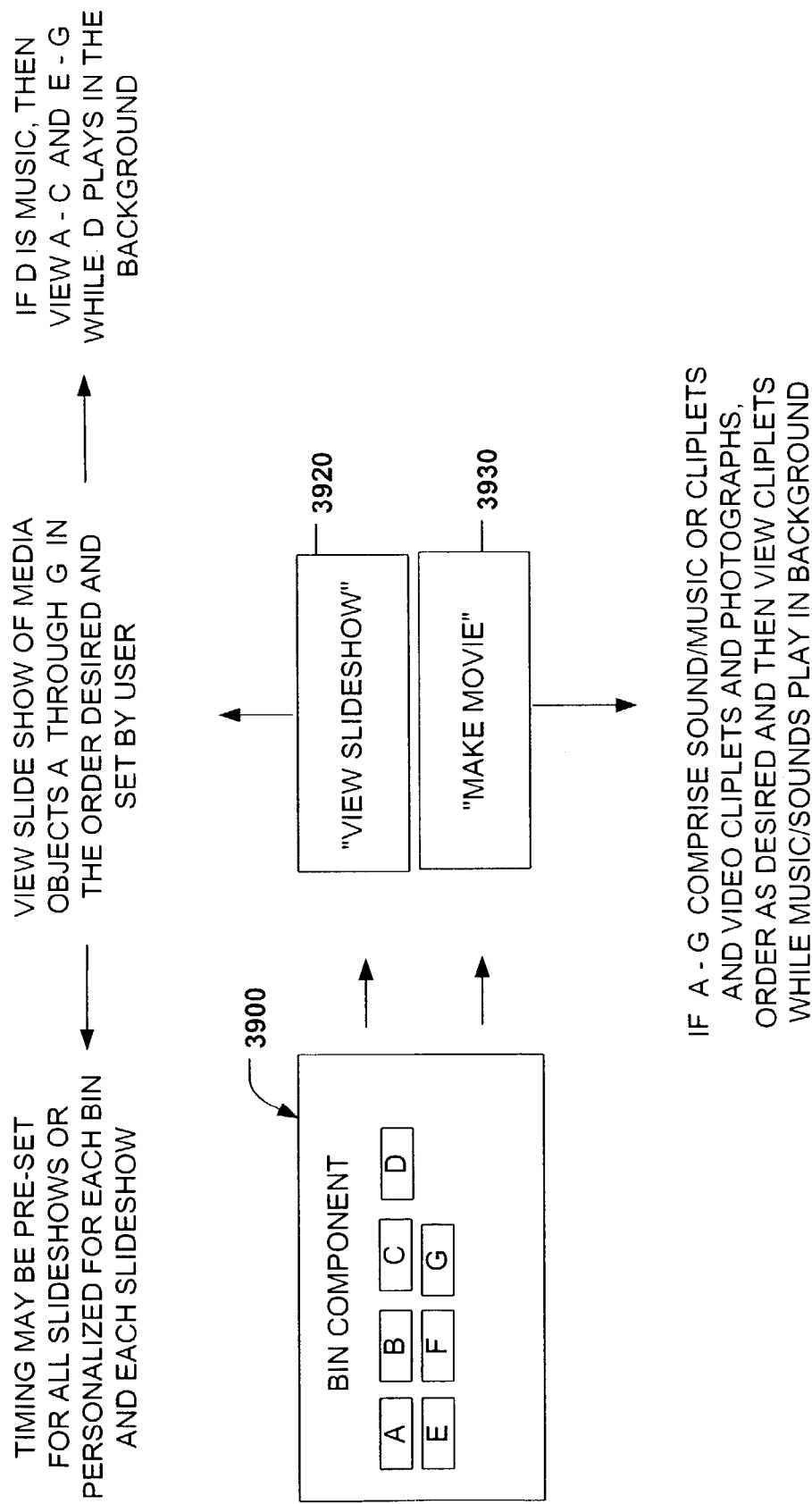
FIG. 39 is a block diagram of an exemplary bin component in accordance with an aspect of the present invention.

FIG. 39 illustrates other actions which may be performed on an exemplary bin component 3900 in accordance with an aspect of the present invention. Media objects 3910 may be selected by a user selection component (not shown) and added or moved to the bin component 3900. The bin component 3900 receives at least two media objects 3910, which in the present example, are identified as media objects A, B, C, D, E, F, and G. The media objects may be annotated en masse with metadata including intrinsic and/or extrinsic metadata, thereby tagging each media object with the metadata. Additional or fewer media objects may be located in the bin component 3900 as desired.

Depending on a user's preferences, the user may select to make a movie or view a slide show of the media objects 3910 contained in the bin 3900. This may be accomplished in part by the bin component 3900 manipulating the media objects 3910. More specifically, the bin component 3900 correlates the media objects 3910 in order to generate a new media object, such as a slide show or movie. Correlating the selected media objects involves employing the metadata annotated to the media objects to identify critical or key portions of the respective media objects. This facilitates determining a length of the media object which is suitable to form a transition between and from media object to media object (e.g., transition from media object A to media object B). Thus the media objects are truncated to a suitable length, and extraneous portions of the media object are removed in order to create the new media object (e.g., movie, slideshow, collage, song, music, document, message, and/or any combination thereof etc.).

The media objects identified above (e.g., A–G) may comprise at least one of a visual component, an audio component, or a portion thereof, and/or any combination thereof.

According to one implementation, if "view slide show" 3920 is selected by the user, then a slide show of the media objects 3910 ordered alphabetically A through G may be seen. The order of the media objects may be manually, electronically or automatically performed based at least in part upon the user's desired application. When the content type of the media objects 3910 is mixed between still pictures, photographs, text and music, sounds, and the like (or cliplets thereof), then the user may arrange for the audio portions to be played in the background as the still pictures, photographs, etc. appear in the slideshow format.

Conversely, the user may desire the media objects to appear in the precise order such that each media object is "played" in the order it is in. Thus, music or audio would not be playing in the background of the whole slide show. Further, the user may tailor the slide show such that the timing or pace of the appearance of the slides coincides with the length of the audio portions. Moreover, the bin component 3900 may determine the overall length of the new media object. Metadata associated with media objects A–G are also associated and annotated to the new media object. The new media object may be saved and retained for later use or reference.

The same may be applied when selecting to make a movie (3930). However, this action may involve media objects comprising streaming video cliplets or other whole or partial video recordings or film. New media objects comprising only audio may also be created by media objects comprising audio bits, sound clips, songs, music, and the like. Therefore, mixing, editing and creating new pieces of music, video, etc. may be accomplished with relative ease, speed, and accurateness, and may be shared with others immediately via email or user access to the bin 3900.

Figure 40:
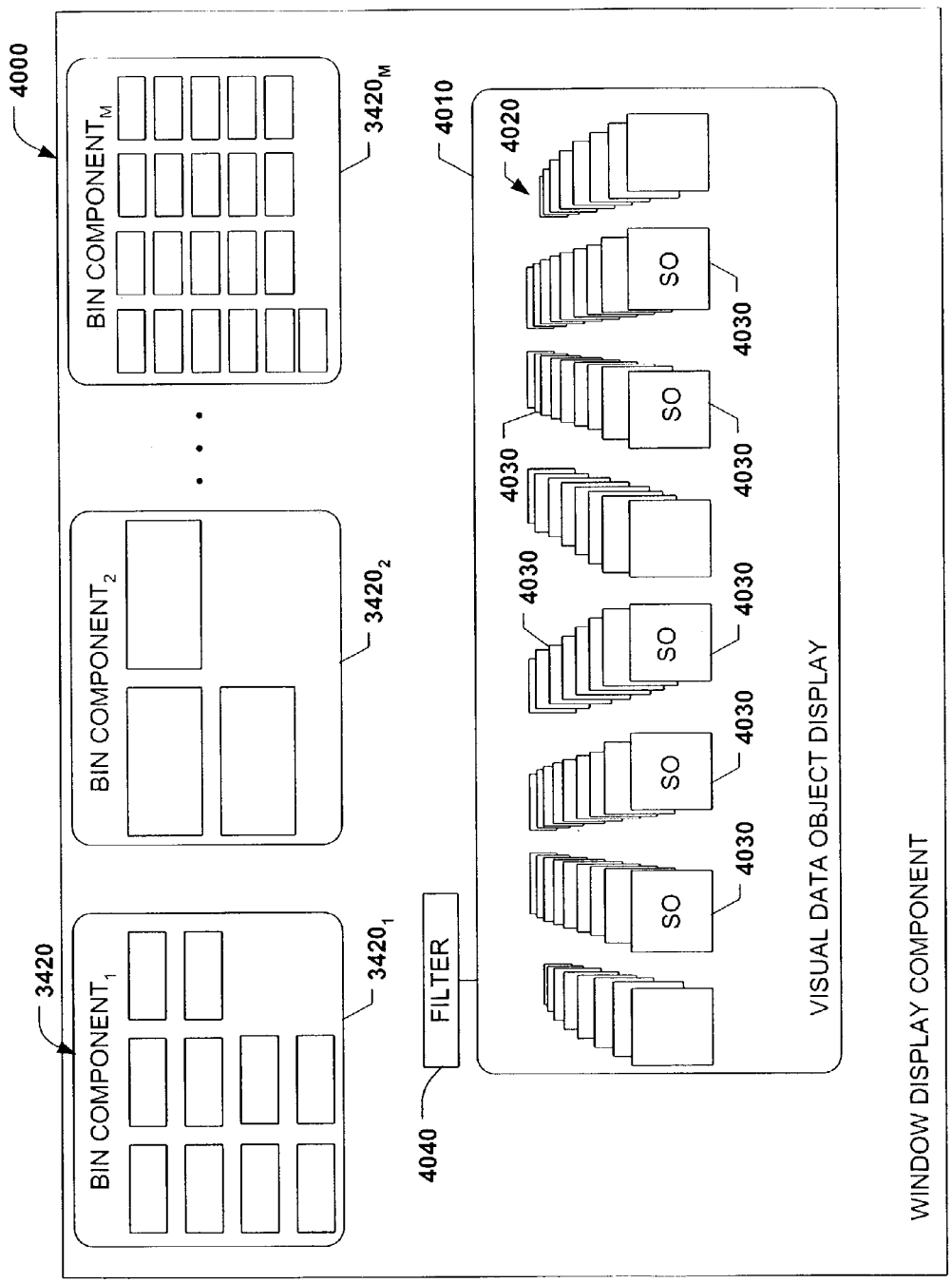
FIGS. 40–44 are sequential images of an exemplary user interface illustrating an implementation of a "filter" command in accordance with an aspect of the present invention.

Referring now to FIGS. 40–44, images of an exemplary sequence are shown involving an implementation of a "filter" command in accordance with an aspect of the present invention. FIG. 40 demonstrates a media display component 4000 that comprises a media object display area 4010. The media display area 4010 comprises any number of media objects 4020. In particular, selected media objects (SO) 4030 appear highlighted (e.g., dashed and dotted line) to undergo a subsequent action, for example. Optional commands such as filter 4040 are illustrated in the media display component 4000 to facilitate browsing, sorting, clustering and searching through the media objects 4020.

Figure 41:
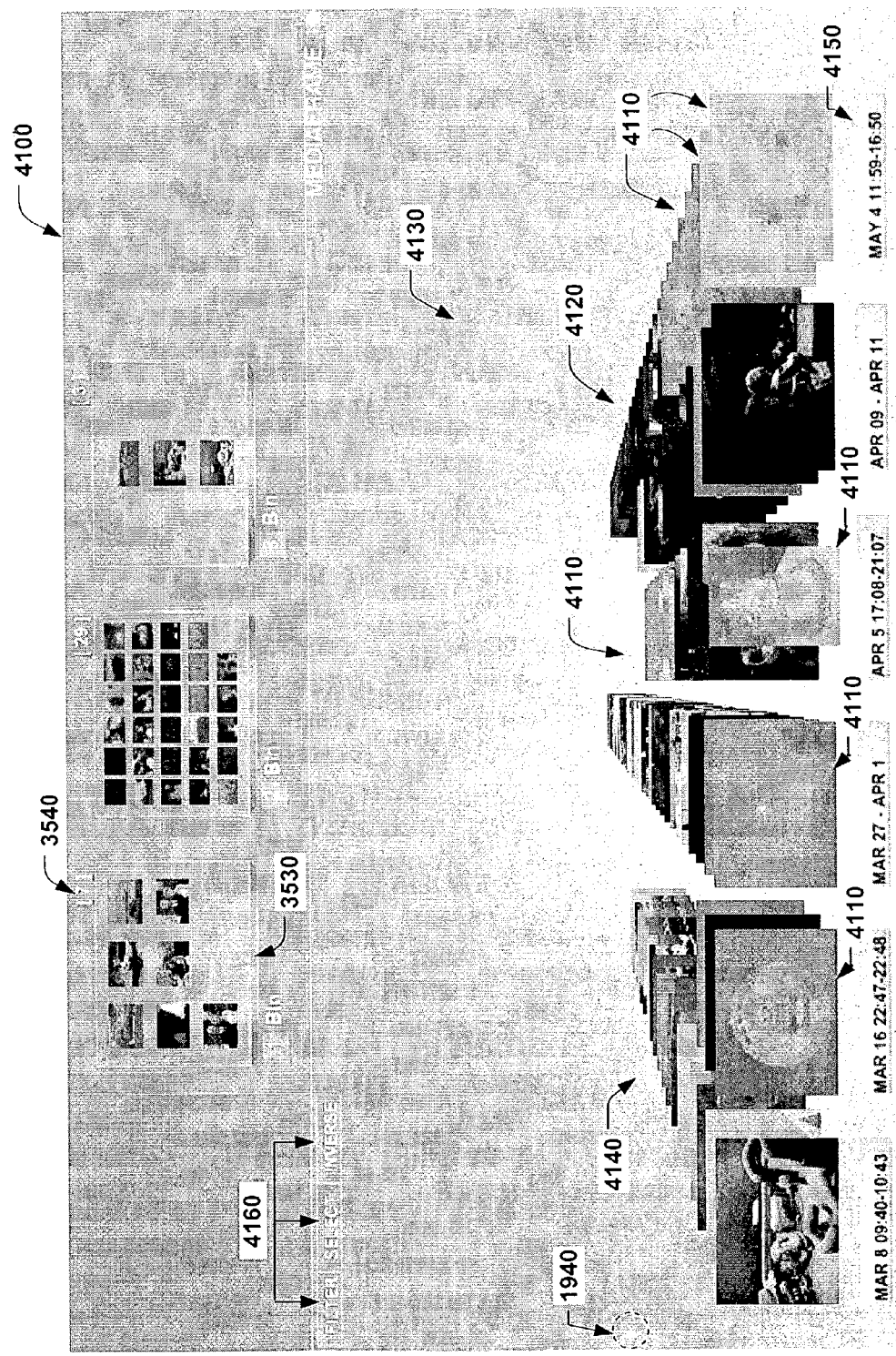

FIG. 41 depicts an exemplary user interface 4100 of the media display component 4000. More specifically, highlighted media objects 4110 have a different appearance than the other (non-highlighted) media objects 4120 in the media object display area 4130. The media objects 4110, 4120 are arranged in media object time clusters 4140 and each time cluster 4140 is associated with a cluster tag 4150 as previously described. In addition, the user interface 4100 comprises one or more optional command keys 4160.

Figure 42:
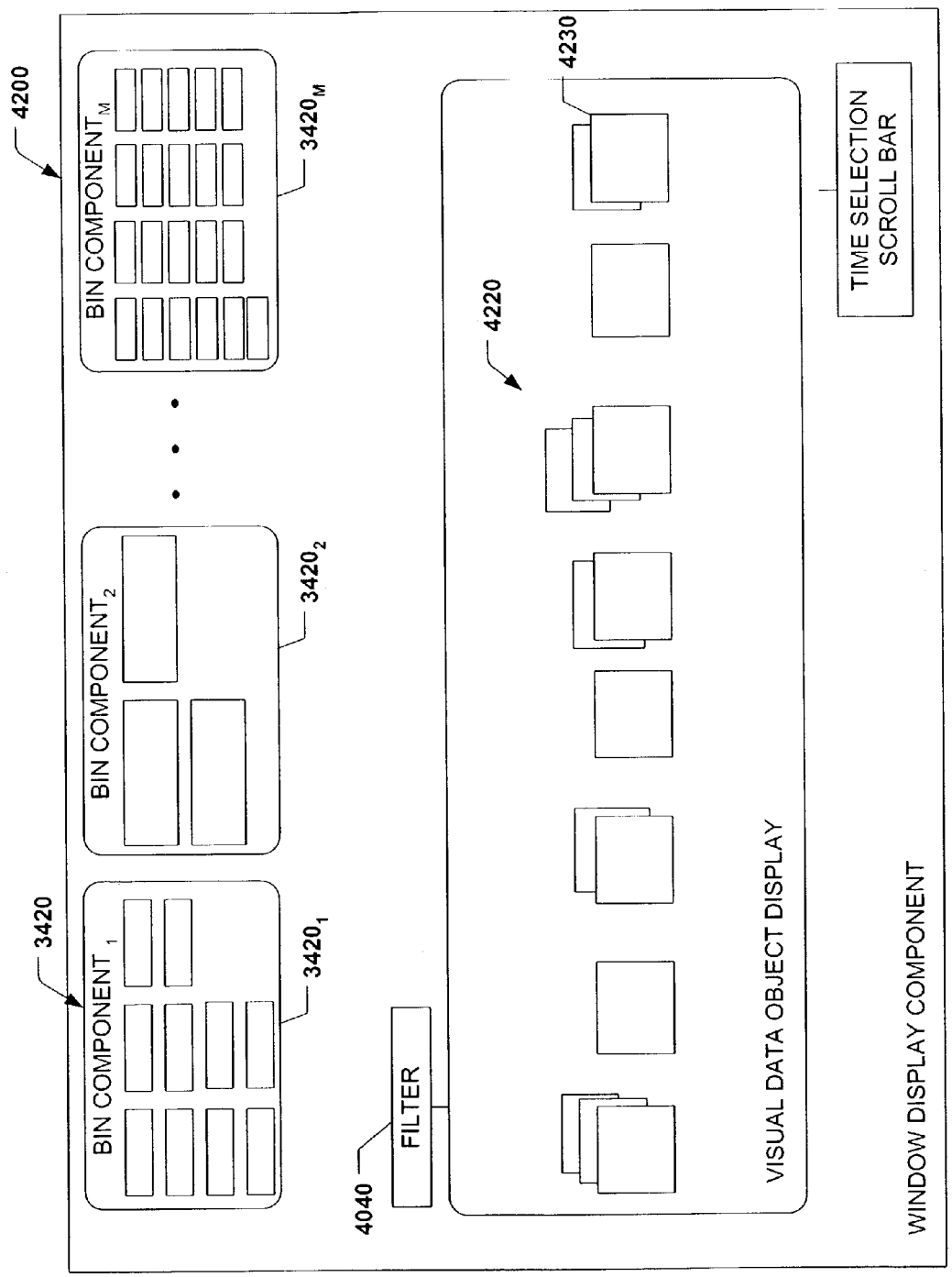

According to FIG. 40, when a command key such as the filter command 4040 is selected, all of the media objects 4020 except for the highlighted media objects 4030 disappear from the media display area 4010 as seen in FIG. 42. A media display component 4200 in FIG. 42 results from the filter action performed in the media display component 4000 of FIG. 40.

Depending on the command or action invoked by a user, the highlighted media objects 4030 (FIG. 40) rearrange themselves in order to populate the display area 4210. Media object time clusters 4220 are maintained depending on media objects 4230 currently present in the media object display area 4210. This may be more clearly demonstrated in FIG. 43, in which an exemplary user interface 4300 resulting from filtering media objects 4310 is shown.

Figure 43:
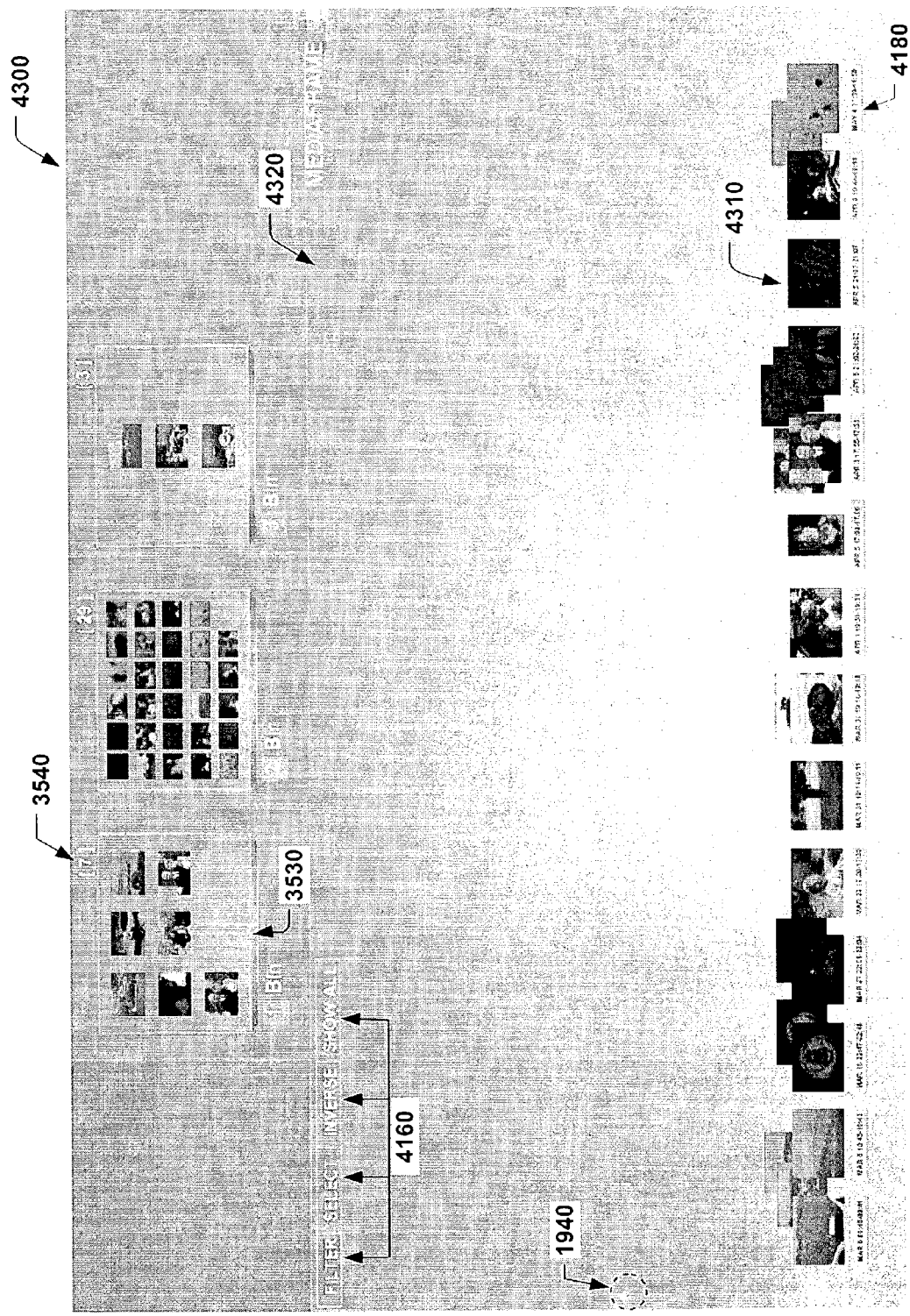
Figure 44:
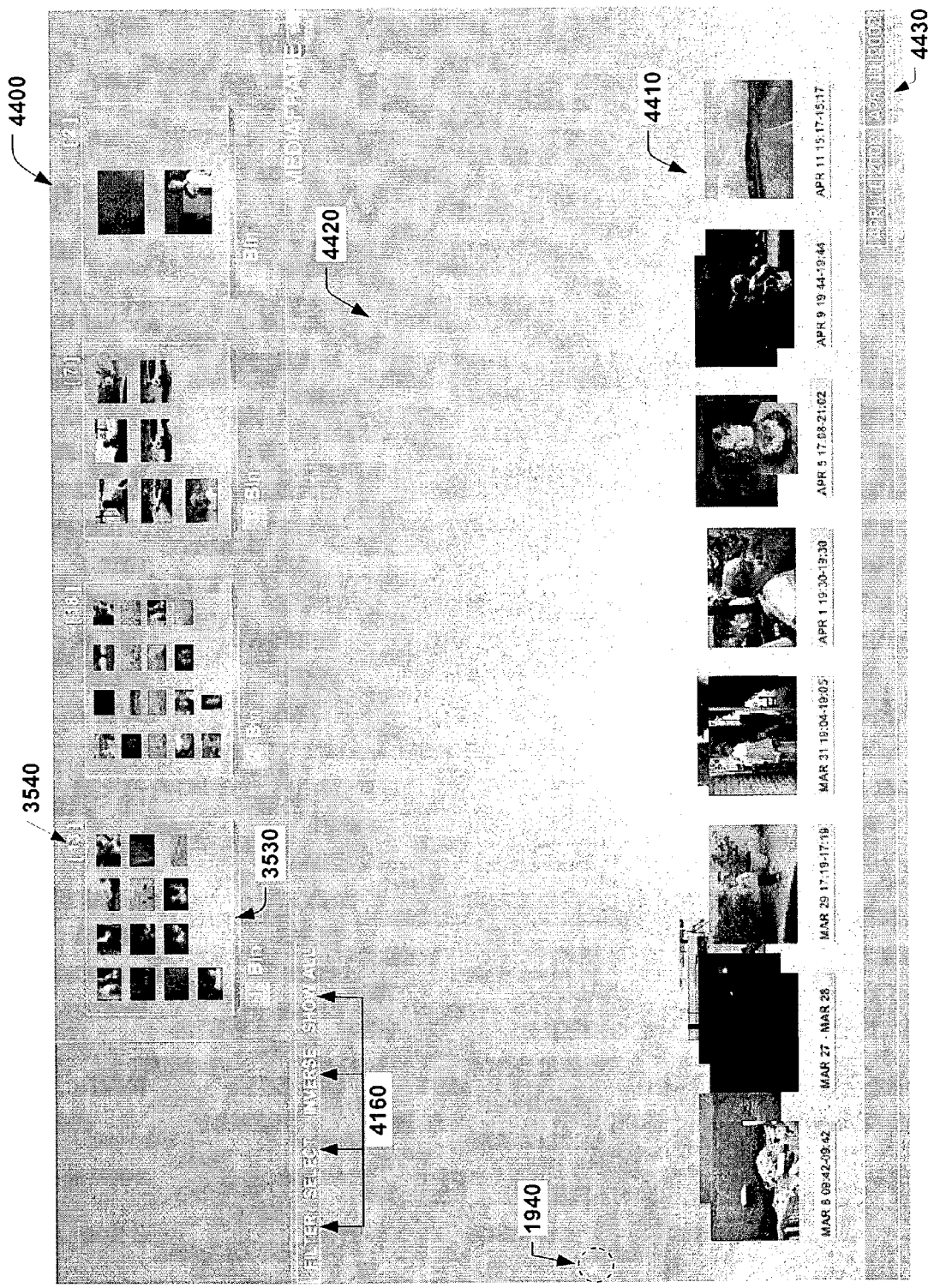

Moreover, the media objects 4310 may be further filtered in order to further reduce the number of media objects to be viewed. FIG. 44 illustrates a user interface 4400 resulting from yet another invocation of the filter command (e g, 4040 in FIG. 40). As a result of the subsequent filter of media objects 4310 (FIG. 43), media objects 4410 now remain in the media object display area 4420. Upon examination of the time cluster tags 4430 as compared to the cluster tags 4180 in FIG. 43, it can be observed that the media objects annotated with dates after Apr. 11, 2002 have been removed by selectively highlighting and filtering the media objects 4310 (FIG. 43).

Turning to FIGS. 45–61, an array of exemplary user interfaces are shown demonstrating various media object animation/movement sequences which may occur as a result of browsing, sorting,. clustering and manipulating the media objects as described herein. Each figure to be described represents a time slice of the animation sequence.

As media objects are filtered such as described in FIGS. 40–44, their movements are or can be visualized by the user. Images provided in FIGS. 45–48 provide a frame-by-frame demonstration of the animation sequence involved in filtering any number of media objects arranged in stacked view.

Figure 45:
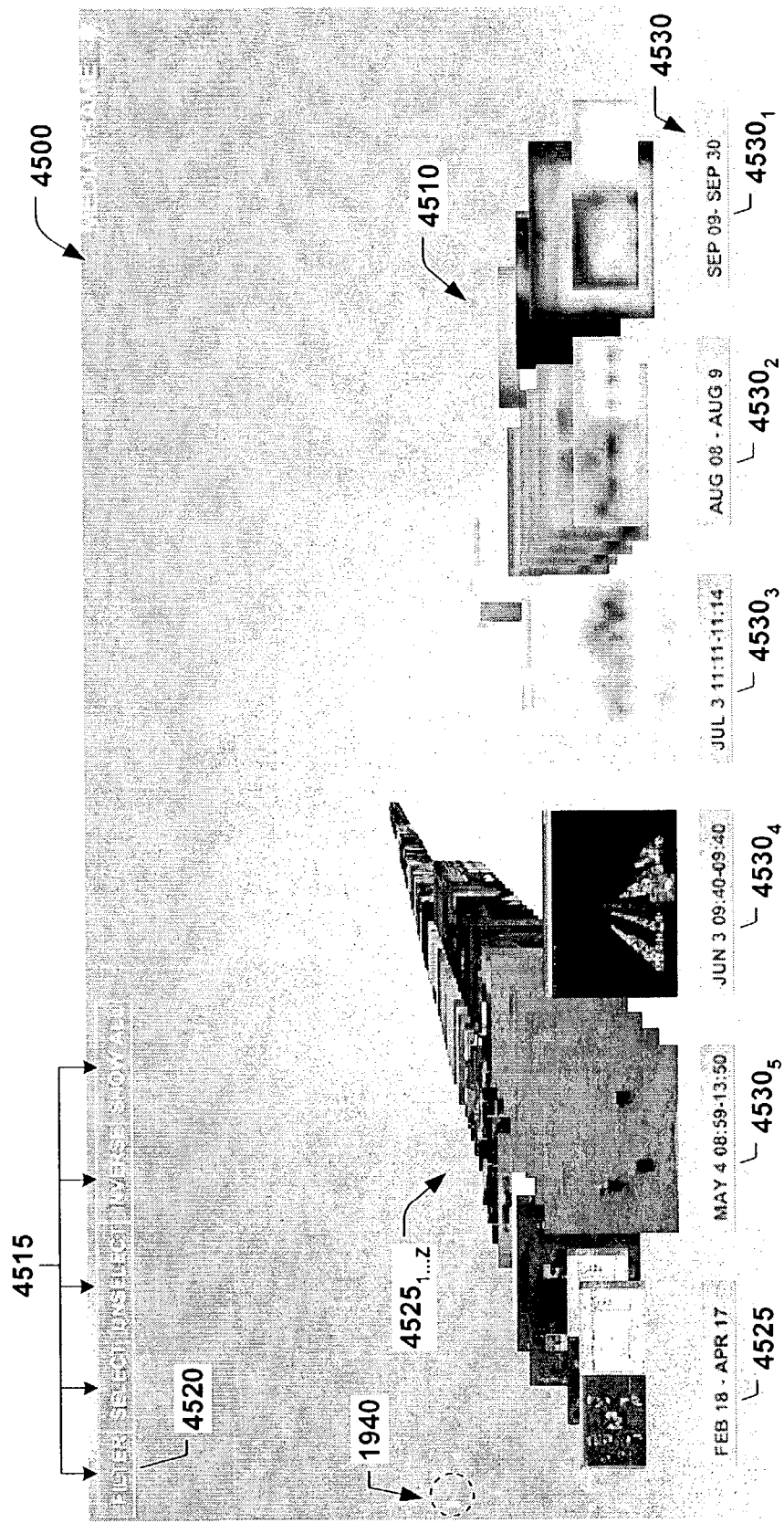
FIGS. 45–48 are images of an exemplary user interface in a frame-by-frame sequence demonstrating media object animation in stacked view in accordance with an aspect of the present invention.
Figure 46:
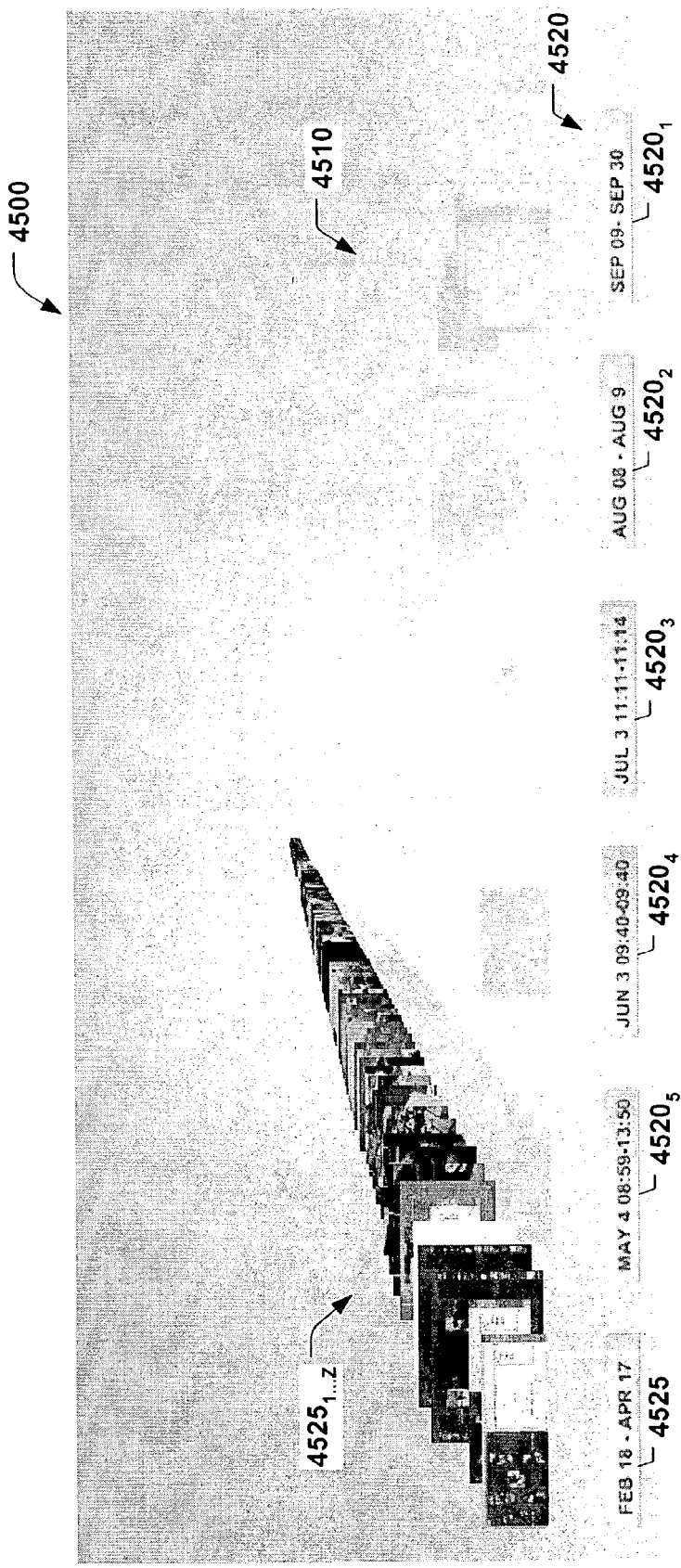

Beginning with FIG. 45, a media display component 4500 depicts the initial movements of media objects 4510 as a result of invoking a "filter" command 4520. Cluster tag 4525 (February 18–April 17) corresponding to media objects $4525_{1...z}$ is highlighted. The filter command 4520 instructs the media objects in cluster tag 4525 to remain in the media display component 4500. Likewise, the filter command instructs all other cluster tags 4530 and their corresponding media objects 4510 (e.g., which are not highlighted) to be removed from the media display component 4500.

As can be seen, the media objects 4510 arranged in time cluster tags 4530 labeled September 9–September 30 ($4530_1$) appear to be hazy as if they are disappearing from the media display component 4500. Time cluster tags $4530_2$, $4530_3$, $4530_4$, $4540_5$ follow in progression in a left to right direction until the media objects 4510 in the time clusters 4530 are barely visible. This can be more readily seen in FIG. 46.

Figure 47:
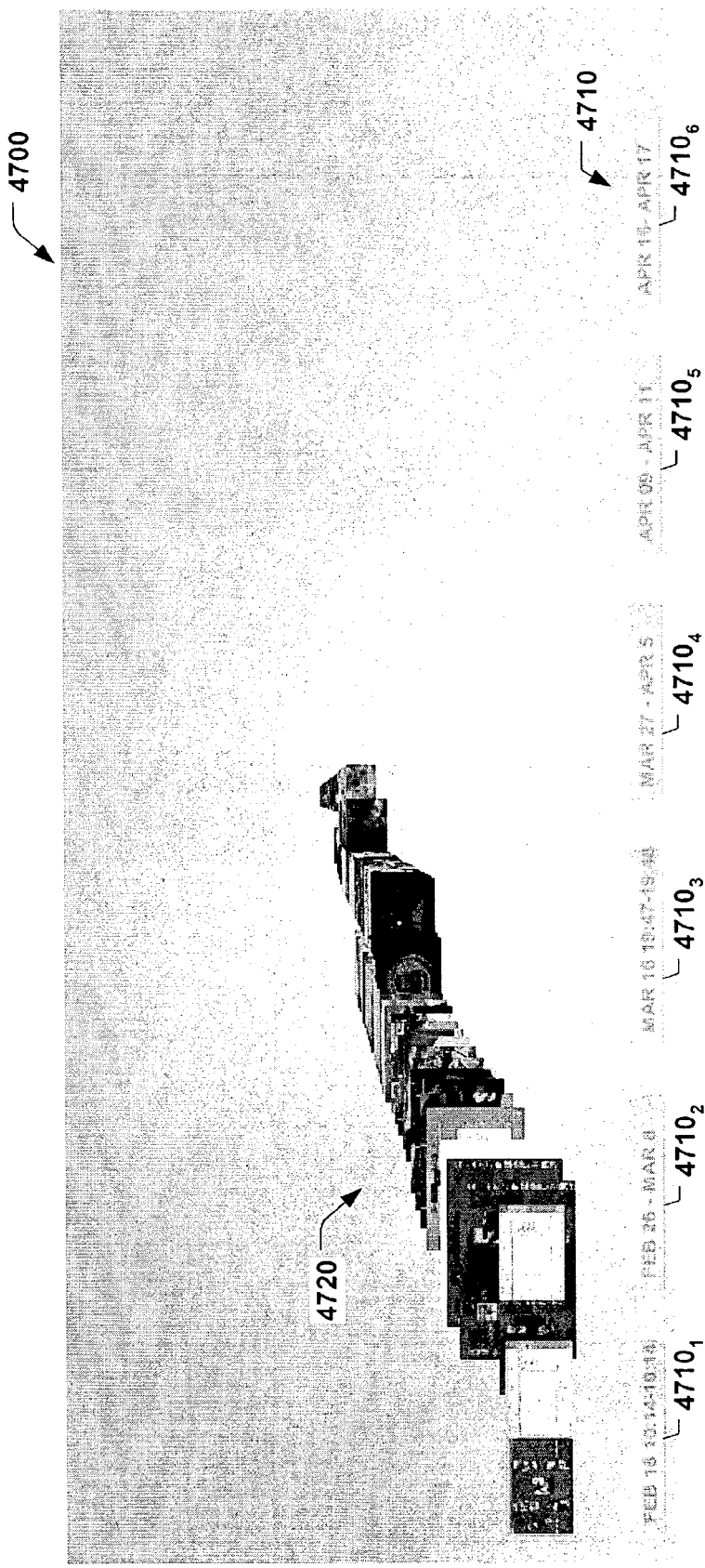

FIG. 47 is a subsequent time slice demonstrating the change in time clusters present in a media display component 4700. Multiple time clusters 4710 representing the date range of February 18 to April 17 can be seen in the media display component. The breakdown of the time clusters may be based in part on user preferences. In addition, the breakout of the time clusters may be automatic in order to maximize the viewable size of the media objects while maintaining a reasonable number of time clusters.

Figure 48:
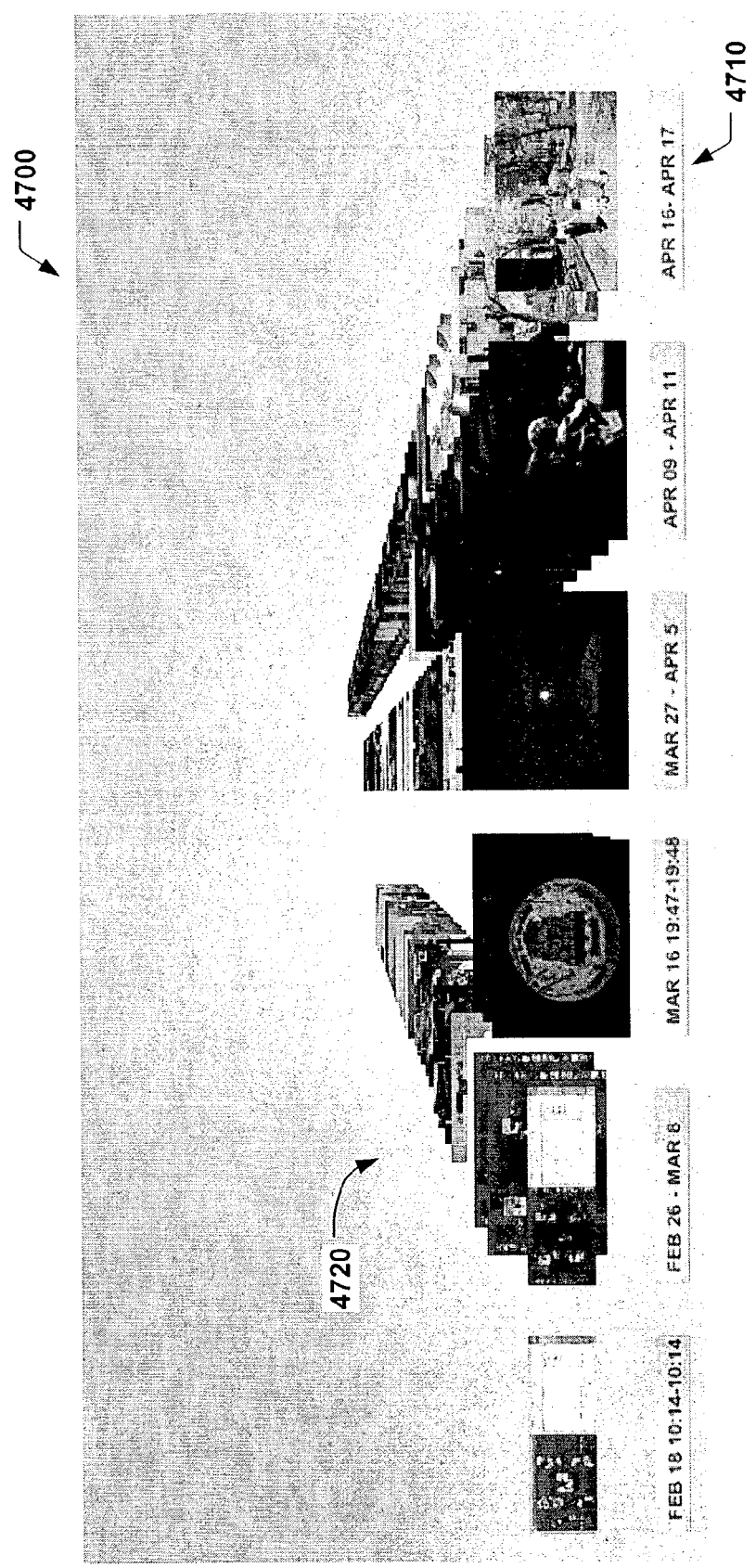

Media objects 4720 are shown populating the open space of the media display component according to the designated time clusters 4710 and in an orderly progression from one direction to another (e.g., left to right). Media objects which are further away from the user appear smaller than objects which are meant to appear closer to the user. FIG. 48 illustrates the media display component 4700 which results after the media objects 4720 have fully repopulated the media display component 4700.

Figure 49:
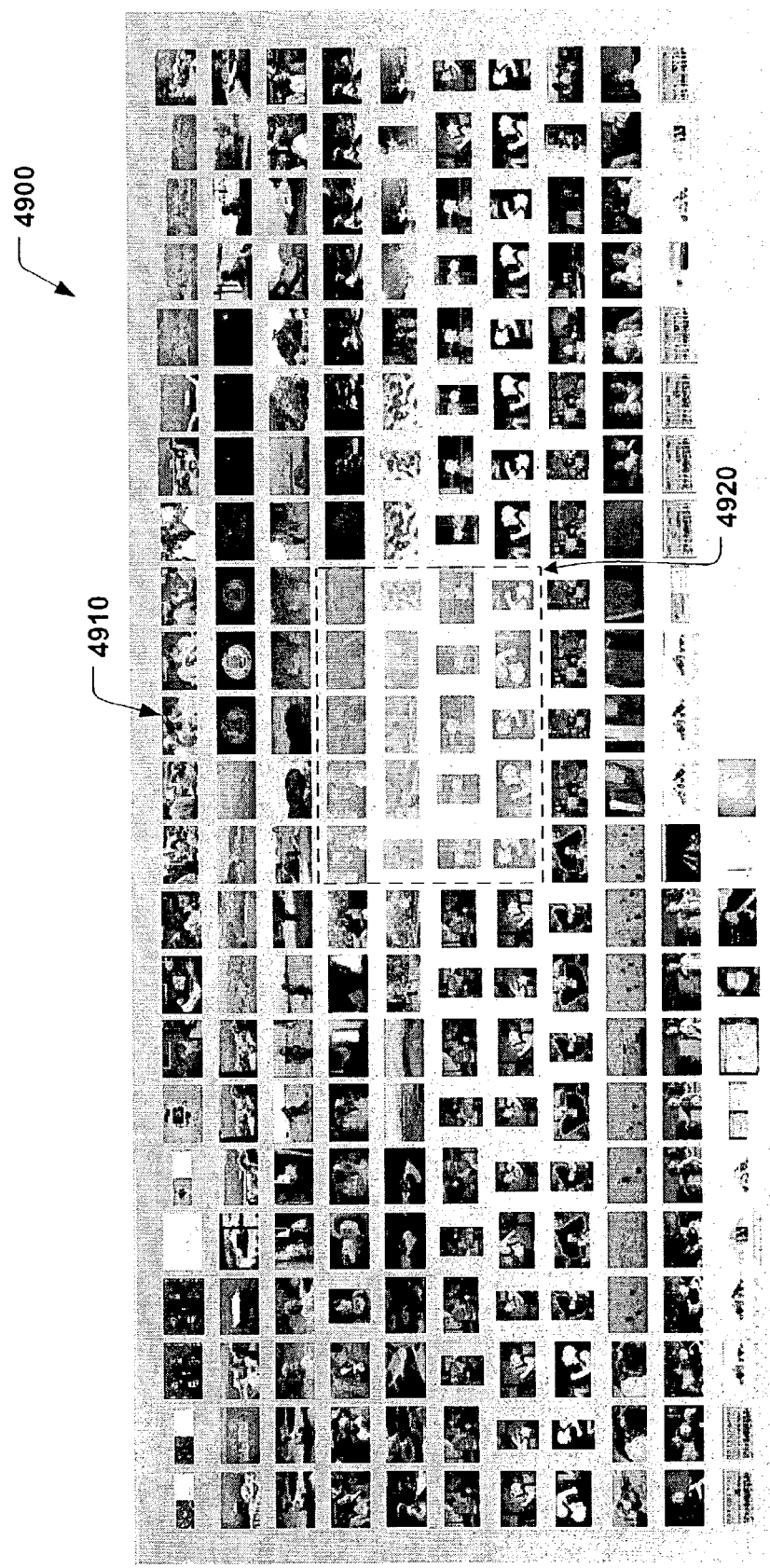
FIGS. 49–52 are images of an exemplary user interface in a frame-by-frame sequence demonstrating media object animation in raster view in accordance with an aspect of the present invention.

The images provided in FIGS. 49–52, which follow below, provide a frame-by-frame demonstration of the animation sequence involved in filtering any number of media objects arranged in raster view. FIG. 49 represents a media display component 4900 comprising any number of media objects 4910. In order to filter the media objects 4910, any number of media objects 4920 may be highlighted by a user.

Figure 50:
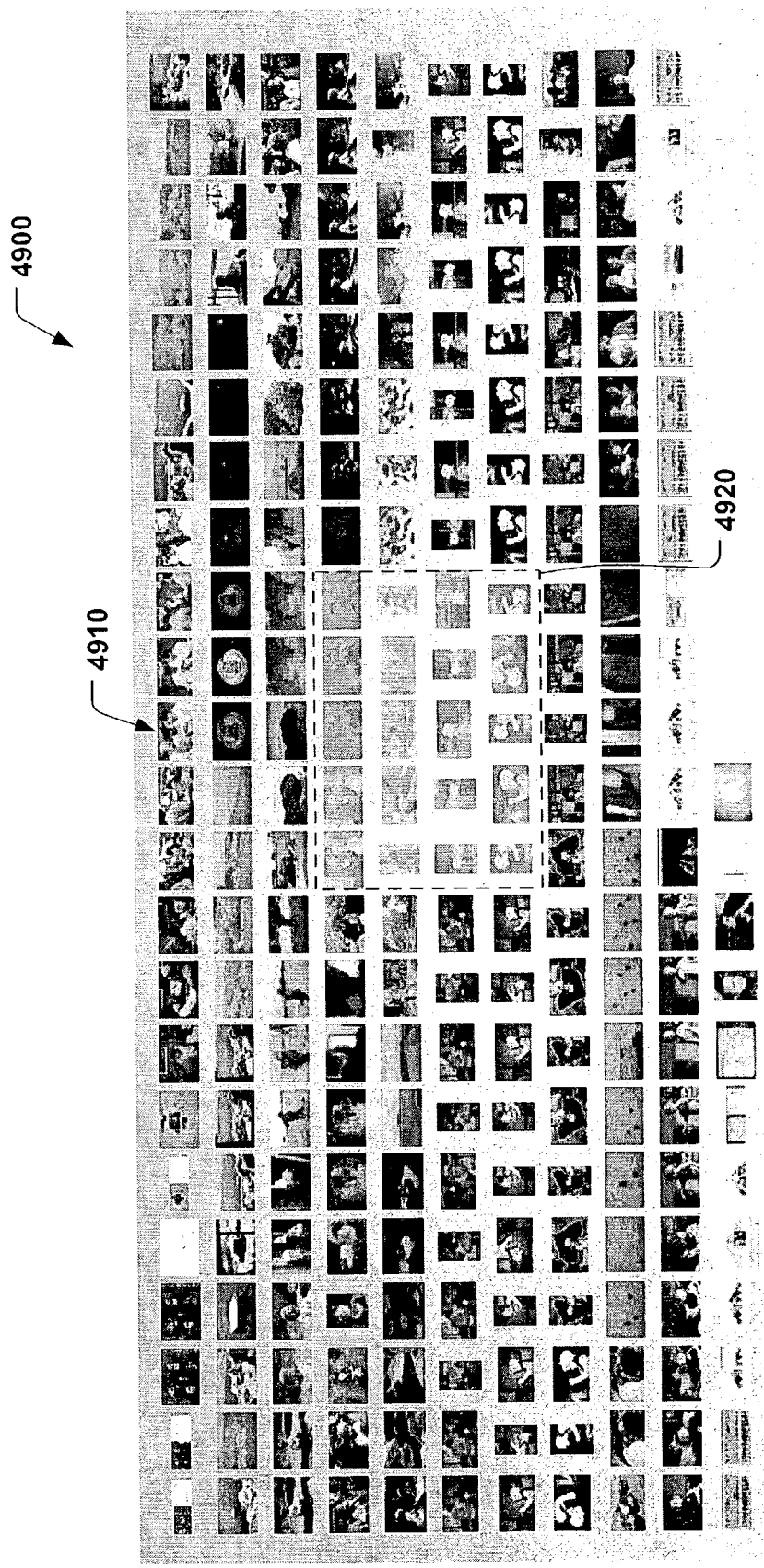

Subsequently, selecting a filter command causes the highlighted media objects 4920 to remain in the media display component 4900 while the other media objects 4910 disappear from the display component 4900. FIG. 50 more clearly illustrates the disappearance and removal of the non-highlighted media objects 4910 from the media display component 1. The black/white contrast between the media objects 4910 disappearing from view and the media objects remaining 4920 indicates the progressive transformation of the display component 4900. In the instance of filtering, the removal of the media objects 4910 is merely temporary, however. They may be viewed again by selecting appropriate command keys (e.g., "show all").

Figure 51:
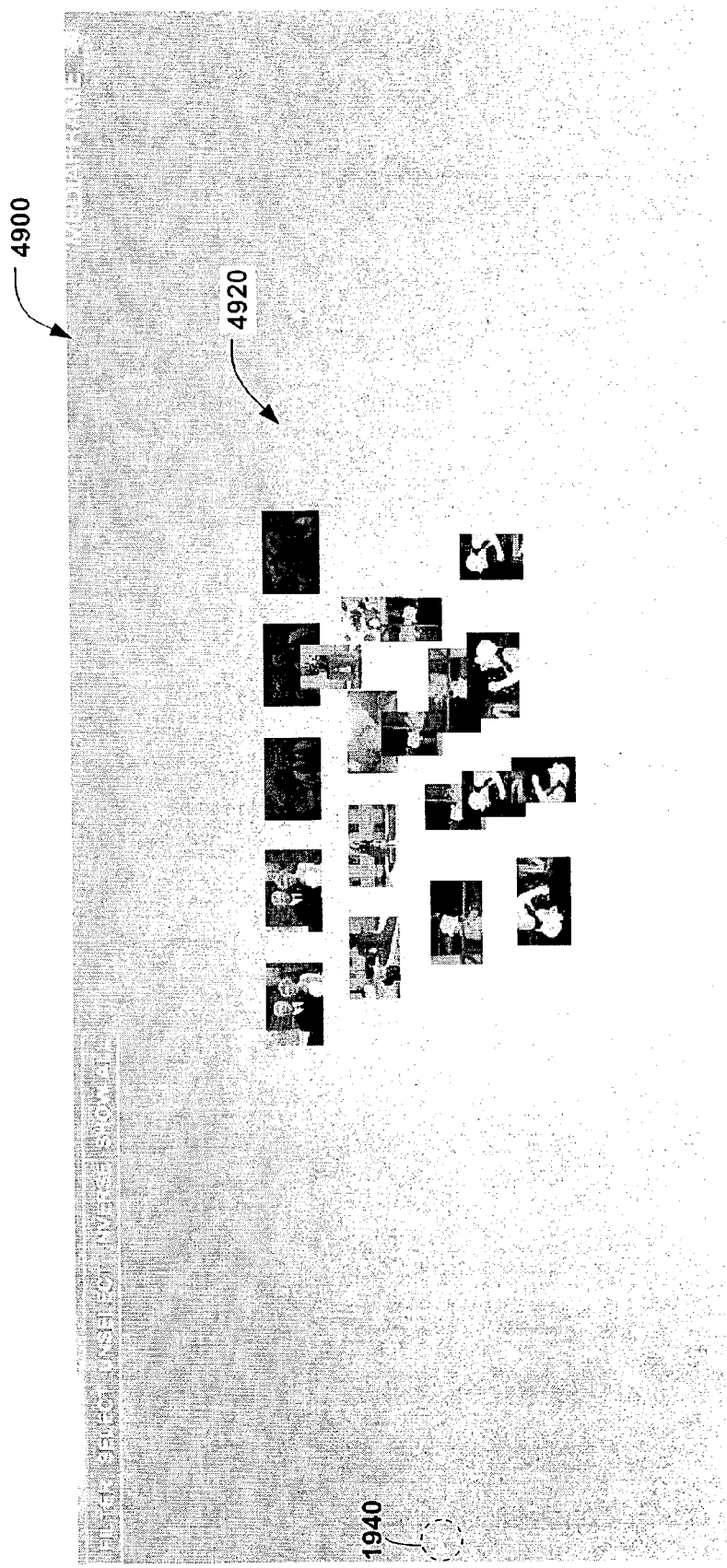
Figure 52:
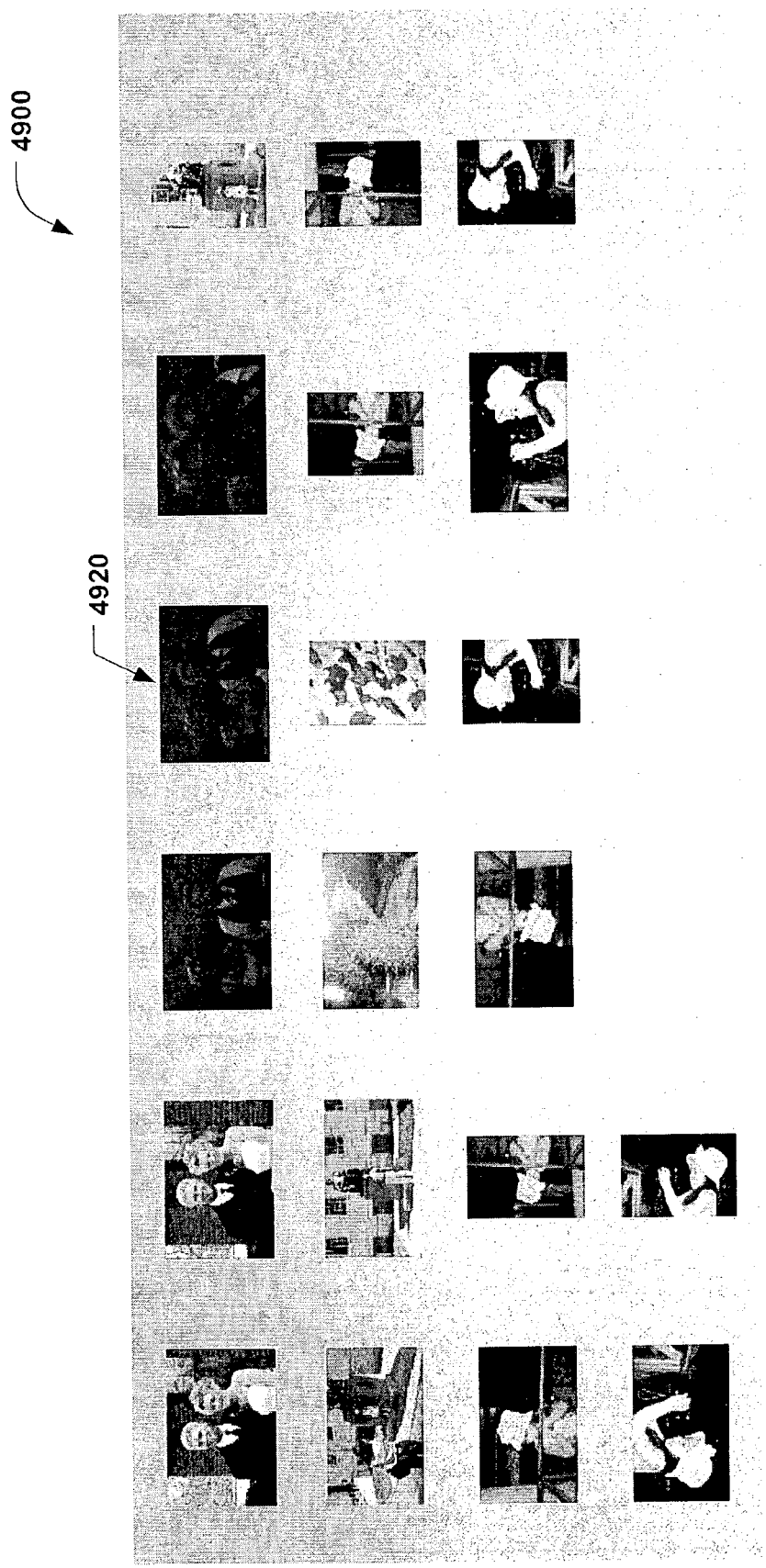

FIG. 51 demonstrates the movements of remaining media objects 4920 as they spread out in order to populate the available space of a media display component 4900. As can be seen in FIG. 52, it should be appreciated that the media objects 4920 have not only populated the available space in the media display component 4900 by spreading out, but also by increasing in individual size. Thus, filtering reduces the number of media objects being viewed at a time which facilitates improved visualization and rapid annotation of the media objects as well as enhanced browsing, sorting and clustering techniques.

Figure 53:
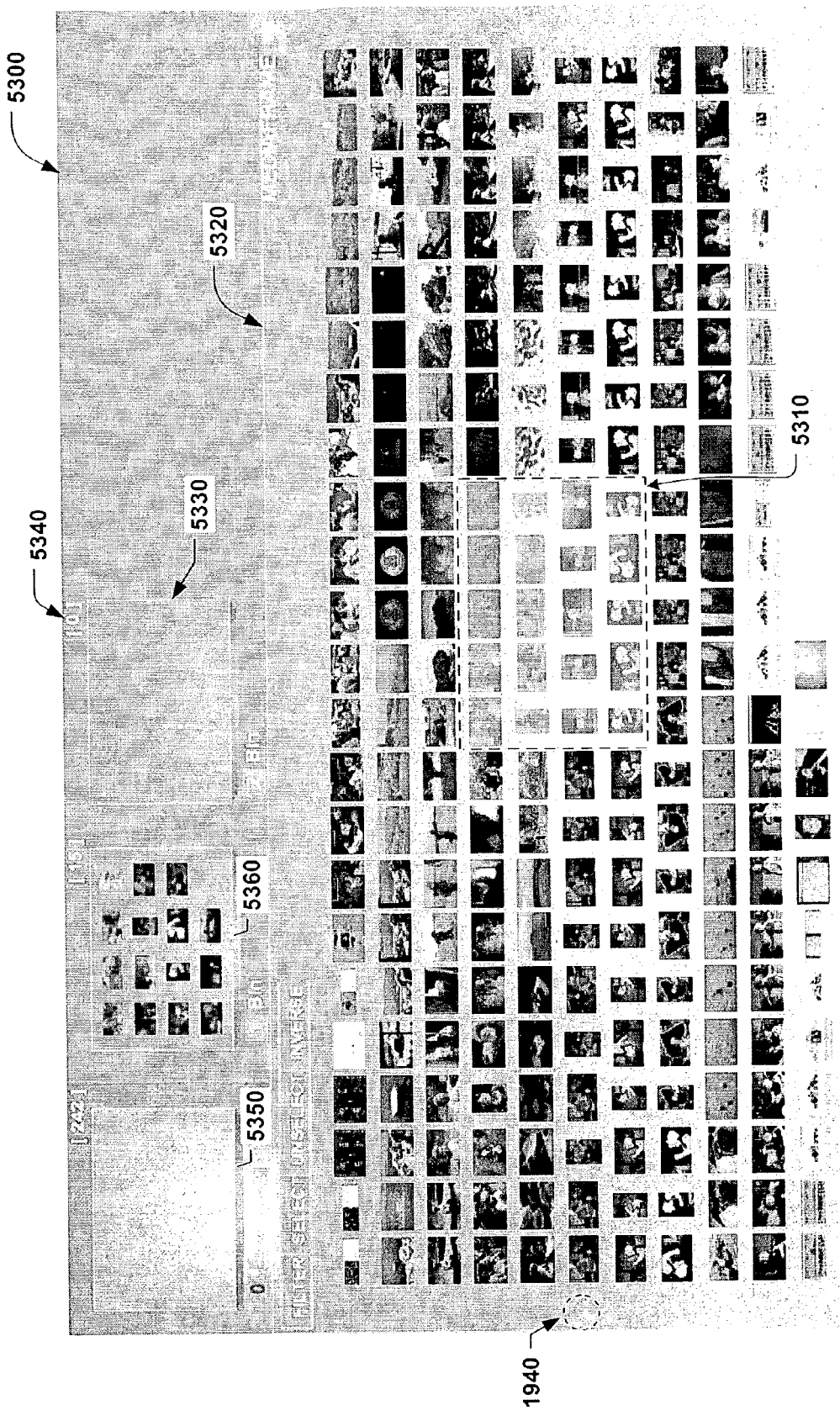
FIGS. 53–56 are images of an exemplary user interface in a frame-by-frame sequence demonstrating media object movement from a media display area to a bin component in accordance with an aspect of the present invention.

Turning now to FIGS. 53–56, a sequence of images are shown which represent the movements of selected media objects 5310 from a media display area 5320 to a bin component 5330, all within a media display component 5300. In FIG. 53, the media objects 5310 are highlighted and ready to be dropped into any bin component, such as the bin 5330 in this example. As soon as the media objects 5310 are selected or highlighted, a bin number such as the number "2" may be selected by the user in order to designate bin "2" 5330 as the receiving bin for the highlighted media objects 5310. Once the bin number is chosen, the highlighted media objects 5310 move thereto.

An object counter 5340 linked with bin 5330 presently indicates that it contains no media objects which is evidenced by the "0" count. However bins 5350 and 5360 include 242 media objects and 15 media objects, respectively. The bin 5350 which is labeled "Everything" may include all media objects available in an object database designated to be employed in the system of this application. This bin 5350 appears to be empty because its 242 media objects have been retrieved from the bin 5350 and transferred to the media display area 5320 for browsing, clustering, sorting, etc. The same may be done with any bin and its media objects.

Figure 54:
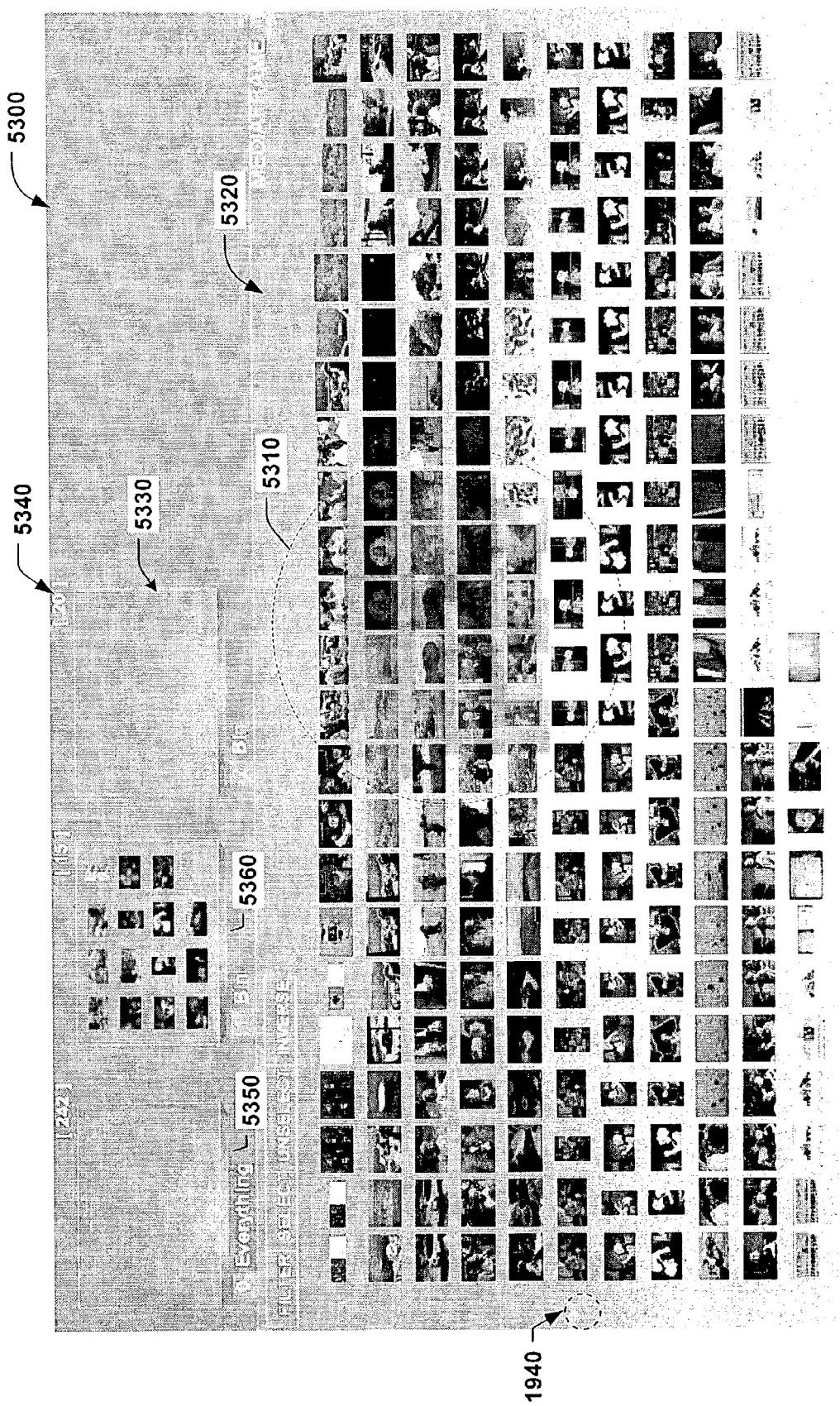
Figure 55:
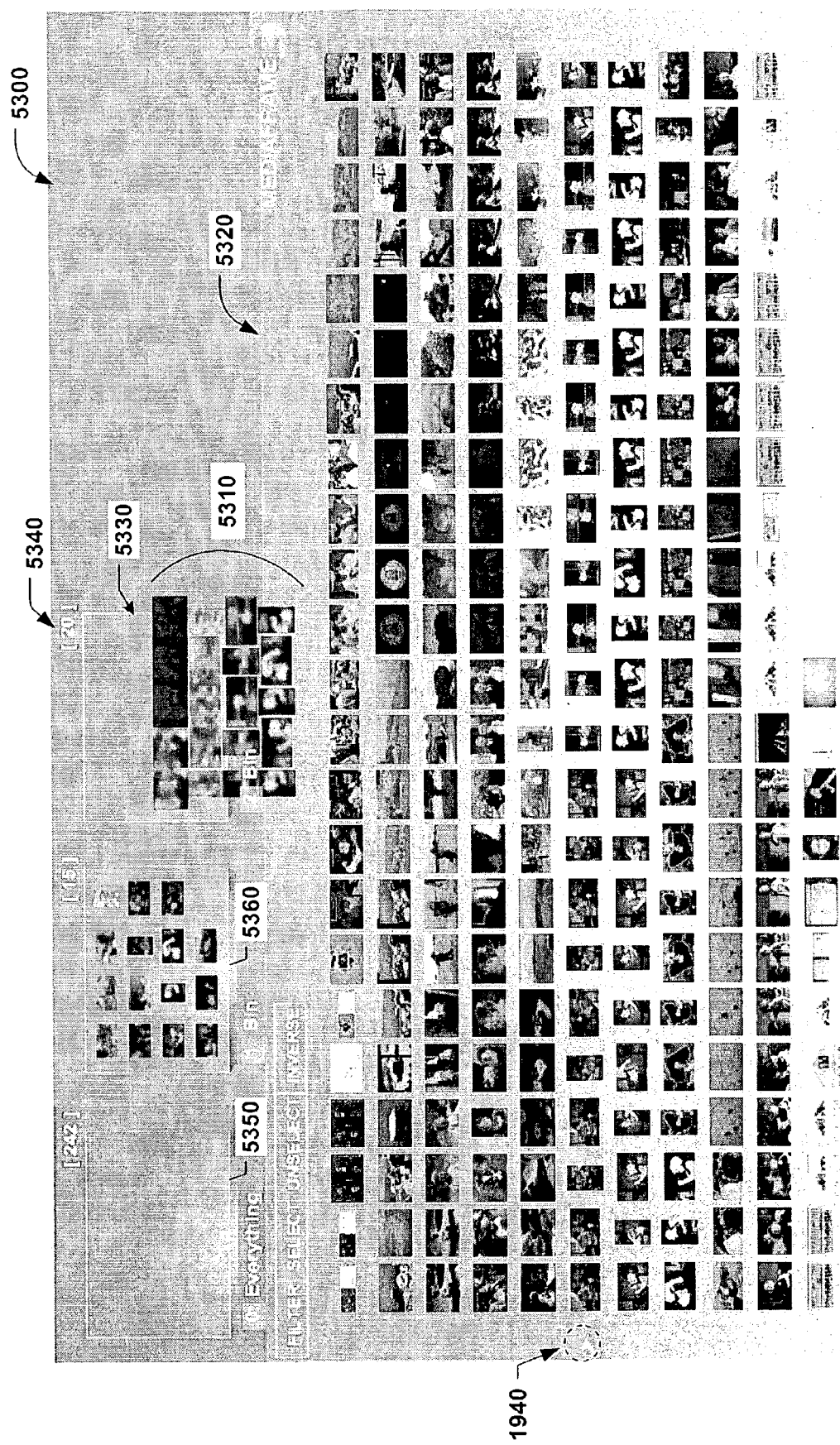

FIG. 54 illustrates the media objects 5310 (or images of the media objects) moving toward the bin 5330 in a cloud-like formation. FIG. 55 demonstrates further progression of the media objects 5310 as they approach the bin 5330. As can be seen in the figure, the object counter 5340 is indicating that 20 objects are held in or by the bin 5330. Thus, even though the media objects 5310 have not completely arrived in the bin 5330, the bin 5330 already acknowledges that the selected media objects are forthcoming.

Figure 56:
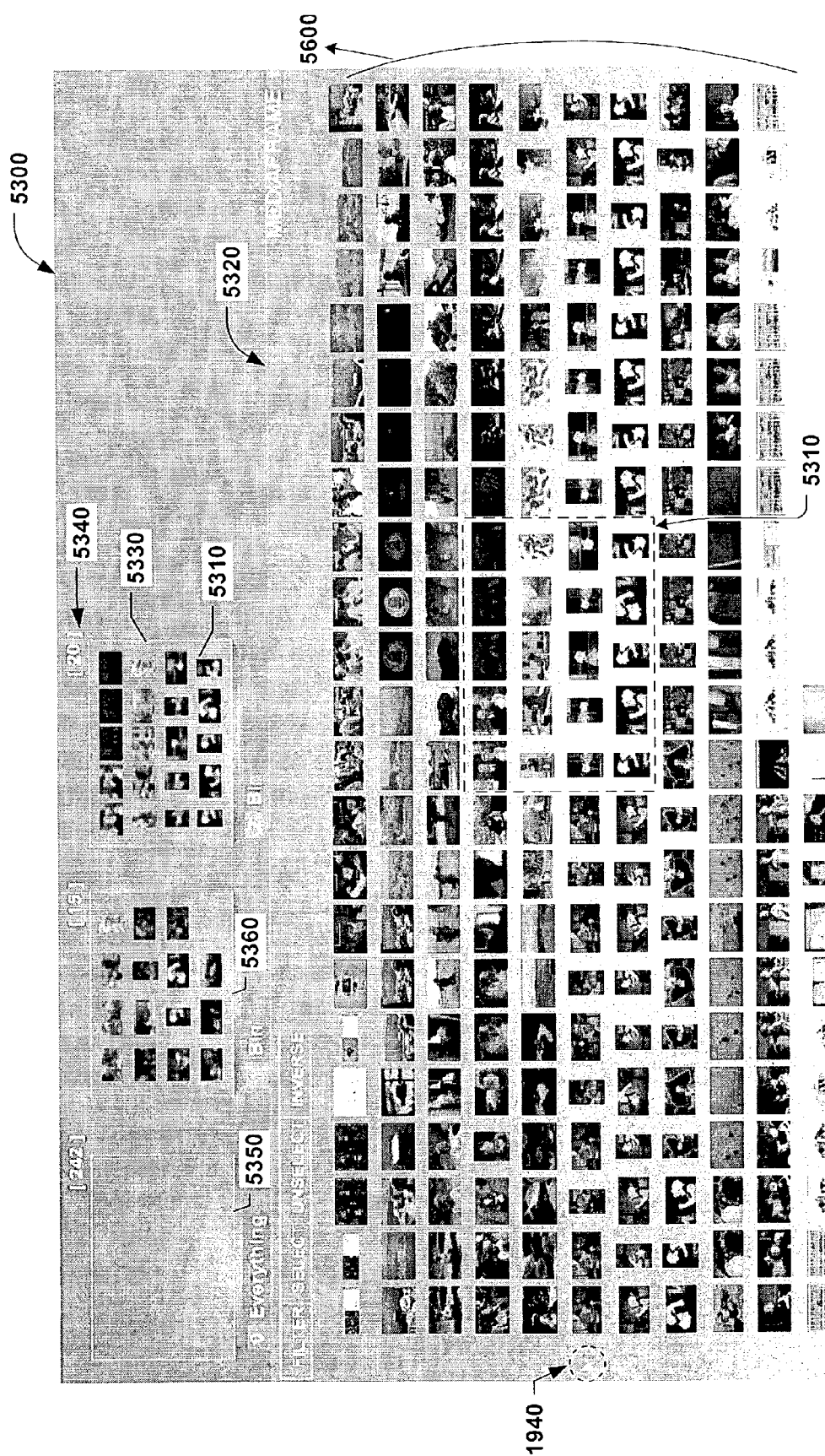

FIG. 56 demonstrates that the selected media objects 5310 are now in the "2" bin 5330, where they may be annotated with any number of metadata based at least in part on the user's preferences. Though the selected media objects 5310 were dropped into the bin 5330 for annotation and may be modified in the bin 5330, the "original" version of the media objects 5310 remains in the main database of all media objects in the media object display area 5320. More specifically, modification of the media objects while in the bin 5330 may or may not be temporary depending on the user's preferences and instructions. That is, annotation of the media objects with metadata in the bin 5330 may be removed once the media objects are discarded from the bin or once the bin is deleted. Conversely, the annotated media objects may remain modified as such even after being discarded from the bin.

Figure 57:
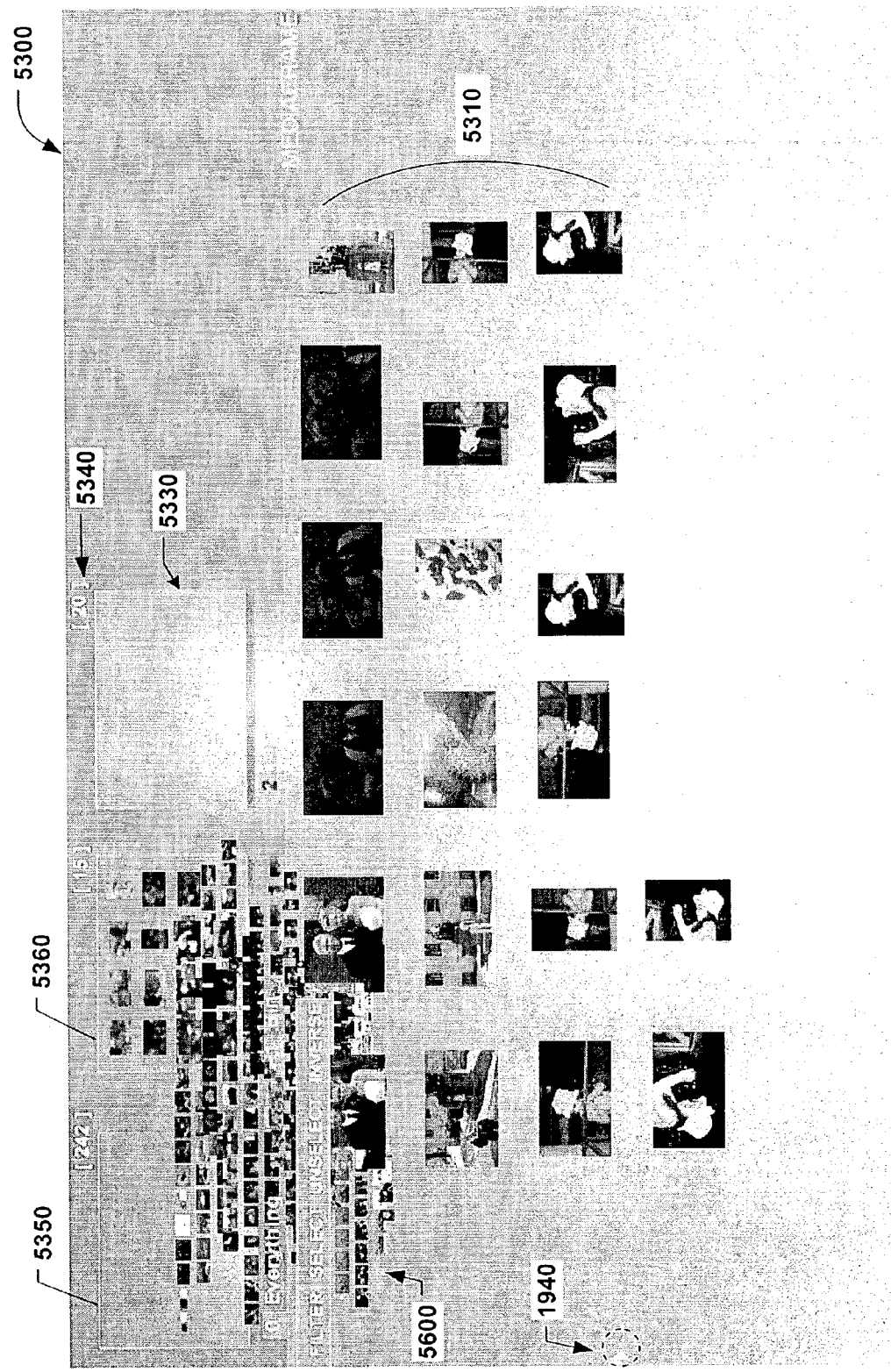
FIGS. 57–58 are images of an exemplary user interface in a frame-by-frame sequence demonstrating media object retrieval from a bin component in accordance with an aspect of the present invention.
Figure 58:
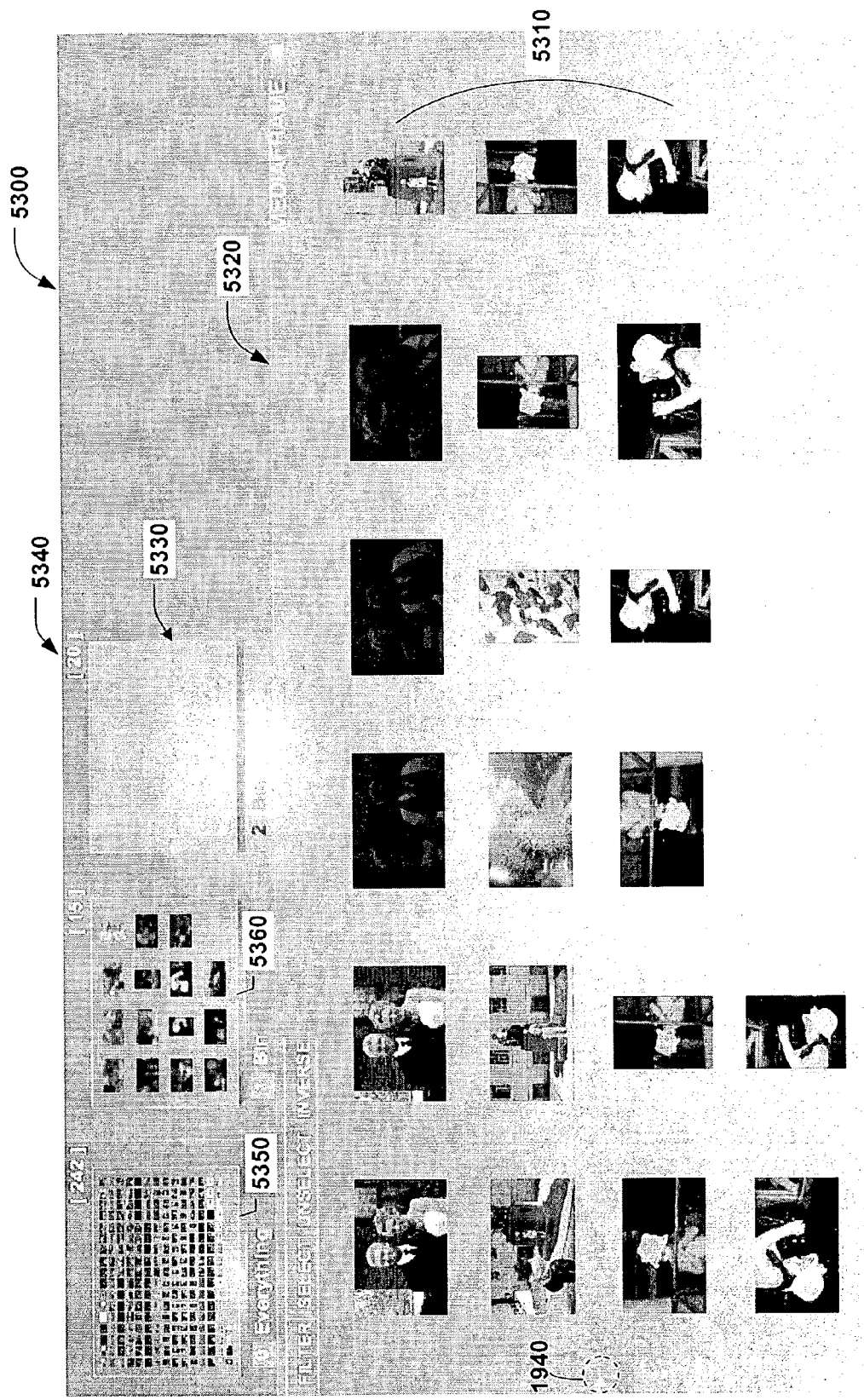

The media objects 5310 in the bin 5330 may also be retrieved from the bin 5330 and temporarily moved to the media object display area 5320 for easier view and manipulation. A sequence of images representing this retrieval are depicted in FIGS. 56–58. Thus, media objects 5600 (e.g., all media objects in database) in the media object display area 5320 may be sent to its designated "0" bin 5350 in order to clear the media object display area 5320 for the media objects 5310. As shown, the "0" bin 5350 may be labeled "Everything" to denote that it contains all media objects in the database and available for use, annotation, browsing, etc.

In order to initiate the change of media objects in the media object display area 5320, a user selects the "2" bin 5330, in this instance, using a user selection component such as a mouse, keyboard, joystick, etc. Once the bin is selected (e.g., by double-clicking), the media objects 5600 leave the media object display area 5320 and the media objects 5310 leave the bin 5330 nearly simultaneously and populate the media object display area 5320, as indicated in FIG. 57. The media objects 5600 now reside in the "0" bin 5350 in about the same order and arrangement as in the media object display area 5320.

FIG. 58 illustrates the media display component 5300 once the retrieval has been substantially completed. The media objects 5310 from the bin 5330 have populated the available space in the media object display area 5320. Consequently, the "2" bin 5330 appears empty but the object indicator 5340 still shows that 20 objects are contained within. This can assist a user in keeping track of his/her actions with respect to the bins 5330, 5350, 5360 and the media objects 5310, 5600. Meanwhile, the media objects 5600 previously in the media object display area 5320 can be found in the bin 5350.

As discussed, a user may desire to retrieve media objects located in a bin from the bin in order to better view the content and annotated metadata of the media objects and/or any other information associated with the media objects. This was demonstrated with respect to FIGS. 56–58 above.

Referring again to FIG. 58, the media objects 5310 appear at rest after the previous action (e.g., retrieval action described in FIGS. 56–57) has been substantially completed. Continuing from FIG. 58, FIGS. 59–61 represent a series of still images of an animation sequence, which depict at least one media object 5910 being discarded or deleted from the media objects 5310 (as previously shown in FIG. 58) and the reorganization of the remaining media objects thereafter.

Figure 59:
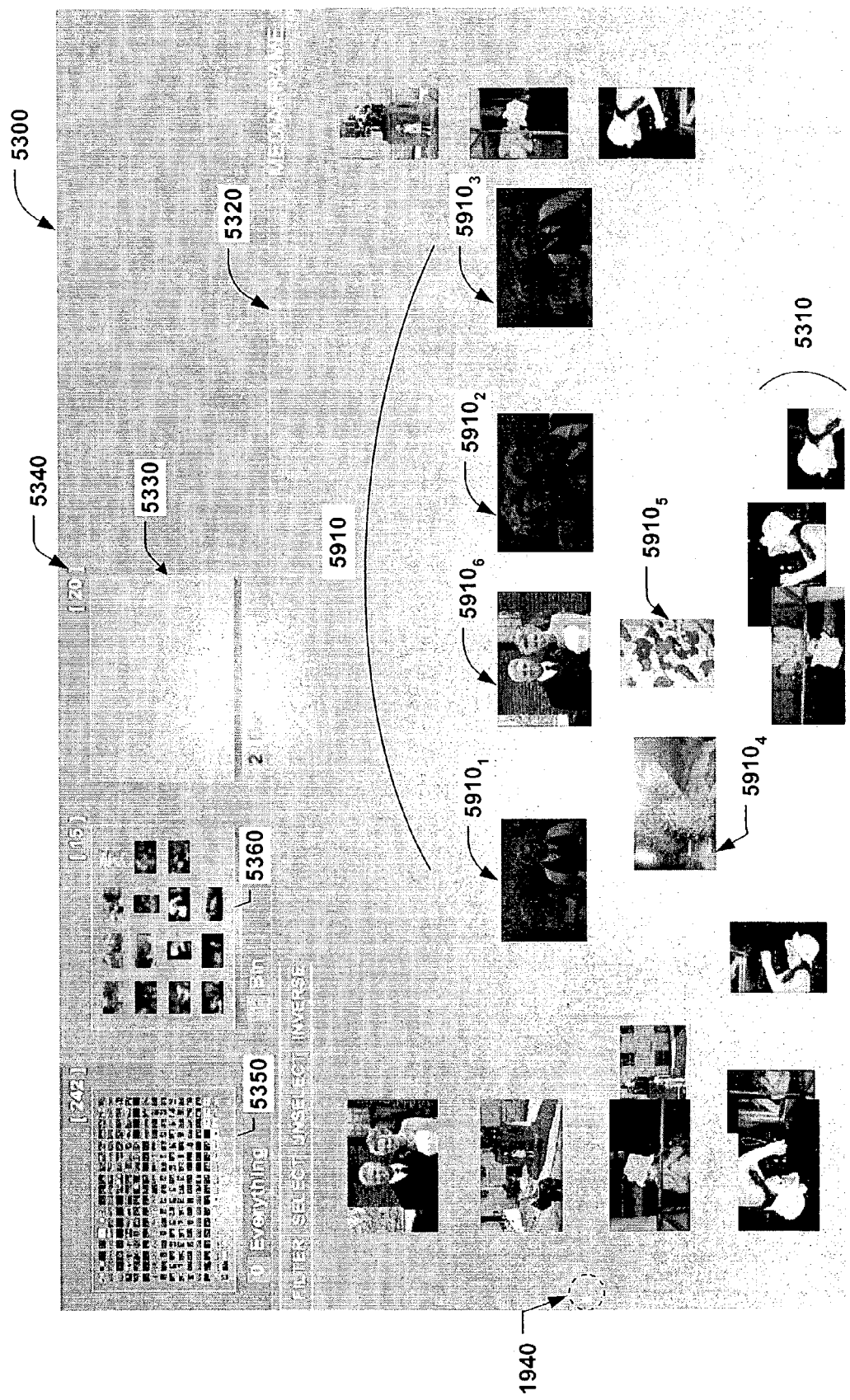
FIGS. 59–61 are images of an exemplary user interface in a frame-by-frame sequence demonstrating media object deletion from a bin component in accordance with an aspect of the present invention.

In FIG. 59, at least one media object 5910 out of the media objects 5310 present are selected to be discarded or deleted from the media object display area 5320 and, in particular, from the bin 5310. Thus, media objects 5920 should remain in the media object display area 5320, and in particular in the bin 5330. FIG. 59 depicts the movement of the media objects 5310 as the discarded media objects 5910 (e.g., $5910_1$, $5910_2$, $5910_3$, $5910_4$, $5910_5$, $5910_6$) are leaving or falling out of view from the media display area 5320. Thus, some of the media objects can appear to be overlapping with others and/or partially hidden from full view during this portion of the movement sequence.

Figure 60:
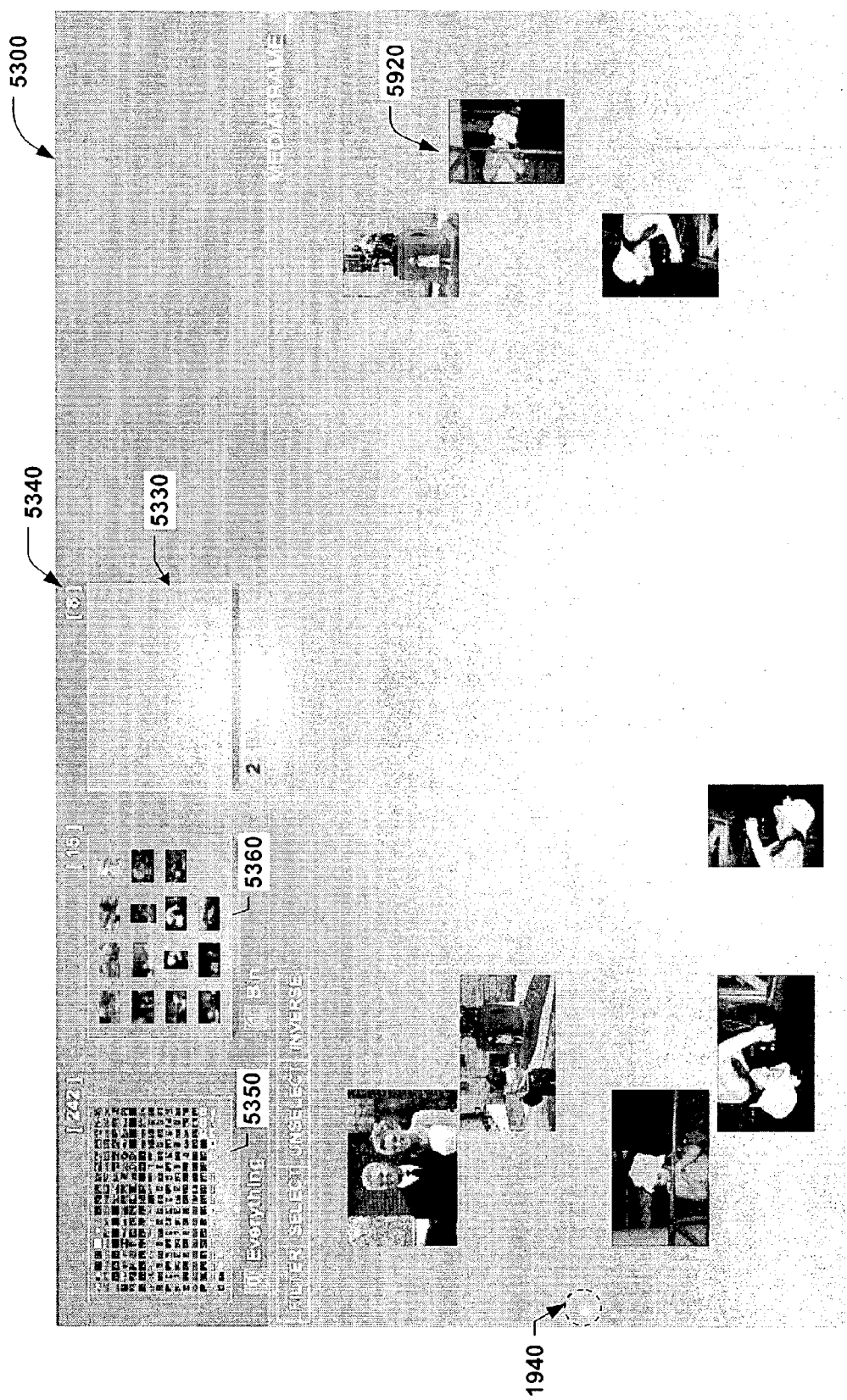
Figure 61:
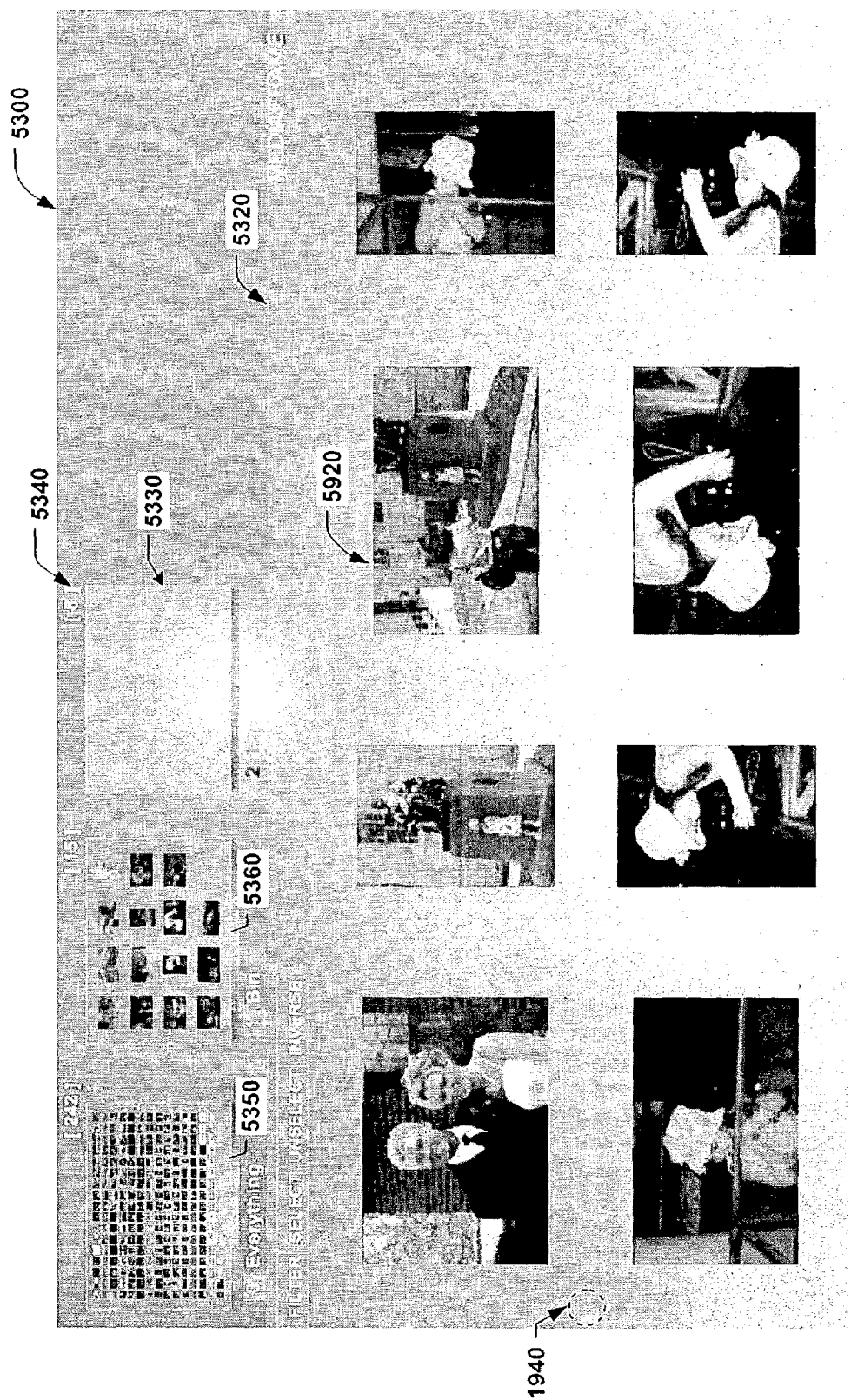

FIG. 60 illustrates the continued movement of the remaining media objects 5920 after the other media objects 5910 are discarded in order to populate the available space of the display area 5320. The object indicator 5340 for the bin 5330 also reflects the reduction of media objects as a result of the discard. Finally, FIG. 61 demonstrates that the media objects 5920 remaining in the bin 5330 are re-sized in order to maximize the visualization of each media object 5920 remaining (in the bin 5330) in the display area 5320.

Figure 62:
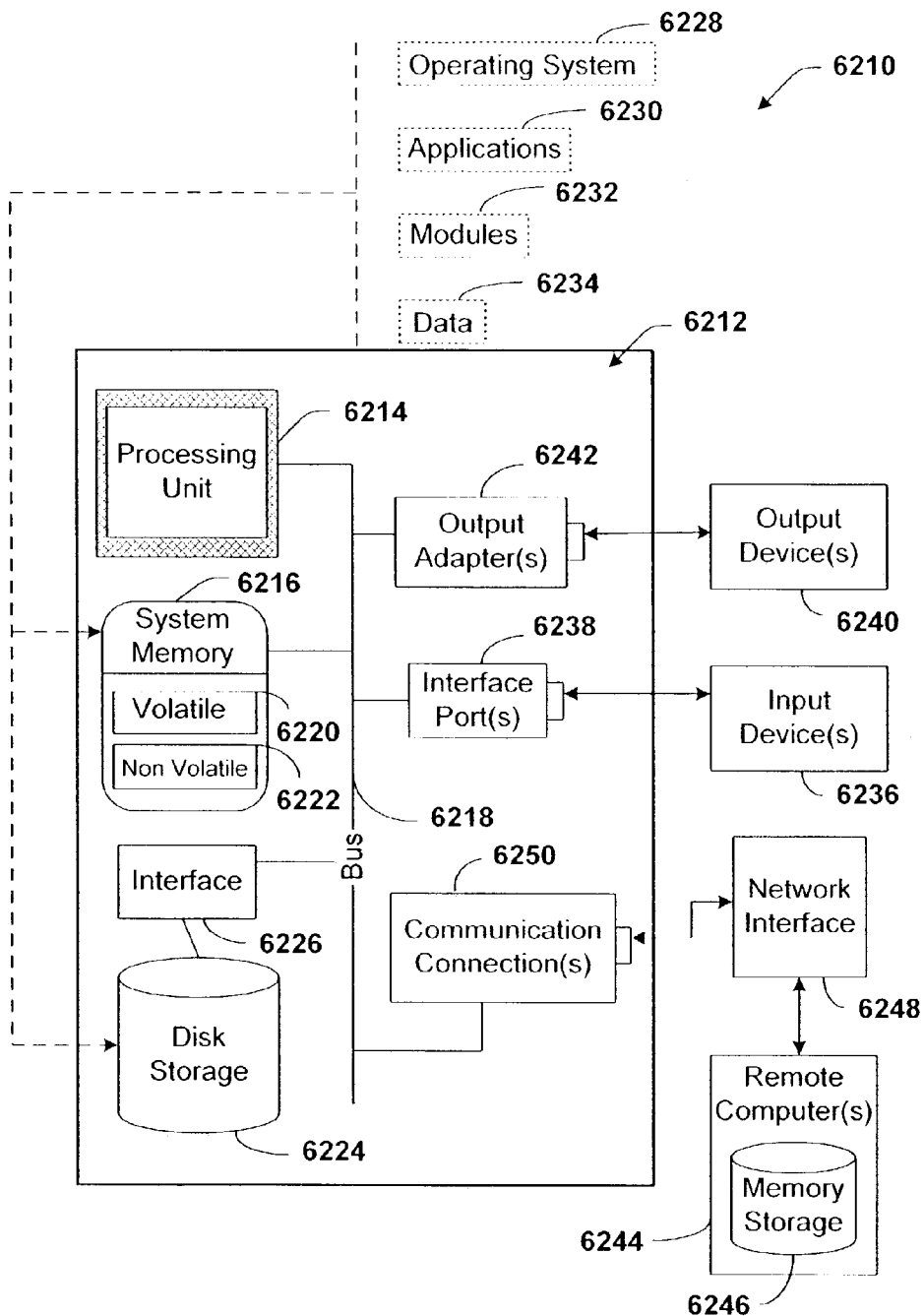
FIG. 62 illustrates an exemplary environment for implementing various aspects of the invention.

In order to provide additional context for various aspects of the present invention, FIG. 62 and the following discussion are intended to provide a brief, general description of a suitable operating environment 6210 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 6210 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 62, an exemplary environment 6210 for implementing various aspects of the invention includes a computer 6212. The computer 6212 includes a processing unit 6214, a system memory 6216, and a system bus 6218. The system bus 6218 couples system components including, but not limited to, the system memory 6216 to the processing unit 6214. The processing unit 6214 can be any of various available processors. Dual microprocessors and other multiprocessor architectures also can be employed as the processing unit 6214.

The system bus 6218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 6216 includes volatile memory 6220 and nonvolatile memory 6222. The basic input/output system (BIOS), containing the basic routines to transfer information between elements within the computer 6212, such as during start-up, is stored in nonvolatile memory 6222. By way of illustration, and not limitation, nonvolatile memory 6222 can include read only memory (ROM), programmable ROM (PROM), electrically programmable ROM (EPROM), electrically erasable ROM (EEPROM), or flash memory. Volatile memory 6220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 6212 also includes removable/nonremovable, volatile/nonvolatile computer storage media. FIG. 62 illustrates, for example a disk storage 6224. Disk storage 6224 includes, but is not limited to, devices like a magnetic disk drive, floppy disk drive, tape drive, Jaz drive, Zip drive, LS-100 drive, flash memory card, or memory stick. In addition, disk storage 6224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 6224 to the system bus 6218, a removable or non-removable interface is typically used such as interface 6226.

It is to be appreciated that FIG. 62 describes software that acts as an intermediary between users and the basic computer resources described in suitable operating environment 6210. Such software includes an operating system 6228. Operating system 6228, which can be stored on disk storage 6224, acts to control and allocate resources of the computer system 6212. System applications 6230 take advantage of the management of resources by operating system 6228 through program modules 6232 and program data 6234 stored either in system memory 6216 or on disk storage 6224. It is to be appreciated that the present invention can be implemented with various operating systems or combinations of operating systems.

A user enters commands or information into the computer 6212 through input device(s) 6236. Input devices 6236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 6214 through the system bus 6218 via interface port(s) 6238. Interface port(s) 6238 include, for example, a serial port, a parallel port, a game port, and a universal serial bus (USB). Output device(s) 6240 use some of the same type of ports as input device(s) 6236. Thus, for example, a USB port may be used to provide input to computer 6212, and to output information from computer 6212 to an output device 6240. Output adapter 6242 is provided to illustrate that there are some output devices 6240 like monitors, speakers, and printers among other output devices 6240 that require special adapters. The output adapters 6242 include, by way of illustration and not limitation, video and sound cards that provide a means of connection between the output device 6240 and the system bus 6218. It should be noted that other devices and/or systems of devices provide both input and output capabilities such as remote computer(s) 6244.

Computer 6212 can operate in a networked environment using logical connections to one or more remote computers, such as remote computer(s) 6244. The remote computer(s) 6244 can be a personal computer, a server, a router, a network PC, a workstation, a microprocessor based appliance, a peer device or other common network node and the like, and typically includes many or all of the elements described relative to computer 6212. For purposes of brevity, only a memory storage device 6246 is illustrated with remote computer(s) 6244. Remote computer(s) 6244 is logically connected to computer 6212 through a network interface 6248 and then physically connected via communication connection 6250. Network interface 6248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 6250 refers to the hardware/software employed to connect the network interface 6248 to the bus 6218. While communication connection 6250 is shown for illustrative clarity inside computer 6212, it can also be external to computer 6212. The hardware/software necessary for connection to the network interface 6248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A media object visualization system comprising:
   a media object display area that facilitates browsing, clustering, filtering and/or sorting of a plurality of media objects;
   one or more bin components that facilitate grouping, annotating, and manipulating selected media objects included therein;
   one or more filter components that facilitate clustering, sorting, annotating and filtering the selected media objects; and
   a time cluster slider component that alters a quantity and viewable size of clusters of media objects in the media object display area by one of increasing and decreasing the quantity and viewable size of the clusters.

2. The system of claim 1, wherein the plurality of media objects are maintained in an original form in a database.

3. The system of claim 1, wherein the media object display area provides a visual guide of any number of media objects available and accessible to a user for subsequent annotation and manipulation.

4. The system of claim 1, wherein the selected media objects appear highlighted prior to being selected by a user selection component.

5. The system of claim 1, wherein the media objects are enlarged during browsing with a user selection component when the user selection component contacts at least a portion of the media object.

6. The system of claim 1, wherein dimensions of the media object are maximized for viewing the media object by selecting the media object using a user selection component.

7. The system of claim 1, further comprising a variable viewer component that toggles the media objects in the media object display area between a stacked view and a raster view.

8. The system of claim 1, wherein the clusters of media objects are viewed in stacked view.

9. The system of claim 1, wherein the clusters of media objects are ranged by a time associated with the respective media objects in the respective cluster.

10. The system of claim 9, wherein the time associated with the respective media objects is at least a creation date of the media object.

11. The system of claim 1, wherein increasing the quantity of clusters viewable in the media object display area decreases the viewable size of the clusters accordingly.

12. The system of claim 1, further comprising a media object scroll component that allows a user to scroll the media objects in the media object display area in at least one of the following directions: up, down, left, and right.

13. The system of claim 12, wherein the viewable size of the media objects can be adjusted while scrolling the media objects in the media object display area.

14. The system of claim 1, further comprising a time-based selection component that indicates a date range as selected by a user and highlights media objects, which are annotated with at least date metadata, that are annotated with the date range indicated by the time-based selection component.

15. The system of claim 1, further comprising a media object content indicator that indicates a general content of the plurality of media objects to a user, the content indicator comprising at least a video indicator and a photo indicator.

16. The system of claim 15, wherein the content indicator is illuminated based on die content of the plurality of media objects in the media object display area.

17. The system of claim 1, wherein the one or more filter components are hidden from view in order to increase a viewable size of the media object display area, thereby revealing a hidden field indicator in place of where the filter components are generally located.

18. The system of claim 1, wherein the one or more filter components are automatically hidden from view based at least in part on user's instructions when a period of non-use of the filter components has occurred.

19. The system of claim 1, further comprising a filter component scroller component that facilitates viewing, browsing and using the filter components.

20. The system of claim 1, further comprising a bin scroller component that facilitates browsing of the bin components.

21. The system of claim 1, wherein the bin components are first arranged in chronological order of bin numbers and subsequently are secondly arranged based at least in part on priority, frequency of use, and a user's preference and instructions.

22. The system of claim 1, wherein at least one of the plurality of media objects and selected media objects are automatically arranged according to metadata associated and annotated therewith.

23. The system of claim 1, wherein at least one of the plurality of media objects and selected media objects are manually ordered based at least in part upon a user's instructions.

24. The system of claim 1, wherein metadata associated with at least one of a bin component and a filter component is/are viewable by selecting at least one of the respective media object, the respective bin component, and the respective filter component.

25. The system of claim 1, wherein a bin component may be selected (double-clicked) to be viewed and its media objects are moved to the media object display area for browsing, clustering, sorting, and/or manipulating the media objects.

26. The system of claim 1, wherein the selected media objects are placed into at least one bin component and annotated therein with at least one metadata.

27. The system of claim 26, wherein the database of media objects are not modified or further annotated with metadata when the media objects are selected and annotated in at least one bin component.

28. The system of claim 1, wherein the plurality of media objects in the database as shown in the media object display area maintain dynamic relationships with the respective media objects selected and located in bin components and filter categories, the foregoing being evidenced by a highlighting effect.

29. The system of claim 1, wherein media objects selected to any one of a bin component and a filter component are not removed from the database of the plurality of media objects.

30. The system of claim 1, wherein media objects in the database are highlighted concurrently with highlighting at least one of the bin component and the filter component which comprise the respective media objects.

31. A media object visualization system comprising:
   a media display component comprising a media object display area;
   a time cluster slider component that alters a quantity and viewable size of clusters of media objects in the media object display area by one of increasing and decreasing the quantity and viewable size of the clusters; and
   a plurality of media objects located in the media object display area such that a user browses, clusters, sorts, filters, and selects the media objects based at least in part upon the user's instructions for subsequent annotation with metadata.

32. A computer readable medium having a computer usable component for a media object visualization, comprising:
   a media object display area tat facilitates browsing, clustering, filtering and/or sorting any number of media objects;
   one or more bin components that facilitate grouping, annotating, and manipulating selected media objects included therein;
   one or more filter components that facilitate clustering, sorting, annotating and filtering selected media objects; and
   a time cluster slider component that alters a quantity and viewable size of clusters of media objects in the media object display area by one of increasing and decreasing the quantity and viewable size of the clusters.

* * * * *